US011347303B2

(12) United States Patent
Stafford et al.

(10) Patent No.: US 11,347,303 B2
(45) Date of Patent: May 31, 2022

(54) SYSTEMS AND METHODS FOR DETERMINING MOVEMENT OF A CONTROLLER WITH RESPECT TO AN HMD

(71) Applicant: Sony Interactive Entertainment Inc., Tokyo (JP)

(72) Inventors: Jeffrey Roger Stafford, Redwood City, CA (US); Todd Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 99 days.

(21) Appl. No.: 16/207,029

(22) Filed: Nov. 30, 2018

(65) Prior Publication Data

US 2020/0174552 A1 Jun. 4, 2020

(51) Int. Cl.
| | | |
|---|---|---|
| *G01C 19/5783* | (2012.01) | |
| *G06F 3/01* | (2006.01) | |
| *G06T 7/70* | (2017.01) | |
| *G01B 5/004* | (2006.01) | |
| *G01P 13/00* | (2006.01) | |

(52) U.S. Cl.
CPC .......... *G06F 3/011* (2013.01); *G01C 19/5783* (2013.01); *G06T 7/70* (2017.01); *G01B 5/004* (2013.01); *G01P 13/00* (2013.01)

(58) Field of Classification Search
None
See application file for complete search history.

(56) References Cited

U.S. PATENT DOCUMENTS

| | | | |
|---|---|---|---|
| 8,870,654 B2 | 10/2014 | Nakayama et al. | ............ 463/38 |
| 9,245,501 B2 | 1/2016 | Liu et al. | ................. G09G 5/38 |
| 9,649,558 B2 | 5/2017 | Stafford et al. | ........ A63F 13/213 |
| 9,753,549 B2 | 9/2017 | Stafford et al. | ......... G06F 3/017 |
| 9,961,166 B2 | 5/2018 | Olivier et al. | .......... H01L 67/42 |
| 9,983,692 B2 | 5/2018 | Mallinson | ............. G06F 3/0325 |
| 10,534,454 B2 | 1/2020 | Stafford et al. | |
| 2013/0215024 A1* | 8/2013 | Nakayama | ............ A63F 13/211 |
| | | | 345/157 |
| 2014/0018173 A1* | 1/2014 | Urhman | .................. A63F 13/06 |
| | | | 463/37 |

(Continued)

OTHER PUBLICATIONS

PCT/US2019/062680, Notification International Search Report, International Searching Authority, European Pat. Office, Rijswijk, dated Mar. 17, 2020.

(Continued)

*Primary Examiner* — Kent W Chang
*Assistant Examiner* — Benjamin Morales
(74) *Attorney, Agent, or Firm* — Penilla IP, APC

(57) ABSTRACT

Systems and methods for determining movement of a handheld controller (HHC) with respect to a head-mounted display (HMD) are described. A camera is located at a lower region of the HMD for capturing images of the HHC. The images of the HHC are used to determine a position and an orientation of the HHC with reference to the HMD. Also, the camera or another camera can be used to determine a position and orientation of the HMD with respect to a real-world environment. The position and orientation of the HMD and the position and orientation of the HHC are used to change to state of an application executed on a game cloud.

22 Claims, 29 Drawing Sheets

(56) References Cited

U.S. PATENT DOCUMENTS

| | | | |
|---|---|---|---|
| 2014/0028564 A1* | 1/2014 | Valentine | G06F 1/169 |
| | | | 345/168 |
| 2014/0364212 A1* | 12/2014 | Osman | A63F 13/26 |
| | | | 463/31 |
| 2015/0094142 A1* | 4/2015 | Stafford | A63F 13/26 |
| | | | 463/31 |
| 2015/0234501 A1* | 8/2015 | Lyons | G02B 30/34 |
| | | | 345/174 |
| 2015/0258431 A1* | 9/2015 | Stafford | A63F 13/211 |
| | | | 463/31 |
| 2016/0210785 A1* | 7/2016 | Balachandreswaran | |
| | | | H04N 13/204 |
| 2016/0214015 A1 | 7/2016 | Osman et al. | |
| 2016/0260251 A1* | 9/2016 | Stafford | G02B 27/0101 |
| 2017/0199584 A1* | 7/2017 | Mallinson | G06F 3/012 |
| 2017/0354864 A1* | 12/2017 | Rogers | A63F 13/245 |
| 2018/0001198 A1* | 1/2018 | Frappiea | A63F 13/49 |
| 2018/0311583 A1 | 11/2018 | Osman et al. | |
| 2018/0329484 A1 | 11/2018 | Drew et al. | |
| 2018/0329516 A1 | 11/2018 | Steedly et al. | |
| 2018/0329517 A1 | 11/2018 | Steedly et al. | |
| 2018/0330521 A1 | 11/2018 | Samples et al. | |
| 2019/0012835 A1* | 1/2019 | Bleyer | G06F 3/011 |

OTHER PUBLICATIONS

Unknown, "PlayStation VR—Wikipedia", XP055674393, Oct. 27, 2018, https://en.wikipedia.org/w/index.php?title=PlayStation VR&oldid=865941270.

* cited by examiner

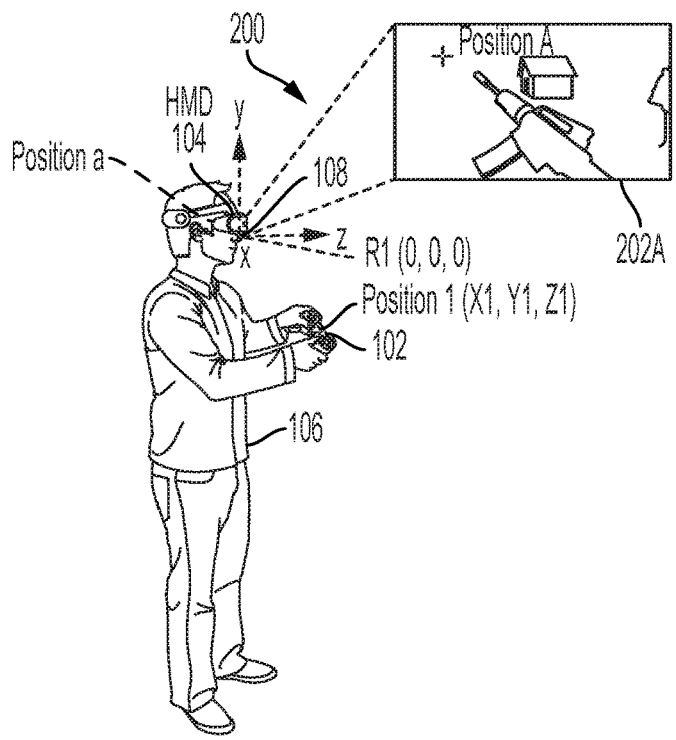
FIG. 3A
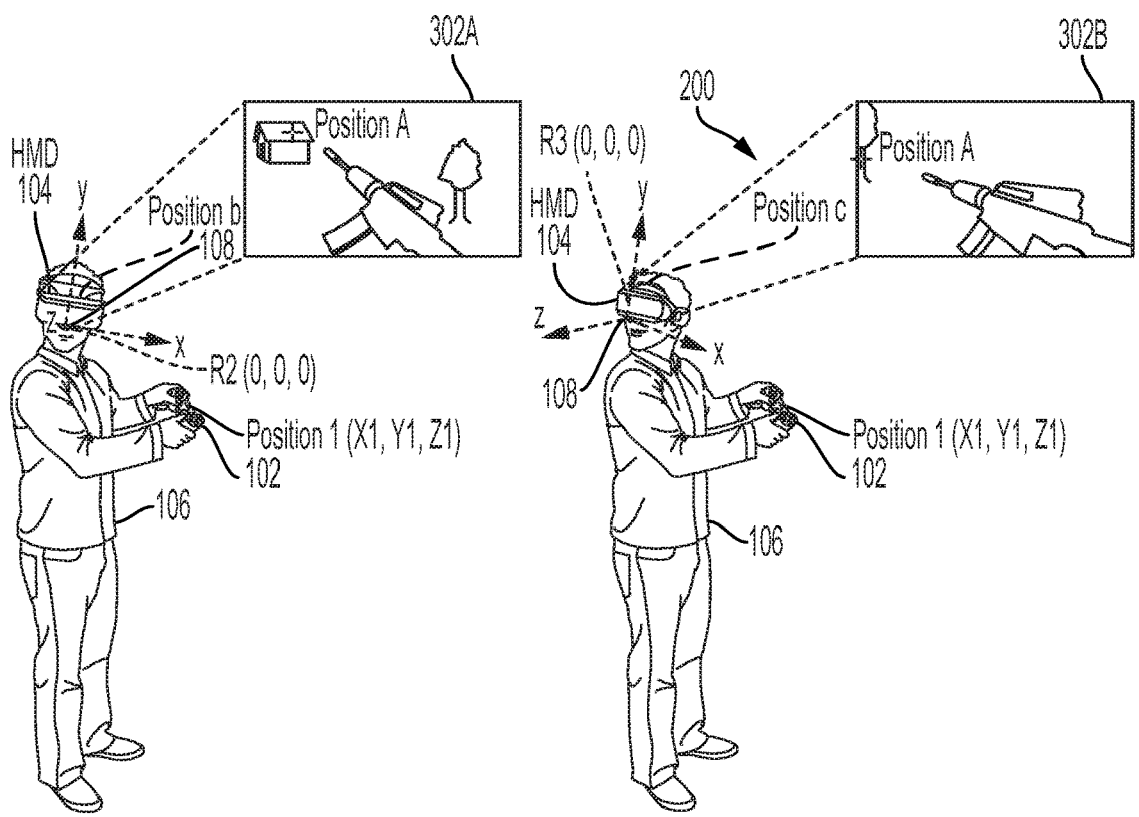
FIG. 3B
FIG. 3C

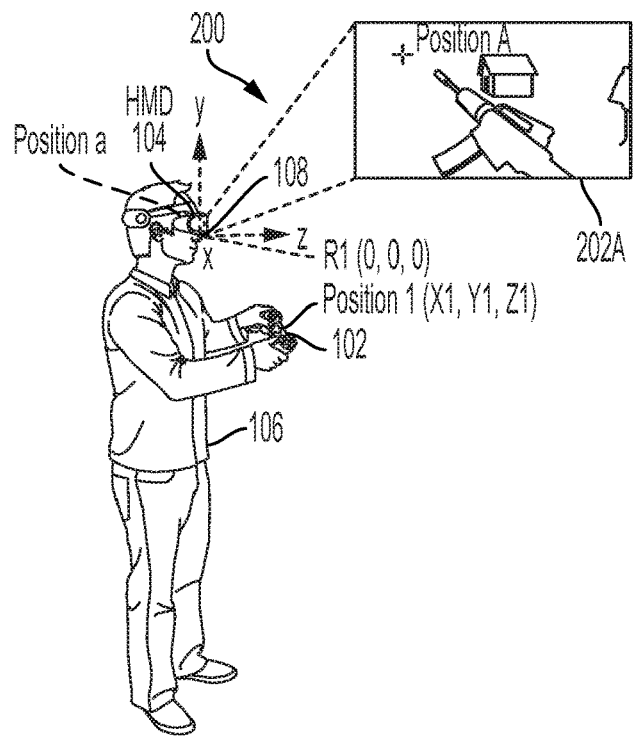
FIG. 4A
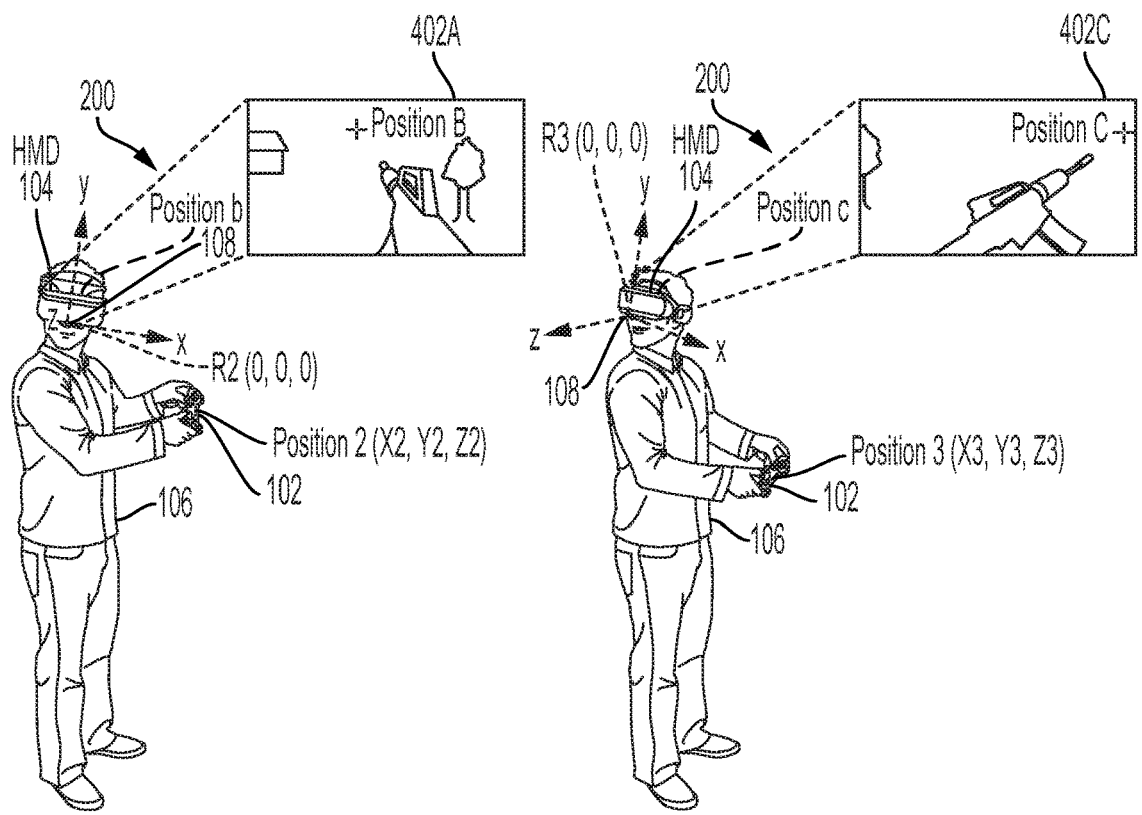
FIG. 4B
FIG. 4C

SYSTEMS AND METHODS FOR DETERMINING MOVEMENT OF A CONTROLLER WITH RESPECT TO AN HMD

CROSS-REFERENCE TO RELATED APPLICATIONS

The present disclosure relates to U.S. patent application Ser. No. 15/887,877, filed on Feb. 2, 2018, and titled "HEAD-MOUNTED DISPLAY TO CONTROLLER CLOCK SYNCHRONIZATION OVER EM FIELD", which is incorporated by reference herein in its entirety.

The present disclosure relates to U.S. patent application Ser. No. 14/633,415, filed on Feb. 27, 2015, and titled "GAMING DEVICE WITH ROTATABLY PLACED CAMERAS", now issued as U.S. Pat. No. 9,649,558, which is incorporated by reference herein in its entirety.

FIELD

The present disclosure relates to systems and methods for determining movement of a controller with respect to a head-mounted display.

BACKGROUND

A head-mounted display (HMD) is used to play a game. A player wears the HMD on his/her head. The player holds a DualShock™ controller that the player uses to play the game. A camera is placed within a room, such as on a television stand, in which the player is playing the game. The camera captures images of the player.

It is in this context that embodiments described in the present disclosure arise.

SUMMARY

Embodiments described in the present disclosure provide systems and methods for determining movement of a controller with respect to a head-mounted display (HMD).

In one embodiment, a system for tracking a hand-held controller relative to an HMD is described. The system includes the hand-held controller, the HMD, and a processing device. The HMD is configured to be worn on a head of a user. The HMD is further configured to display a plurality of image scenes having content generated by execution of an application. The HMD has a lower region having a camera. The camera has a capture view directed downward from the HMD. The camera is configured to capture a plurality of images of the hand-held controller. The processing device is associated with the HMD for receiving a plurality of images of a real-world environment surrounding the HMD and the plurality of images of the hand-held controller. The processing device is configured to determine a position and movement of the HMD within the real-world environment from the plurality of images of the real-world environment. The processing device is configured to determine a position of the hand-held controller relative to the HMD from the plurality of images of the hand-held controller. The processing device is configured to modify a state output by execution of the application according to the position and movement of the HMD and changes in the position of the hand-held controller. The HMD is configured to update the plurality of image scenes displayed in the HMD according to the modification of the state.

In an embodiment, a method for tracking a hand-held controller relative to an HMD is described. The method includes displaying a plurality of image scenes having content generated by execution of an application. The HMD has a lower region having a camera and the camera has a capture view directed downward from the HMD. The method further includes capturing, by the camera, a plurality of images of the hand-held controller with respect to the HMD. The method includes receiving a plurality of images of a real-world environment surrounding the HMD and the plurality of images of the hand-held controller. The method further includes determining a position and movement of the HMD within the real-world environment from the plurality of images of the real-world environment. The method includes determining a position of the hand-held controller relative to the HMD from the plurality of images of the hand-held controller. The method further includes modifying a state output by execution of the application according to the position and movement of the HMD and changes in the position of the hand-held controller. The method includes updating the plurality of image scenes displayed in the HMD according to the modification of the state.

In an embodiment, a computer-readable medium containing program instructions for tracking a hand-held controller relative to an HMD is described. Execution of the program instructions by one or more processors of a computer system causes the one or more processors to carry out a plurality of operations of the method described above.

Some advantages of the herein described systems and methods include that a camera on a lower region of the HMD faces a hand-held controller (HHC). As such, chances of the HHC being out of view of the camera on the lower region are reduced. Also, the camera on the lower region moves with the HMD, which moves with the user. Accordingly, the camera on the lower region of the HMD captures one or more images of movement of the HHC when an outside-in tracking camera, such as a camera facing the HMD, cannot capture movement of the HHC.

Other aspects described will become apparent from the following detailed description, taken in conjunction with the accompanying drawings, illustrating by way of example the principles of embodiments described in the present disclosure.

BRIEF DESCRIPTION OF THE DRAWINGS

Various embodiments described in the present disclosure may best be understood by reference to the following description taken in conjunction with the accompanying drawings in which:

FIG. 3A is a diagram of an embodiment of a system to illustrate a position a of the HMD with respect to a reference coordinate system of the real-world environment.

FIG. 3B is a diagram of an embodiment of a system to illustrate another position b of the HMD with respect to the reference coordinate system of the real-world environment.

FIG. 3C is a diagram of an embodiment of a system to illustrate a position c of the HMD with respect to the reference coordinate system of the real-world environment.

FIG. 4A is a diagram of an embodiment of a system to illustrate the position a of the HMD with respect to the reference coordinate system of the real-world environment and the position 1 of the HHC with respect to the reference co-ordinate system of the camera of FIG. 3A.

FIG. 4B is a diagram of an embodiment of a system to illustrate the position b of the HMD with respect to the reference coordinate system of the real-world environment and the position 2 of the HHC with respect to the reference co-ordinate system of the camera of FIG. 3B.

FIG. 4C is a diagram of an embodiment of a system to illustrate the position c of the HMD with respect to the reference coordinate system of the real-world environment and the position 3 of the HHC with respect to the reference co-ordinate system of the camera of FIG. 3C.

DETAILED DESCRIPTION

Systems and methods for determining movement a handheld controller (HHC) with respect to a head-mounted display (HMD) are described.

It should be noted that various embodiments described in the present disclosure may be practiced without some or all of these specific details. In other instances, well known process operations have not been described in detail in order not to unnecessarily obscure various embodiments described in the present disclosure.

Figure 1A:
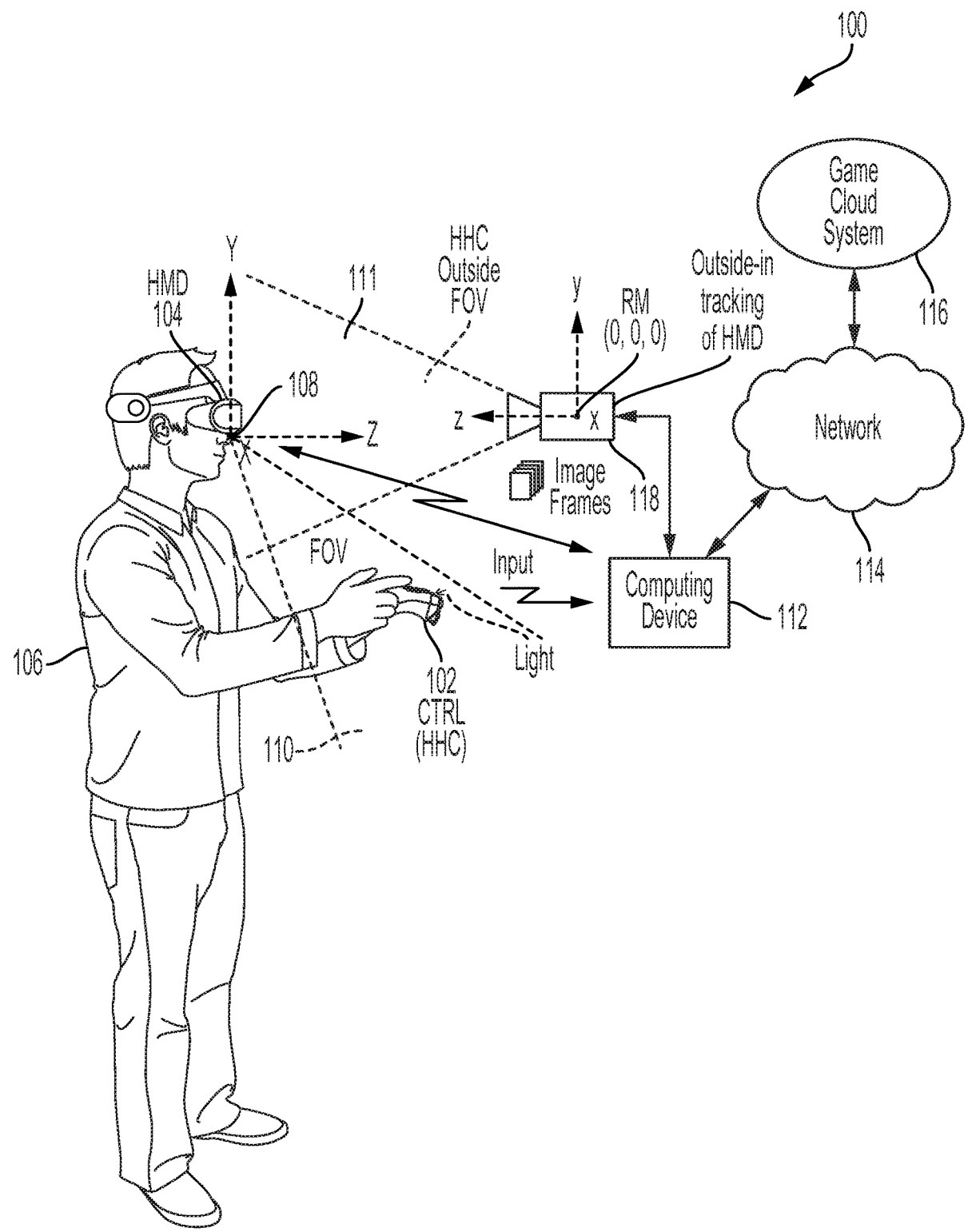
FIG. 1A is a diagram of a system to illustrate tracking of a hand-held controller (HHC) by a camera of a head-mounted display (HMD).

FIG. 1A is a diagram of a system 100 to illustrate tracking of an HHC 102 by a camera 108 of an HMD 104. The system 100 includes a computing device 112, a computer network 114, a game cloud system 116, a camera 118, the HMD 104, and the HHC 102. Examples of a camera, such as the camera 118, as used herein include a fisheye camera, a depth camera, an image capturing device, an infrared LED camera, and a Sony™ PlayStation™ camera. The camera 118 is an outside-in tracking camera and the camera 108 is an inside-out tracking camera. Moreover, examples of the camera 108 include a depth camera, and LED camera, an infrared LED camera, and an image capturing device. Examples of the computing device 112 include a game console, a computer, a tablet, a router, a processor, and a smart phone. The computer network 114 can be a wide area network (WAN) such as the Internet, or a local area network (LAN) such as an intranet. The game cloud system 116 includes one or more servers that execute an application, such as a game application or a video conferencing application. As an example, the game cloud system 116 includes virtual machines or distributed gaming nodes to execute the application. Examples of the HHC 102 include a video game controller and a Sony™ DualShock™ controller.

The camera 108 is fitted to a lower region of the HMD 104 so that the camera 108 faces the HHC 102. For example, the camera 108 is fitted to a curved lower surface of the HMD 104. The lower region of the HMD 104 is below a display screen of the HMD 602. The camera 118 is placed within a real-world environment, such as a room or an enclosed space or a cubicle or a warehouse, in which a user 106, the HMD 104, and the HHC 102 are located. The camera 118 faces the HMD 104, the HHC 102, and the user 106.

The camera 118 is coupled to the computing device 112 via a wired or a wireless connection. Moreover, the HMD 104 is coupled to the computing device 112 via a wired or a wireless connection. Examples of a wireless connection, as used herein, include a Bluetooth™ connection and a Wi-Fi™ connection. Examples of a wired connection, as used herein, include a cable that provides a parallel transfer of data or is a universal serial bus (USB) connection. The computing device 112 is coupled to the game cloud system 116 via the computer network 114.

The user 106 wears the HMD 104 on his/her head. Moreover, the user 106 holds the HHC 102 within his/her hands. The user 106 provides his or her login information by using one or more input buttons on the HHC 102. The login information is provided from the HHC 102 via the computing device 112 and the computer network 114 to the game cloud system 116. The one or more servers of the game cloud system 116 authenticate the login information to provide access to a user account A that is stored within the game cloud system 116. The user account A is assigned to the user 106 by the one or more servers of the game cloud system 116.

Once the user 106 is provided access to the user account A, the user 106 selects one or more input buttons on the HHC 102 or moves one or more joysticks on the HHC 102 or moves the HHC 102 or moves the HMD 104, or performs a combination of these moves and selections. When the HHC 102 is moved and/or the one or more input buttons on the HHC 102 are selected and/or the one or more joysticks on the HHC 102 are moved, one or more sensors of the HHC 102 generate input data that is sent from the HHC 102 via the wired or wireless connection to the computing device 112. Similarly, when the HMD 104 is moved, one or more sensors of the HMD 104 generate input data that is sent from the HMD 104 via the wired or wireless connection to the computing device 112. The movement of the HMD 104 occurs with respect to a reference coordinate system, such as an xyz coordinate system, of the real-world environment. For example, there is a change in a position and an orientation of the HMD 104 with respect to the reference coordinate system of the real-world environment. Moreover, the movement of the HHC 102 occurs with respect to another reference coordinate system, such as an XYZ coordinate system, that is fixed on the HMD 104. Examples of one or more sensors, as described herein, include capacitive sensors and inertial sensors. Examples of the inertial sensors include gyroscopes, accelerometers, and magnetometers.

In addition, the camera 108 of the HMD 104 captures one or more images of movement, by the user 106, of the HHC 102 within a field-of-view (FOV) 110 of the camera 108 and sends the images via the wired or wireless connection to the computing device 112. The FOV 110 is sometimes referred to herein as an interaction zone. The images captured by the camera 108 include images of a portion of the real-world environment that is within the FOV 110 and also includes the images of the HHC 102. The camera 108 is directed downward from the HMD 104 to face a floor of the real-world environment in which the HMD 104, the HHC 102, the computing device 112, and the user 106 are located. The floor is within the FOV 110. For example, a lens of the camera 108 has an aperture that receives light that is reflected from the floor. In this example, the aperture does not receive light reflected from any wall of the real-world environment unless the user 106 lifts his/her head up so that the aperture faces the wall. When the user 110 is facing the wall, the aperture of the camera 108 is facing downward towards the floor and so the FOV 110 extends downward towards the floor.

The FOV 110 is a three-dimensional field-of-view that has a height in a y direction, a width in an x-direction and a depth in a z-direction. The y-direction, the x-direction, and the z-direction are described below. Also, the camera 118 that is facing the HMD 104 captures one or more images of the real-world environment and the images include movement, by the user 106, of the HMD 104 within a field-of-view 111 of the camera 118. The capturing of the one or more images of the movement of the HMD 104 with respect to the XYZ coordinate system of the camera 118 is sometimes referred to herein as outside-in tracking. The images captured by the camera 118 are sent via the wired or wireless connection to the computing device 112.

The computing device 112 sends information data, such as the input data received from the HMD 104, the input data received from the HHC 102, the images received from the camera 108, and the images received from the camera 118, via the computer network 114 to the one or more servers of the game cloud system 116. The one or more servers of the game cloud system 116 receive the information data and execute the application to change a state of a virtual scene that is being displayed on a display screen of the HMD 104 to output another state of the virtual scene. A state of the virtual scene is sometimes referred to herein as content. To illustrate, the one or more servers of the game cloud system 116 receive the images of movement of the HMD 104 with respect to the xyz coordinate system of the camera 118 and determines from the movement of the HMD 104 within the images changes to one or more positions of the HMD 104 and changes to one or more orientations of the HMD 104. The changes to the one or more positions of the HMD 104 are analyzed by the game cloud system 116 to determine other one or more positions of the HMD 104 and changes to one or more orientations of the HMD 104 are analyzed by the game cloud system 116 to determine other one or more orientations of the HMD 104. For example, a change in a position of the HMD 104 from a point A to a point B is analyzed to determined that the HMD 104 is now at the point B. As another example, a change in an orientation of the HMD 104 from an orientation A to an orientation B is analyzed to determined that the HMD 104 is now at the orientation B. The other one or more positions of the HMD 104 and the other one or more orientations of the HMD 104 correspond to the other state of the virtual scene. The movement of the HMD 104 with respect to the xyz co-ordinate system of the camera 118 is movement of the HMD 104 in the real-world environment.

Continuing with the illustration, the one or more servers of the game cloud system 116 receive the images of movement of the HHC 102 with respect to the XYZ coordinate system of the HMD 104 and execute the application to determine from the movement of the HHC 102 changes to one or more positions of the HHC 102 to determine other one or more positions of the HHC 102 and changes to one or more orientations of the HHC 102 to determine other one or more orientations of the HHC 102. The other one or more positions of the HHC 102 and the other one or more orientations of the HHC 102 correspond to the other state of the virtual scene. The changes to the one or more positions and the changes to the one or more orientations of the HHC 102 are determined with reference to the XYZ coordinate system of the camera 108. It should be noted that a movement includes a plurality of positions and/or a plurality of orientations. For example, the movement of the HHC 102 includes multiple positions and/or multiple orientations of the HHC 102 and the movement of the HMD 104 has multiple positions of the HMD 104 and/or multiple orientations of the HMD 104.

It should be noted that a position of the HHC 102 includes a distance in an X-direction from a reference coordinate, such as an origin, of the XYZ coordinate system, a distance in a Y-direction from the reference coordinate of the XYZ coordinate system, and a distance in a Z-direction from the reference coordinate of the XYZ coordinate system. Also, an orientation of the HHC 102 includes an angle with respect to an X-axis of the XYZ coordinate system, an angle with respect to a Y-axis of the XYZ coordinate system, and an angle with respect to a Z-axis of the XYZ coordinate system. The X-axis is perpendicular to each of the Y-axis and the Z-axis and the Y-axis is perpendicular to the Z-axis. The X-direction is a direction of the X-axis, the Y-direction is a direction of the Y-axis, and the Z-direction is a direction of the Z-axis.

Similarly, it should be noted that a position of the HMD 104 in the real-world environment includes a distance in an x-direction from a reference coordinate RM, such as an origin (0, 0, 0), of the xyz coordinate system, a distance in a y-direction from the reference coordinate RM of the xyz coordinate system, and a distance in a z-direction from the reference coordinate RM of the xyz coordinate system. Also, an orientation of the HMD 104 includes an angle with respect to an x-axis of the xyz coordinate system having the reference coordinate RM, an angle with respect to a y-axis of the xyz coordinate system, and an angle with respect to a z-axis of the xyz coordinate system. The x-axis is perpendicular to each of the y-axis and the z-axis and the y-axis is perpendicular to the z-axis. The x-direction is a direction of the x-axis, the y-direction is a direction of the y-axis, and the z-direction is a direction of the z-axis.

Examples of the state of the virtual scene include a texture of one or more virtual objects in the virtual scene, or a color of the virtual objects, or an intensity of the virtual objects, or graphics of the virtual objects, or audio data to be output with a display of the virtual objects, or positions of the virtual objects, or orientations of the virtual objects, a texture of a virtual background of the virtual scene, or a color of the virtual background, or an intensity of the virtual background, or graphics of the virtual background, or audio data to be output with a display of the virtual background, or a position of the virtual background, or an orientation of the virtual background. An example of the virtual background is a portion of a virtual scene that does not include a virtual object.

The one or more servers of the game cloud system 116 changes the state of the virtual scene to generate multiple frames, such as image or audio frames, and encodes the multiple frames to output multiple encoded frames. The multiple frames include a modified state, such as the other state, of a modified virtual scene. The one or more servers of the game cloud system 116 send the encoded frames via the computer network 114 to the computing device 112. The computing device 112 decodes the encoded frames and sends the decoded frames to the HMD 104 via the wired or wireless connection. A video processor of the HMD 104 changes or updates the display of the virtual scene according to the decoded frames to display the modified virtual scene on the HMD 104 and/or an audio processor of the HMD 104 changes sound output with the virtual scene. The sound is output via one or more speakers of the HMD 104.

In one embodiment, instead of the HHC 102, another type of controller, such as a gun-shaped controller or a Sony™ Move™ controller is used.

In one embodiment, there is no computing device 112 used between the HMD 104 and the game cloud system 116. For example, functions described herein has been performed by the computing device 112 are instead performed by the HMD 104 and there is no computing device 112 placed between the HMD 104 and the computer network 114. To further illustrate, functions described herein as being performed by the computing device 114 are performed by one or more processors integrated within the HMD 104. As another example, functions described herein of transferring data between the HMD 104 and the game cloud system 116 are performed by a wireless access card (WAC) within the HMD 104. The WAC of the HMD 104 communicates with the computer network 114. As another illustration, functions described herein of transferring data, described herein, between the HMD 104 and the game cloud system 116 are performed by a broadband communication integrated circuit (IC) within the HMD 104. An example of the broadband communication IC is a subscriber identity module (SIM) card. The broadband communication IC communicates data, described herein, with a cellular network including multiple cell towers, which communicate with the computer network 114. As yet another example, the HMD 104 includes a communication circuit for communicating via a short-range wireless protocol, such as a Wi-Fi™ protocol or a Bluetooth™ protocol, to a router. The router is within the real-world environment and coupled to the computer network 114.

Figure 1B:
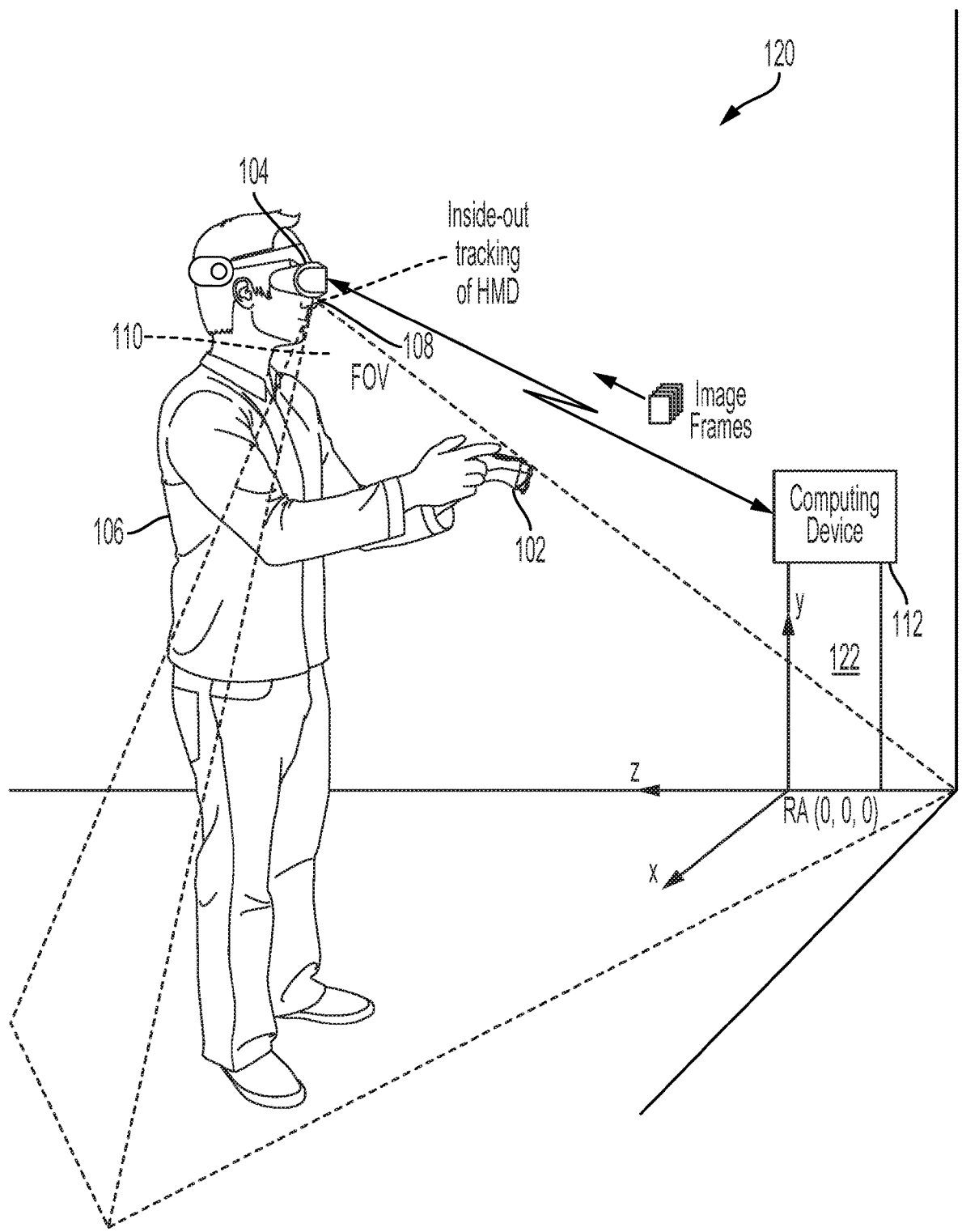
FIG. 1B is a diagram of an embodiment of a system to illustrate that there is no need to use an outside-in tracking camera to determine a position and an orientation of the HMD.

FIG. 1B is a diagram of an embodiment of a system 120 to illustrate that there is no need to use the camera 118 (FIG. 1A) to determine a position and an orientation of the HMD 104. Rather, inside-out tracking is performed with the camera 108. The position, movement, and orientation of the HMD 104 with respect to a reference coordinate system, such as an xyz coordinate system, of the real-world environment is tracked using the camera 108 of the HMD 104.

The system 120 includes the HMD 104, the HHC 102, and the computing device 112. The computing device 112 rests on a support 122, such as a table or a television stand, which is located within the real-world environment in which the HMD 104 and the HHC 102 are located. At a bottom of the support 112, the xyz coordinate system of the real-world environment is located.

As the user 106 moves towards or away from a reference point RA, such as an origin (0, 0, 0), of the xyz coordinate system of the real-world environment, the camera 108 tracks a change in a position of the HMD 104 with respect to the reference point RA. Similarly, as the user 106 moves his/her head with respect to the reference point RA, the camera 108 tracks a change in an orientation of the HMD 104 with respect to the xyz coordinate system of the real-world environment. The tracking by the camera 108 of the position and orientation of the HMD 104 with respect to the xyz coordinate system of the real-world environment is sometimes referred to herein as inside-out tracking of the HMD 104. The camera 108 captures one or more images of a portion of the real-world environment within the FOV 110 of the camera 108 and the one or more images includes the reference point RA.

In addition to tracking of the position and orientation of the HMD 104 by the camera 108 of the HMD 104, the HMD 104 includes the inertial sensors that output inertial data, such as measurements of an acceleration of the HMD 104, measurements of an angular velocity of the HMD 104, measurements of a position of the HMD 104, and measurements of an orientation of the HMD 104 with respect to a coordinate system of the inertial sensors. For example, the gyroscope of the HMD 104 measures an angular velocity of the orientation of HMD 104 with respect to a coordinate system of the gyroscope. The coordinate system of the gyroscope has a spin axis. The spin axis is equivalent to the y-axis, described above and points vertically up in one direction and down in an opposite direction. It should be noted that the co-ordinate system of the inertial sensors of the HMD 104 is an example of a coordinate system of the real-world environment. The inertial data that is generated by the sensors of the HMD 104 is an example of the input data that is generated by the HMD 104.

The one or more images of the real-world environment captured by the camera 108 and the inertial data generated by the sensors of the HMD 104 are sent via the wired or wireless connection to the computing device 112. The computing device 112 sends the one or more images of the real-world environment and the inertial data generated by the sensors of the HMD 104 via the computer network 114 (FIG. 1A) to the game cloud system 116 (FIG. 1A) for changing the state of the virtual scene.

In one embodiment, the xyz coordinate system of the real-world environment is located at any point on a surface of the support 122 or at any point within the real-world environment. For example, the xyz coordinate system of the real-world environment is located at a corner of the room in which the HMD 104 and the HHC 102 are located.

In an embodiment, instead of the camera 108 being located at the lower region of the HMD 104, a camera (not shown) is located on a top surface 122 of the HHC 102. The top surface 122 is a surface on which the buttons and joysticks of the HHC 102 are located. The camera (not shown) located on the top surface 122 of the HHC 102 captures one or more images of the HMD 104 and has a reference coordinate system whose reference point, such as an origin, is located on the camera (not shown). The one or more images of the HMD 104 captured by the camera (not shown) on the top surface 122 of the HHC 102 include a position and an orientation of the HMD 104 with respect to the reference coordinate system of the camera (not shown). The HHC 102 sends the images captured by the camera (not shown) of the HHC 102 via the wired or wireless connection to the computing device 112. The computing device 112 sends the images captured by the camera (not shown) of the HHC 102 via the computer network 114 to the game cloud system 116. The game cloud system 116 determines the position, movement, and the orientation of the HMD 104 with respect to the HHC 102 from the images captured by the camera (not shown) of the HHC 102 and changes the state of the virtual scene according to the position and the orientation.

In one embodiment, the position and orientation of the HMD 104 as measured by the inertial sensors of the HMD 104 drift after some time of use of the HMD 104 by the user 106. For example, the position and orientation of the HMD 104 that are tracked by the inertial sensors of the HMD 104 become inaccurate and have errors after some time. In this case, the one or more images generated by the camera 118 of the real-world environment and/or the camera 108 are used by the one or more servers of the game cloud system 116 to adjust the inaccurate position and the inaccurate orientation of the HMD 104. For example, when the inaccurate orientation is measured by the inertial sensors of the HMD 104 is (X1,Y1,Z1) and an orientation of the HMD 104 derived from the one or more images by the one or more servers of the game cloud system 116 is (X2,Y2,Z2), the one or more servers of the game cloud system 116 determine that the orientation of the HMD 104 is (X2,Y2,Z2) and not (X1,Y1,Z1). As such, the one or more servers of the game cloud system 116 correct for the drift in the inertial sensors of the HMD 104.

In an embodiment, the camera 108 pre-scans the real-world environment surrounding the camera 108 to capture images of an object having the reference point RA and one or more additional objects having one or more other reference points in the real-world environment. For example, before execution of the application for game play, the camera 108 captures the images of the real-world environment. Before the game play, the HMD 104 can display an instruction for the user 106 to move his/her head to obtain a partial view or a full view, such as a 360 degree view, of the real-world environment. Upon viewing the instruction, the user 106 moves his or her head and the camera 108 of the HMD 104 captures the images of the object and the one or more additional objects. The images are sent via the computing device 112 and the computer network 114 to the game cloud system 116. The game cloud system 116 identifies from the images the objects and fixes the reference points. During game play or execution of the application, the camera 108 captures one or more additional images having the reference point RA and one or more other reference points of the real-world environment, and sends the images to the game cloud system 116 via the computing device 112 and the computer network 114. The game cloud system 116 determines a movement of the HMD 104 with respect to the reference point RA and the one or more other reference points.

Figure 1C:
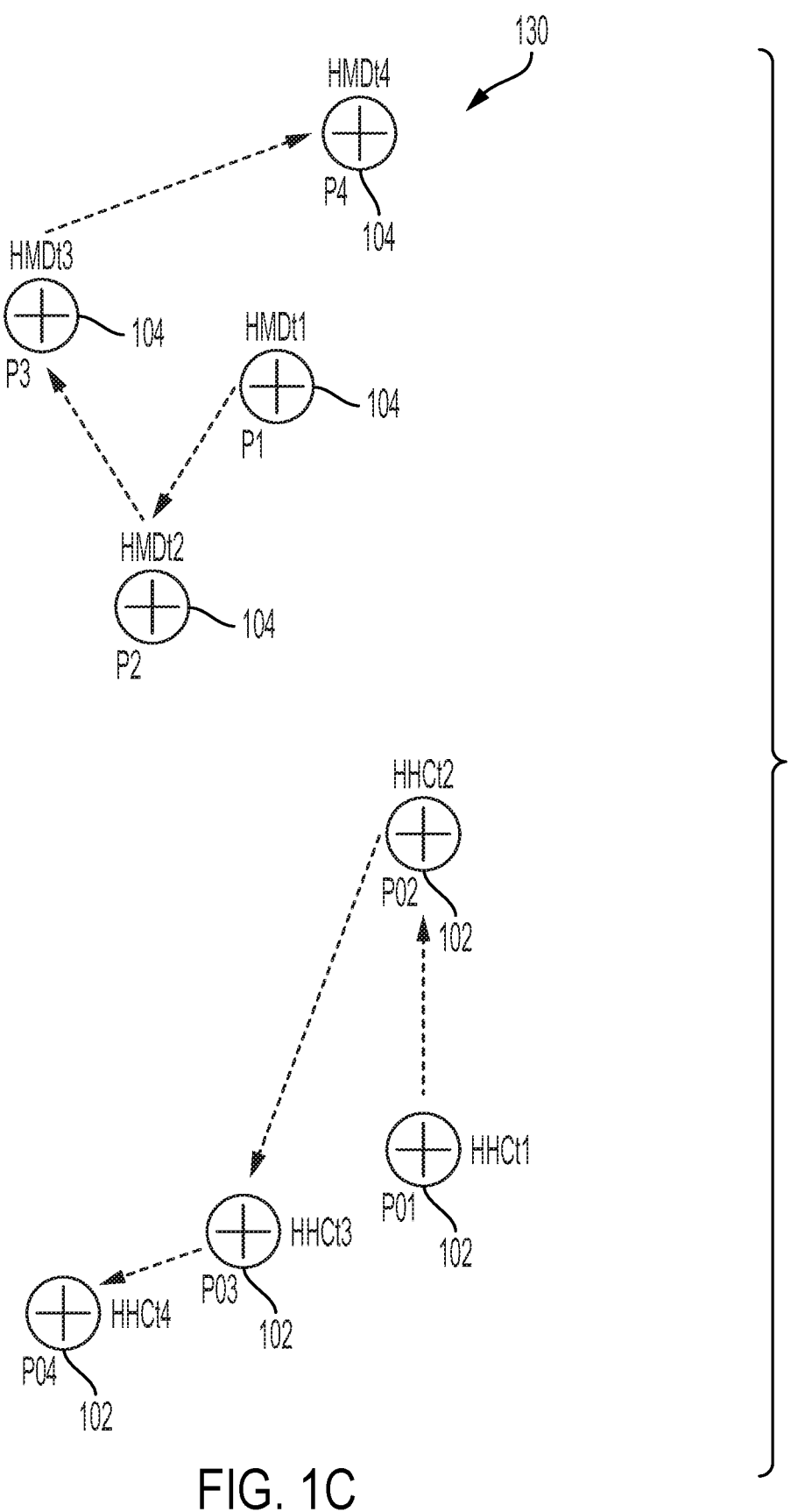
FIG. 1C is a diagram of an embodiment of a system to illustrate a reference point of the HMD when the HMD moves in a real-world environment.

FIG. 1C is a diagram of an embodiment of a system 130 to illustrate the reference point of the HMD 104 when the HMD 104 moves in the real-world environment. The HMD 104 moves when the user 106 of FIG. 1B moves. The reference point of the HMD 104 is at a position P1 at a time t1. At the time t1, the HHC 102 is at a position PO1 within the real-world environment. The position PO1 of the HHC 102 is determined with reference to the position P1 of the HMD 104 at the time t1. For example, at the time t1, the camera 108 of the HMD 104 captures one or more images that include the position PO1 of the controller HHC 102 with reference to the position P1 of the HMD 104. The one or more servers of the game cloud system 116 (FIG. 1A) receive the one or more images via the computing device 112 (FIG. 1A) and the computer network 114 (FIG. 1A) from the camera 108 to identify the position PO1 of the controller HHC 102 with reference to the position P1 of the HMD 104. The positions PO1 and P1 are then used by the one or more servers of the game cloud system 116 to execute the application to change the state of the virtual scene.

The reference point of the HMD 104 moves from the position P1 to a position P2 at a time t2. Also, at the time t2, the HHC 102 is at a position PO2 within the real-world environment. At the time t2, the camera 108 of the HMD 104 captures one or more images that include the position PO2 of the HHC 102 with reference to the position P2 of the HMD 104. The one or more servers of the game cloud system 116 receive the one or more images via the computing device 112 and the computer network 114 and identify the position PO2 of the HHC 102 with reference to the position P2 of the HMD 104 to change the state of the virtual scene based on the change in the position from PO1 to PO2 of the HHC 102 and the position from P1 to P2 of the HMD 104.

Similarly, at a time t3, the camera 108 captures a position PO3 of the HHC 102 with respect to a position P3 of the HMD 104 to facilitate the change in the state of the virtual scene. The state of the virtual scene changes based on the change in the position of the HMD 104 from the position P2 to the position P3 and the change in the position of the HMD 104 from the position PO2 to the position PO3. Also, at a time t4, the camera 108 captures a position PO4 of the HHC 102 with respect to a position P4 of the HMD 104 to facilitate the change in the state of the virtual scene. The state of the virtual scene changes based on the change in the position of the HMD 104 from the position P3 to the position P4 and the change in the position of the HMD 104 from the position PO3 to the position PO4.

Figure 1D:
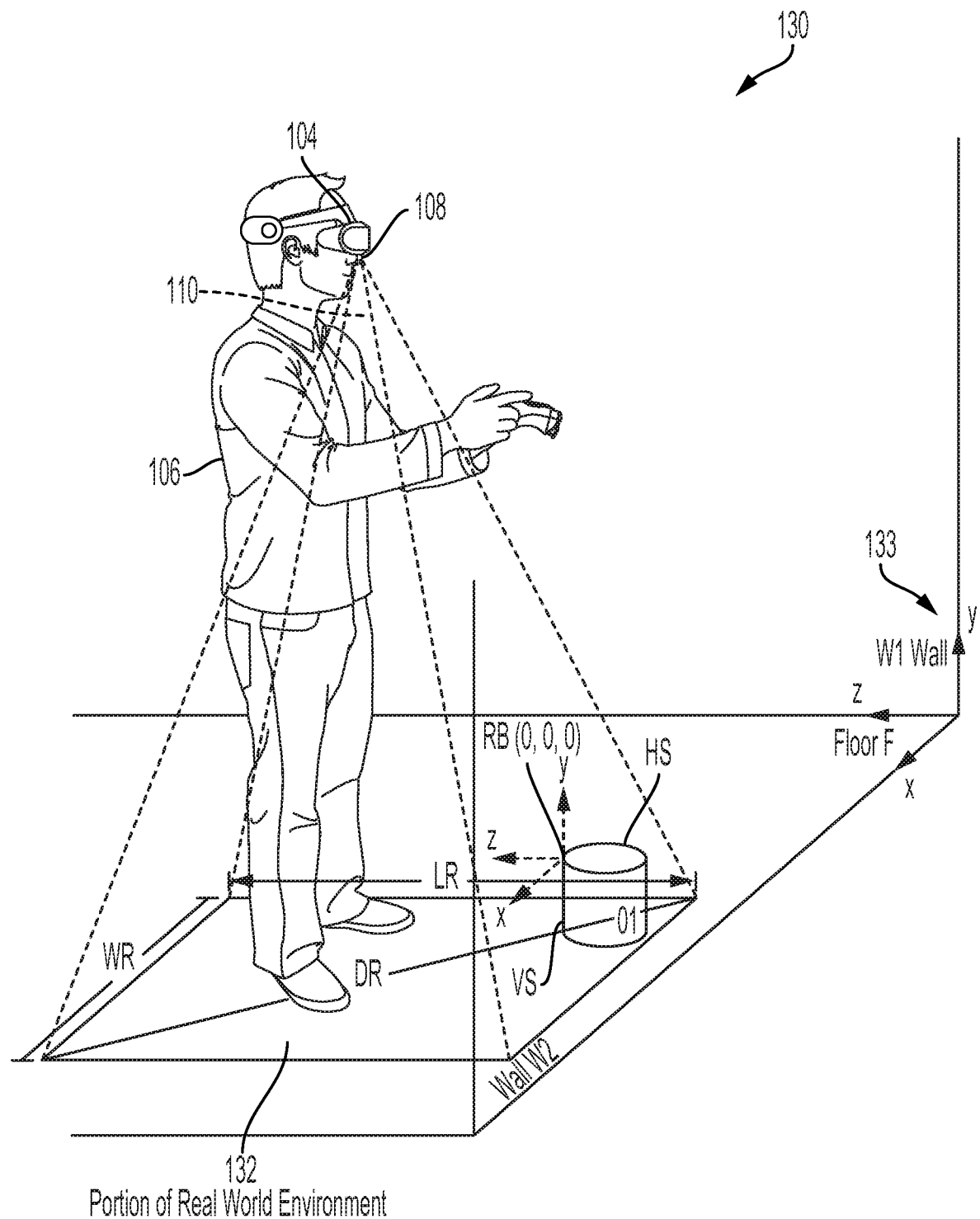
FIG. 1D is a diagram of an embodiment of a system to illustrate a three-dimensional volume of a field-of-view of the camera of the HMD.

FIG. 1D is a diagram of an embodiment of a system 130 to illustrate a three-dimensional volume, such as a polygonal volume, of the FOV 110 of the camera 108. The system 130 includes the HMD 104 and the real-world environment. The FOV 110 starts from the camera 108 and creates the three-dimensional volume that extends until a portion 132 located on a floor F of the real-world environment. The floor F is perpendicular to a wall W1 of the real-world environment and the wall W1 is perpendicular or substantially perpendicular to another wall W2 of the real-world environment. The floor F is also perpendicular or substantially perpendicular to the wall W2. The portion 132 is a rectangular portion that has a diagonal DR, a length LR, and a width WR. The length LR is sometimes referred to herein as a vertical range, the width WR is sometimes referred to herein as a horizontal range, and the diagonal DR is sometimes referred to herein as a diagonal range.

Within the FOV 110 is an object O1 that is placed on the floor F. The object O1 has a vertical surface VS and a horizontal surface HS. The horizontal surface HS is a top surface of the object O1 and is adjacent to the vertical surface VS. As an example, the horizontal surface HS is perpendicular or substantially perpendicular to the vertical surface VS. At an intersection of the horizontal surface HS and the vertical surface VS, a reference coordinate RB, such as an origin (0, 0, 0), of a reference coordinate system is located. The reference coordinate system having the reference coordinate RB on the object O1 is an xyz coordinate system of the real-world environment. The xyz coordinate system on the object O1 has the x-axis, the y-axis, and the z-axis.

The camera 108 captures one or more images of the object O1 and the portion 132 and the HMD 104 sends the images via the computing device 112 of FIG. 1A and the computer network 114 of FIG. 1A to the game cloud system 116 of FIG. 1A. The one or more servers of the game cloud system 116 identify the position of the camera 108 with respect to the reference coordinate RB and the position includes a distance along the x-direction from the reference coordinate RB on the object O1, a distance along the y-direction from the reference coordinate RB, and a distance along the z-direction from the reference coordinate RB. Also, the one or more servers of the game cloud system 116 identify the orientation of the camera 108 and the orientation includes an angle formed with respect to the reference coordinate RB with respect to the x-axis of the reference coordinate system on the object O1, an angle formed with respect to the y-axis of the reference coordinate system on the object O1, and an angle formed with respect to the z-axis of the reference coordinate system on the object O1.

In one embodiment, the portion 132 has another shape, such as a polygon shape or an oval shape or a circular shape or trapezoidal shape or rhombus shape.

In an embodiment, a reference co-ordinate system 133 of the real-world environment is located at an intersection of the wall W1, the wall W2, and the floor F. The reference co-ordinate system 133 includes an x axis, a y axis, and a z axis, and an intersection point of the x, y, and z axes is a reference point, such as an origin (0, 0, 0). The intersection point is at an intersection of the wall W1, the wall W2, and the floor F. The x-axis is in a direction of the wall W2 from the reference point, the y-axis is in a direction of the wall W1 from the reference point, and the z-axis is in a direction of the floor F from the reference point. The FOV 110 includes the reference point when an aperture of the camera 108 is directed towards the FOV 110.

Figure 2A:
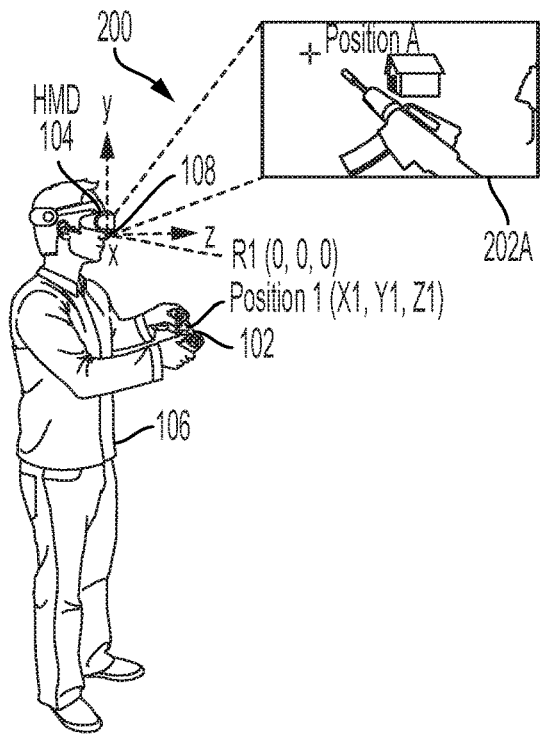
FIG. 2A is a diagram of an embodiment of a system to illustrate a position 1 of the HHC with respect to a reference coordinate system on the camera of the HMD.
Figure 2B:
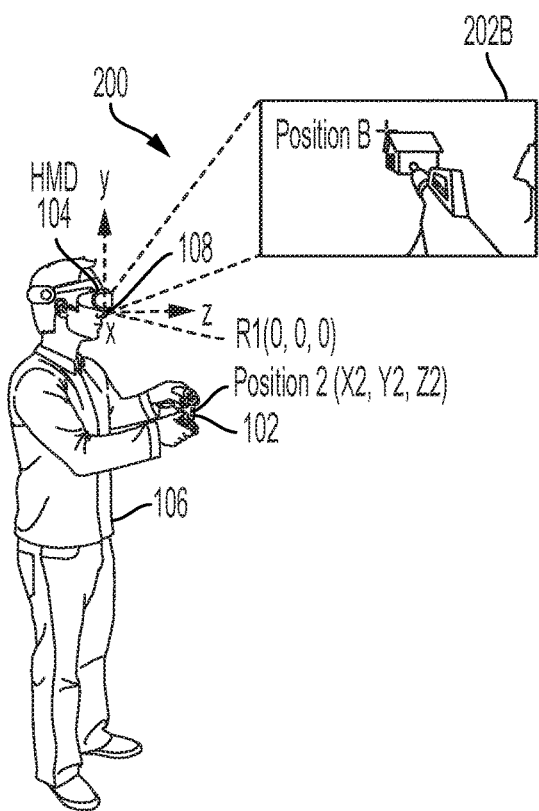
FIG. 2B is a diagram of an embodiment of a system to illustrate another position 2 of the HHC with respect to the reference coordinate system on the camera of the HMD.
Figure 2C:
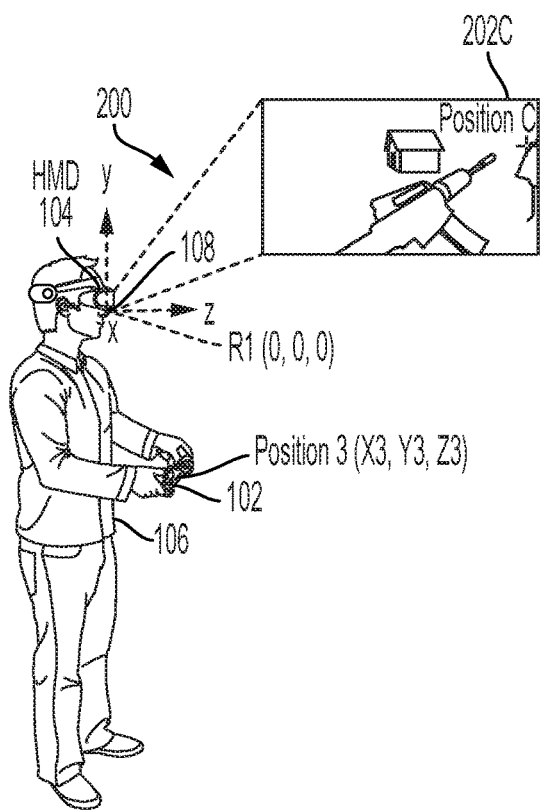
FIG. 2C is a diagram of an embodiment of a system to illustrate another position 3 of the HHC with respect to the reference coordinate system on the camera of the HMD.

FIGS. 2A-2C are diagrams of embodiments of a system 200 to illustrate a change in positions of the HHC 102 when the HMD 104 is held still and an effect of the change in the positions on virtual scenes that are displayed on the HMD 104. FIG. 2A is a diagram of an embodiment of the system 200 to illustrate a position 1 of the HHC 102 with respect to the reference coordinate system on the camera 108. The system 200 includes the HHC 102 and the HMD 104. The reference coordinate system on the camera 108 has a reference coordinate R1, such as an origin (0, 0, 0). The position 1 of the HHC 102 has coordinates (X1, Y1, Z1) with respect to the reference coordinate R1 of the reference coordinate system on the camera 108.

The camera 108 captures one or more images of the HHC 102 at the position 1 and sends the images via the computing device 112 (FIG. 1A) and the computer network 114 (FIG. 1A) to the game cloud system 116 (FIG. 1A). The game cloud system 116 determines a change in the state of the virtual scene displayed on a display screen of the HMD 104 based on the position 1 identified from the images to generate one or more frames having a state of a virtual scene 202A to be displayed on the HMD 104. A virtual scene is sometimes referred to herein as an image scene. The frames having the state of the virtual scene 202A are encoded by the game cloud system 116 to output one or more encoded frames. The one or more encoded frames having the state of the virtual scene 202A are sent from the game cloud system 116 via the computer network 114 to the computing device 112. The computing device 114 decodes the encoded frames having the state of the virtual scene 202A to output one or more frames and sends the one or more frames via the wired or wireless connection to the HMD 104 for display of the virtual scene 202A on the HMD 104. The virtual scene 202A includes one or more virtual objects, such as a virtual house, a virtual gun, a virtual tree, and a virtual crosshair. The virtual crosshair in the virtual scene 202A has a position A, which is determined by the game cloud system 116 based on the position 1 of the HHC 102 with respect to the reference coordinate R1 on the camera 108.

FIG. 2B is a diagram of an embodiment of the system 200 to illustrate another position 2 of the HHC 102 with respect to the reference coordinate system on the camera 108. There is none or minimal movement of the HMD 104 compared to the position of the HMD 104 illustrated in FIG. 2A. The reference coordinate system on the camera 108 has the same reference coordinate R1. For example, the reference coordinate R1 is at a position within the real-world environment that is at the same location or substantially at the same location with respect to the camera 118 (FIG. 1A). The position 2 of the HHC 102 has coordinates (X2, Y2, Z2) with respect to the reference coordinate R1 of the reference coordinate system on the camera 108. The position 2 of the HHC 102 is achieved when the user 106 moves the HHC 102 to his/her right compared to the position 1 (FIG. 2A) of the HHC 102.

The camera 108 captures one or more images of the HHC 102 at the position 2 and sends the images via the computing device 112 (FIG. 1A) and the computer network 114 (FIG. 1A) to the game cloud system 116 (FIG. 1A). The game cloud system 116 determines a change in the state of the virtual scene based on the position 2 identified from the images to generate one or more frames having a state of a virtual scene 202B to be displayed on the HMD 104. The frames having the state of the virtual scene 202B are encoded by the game cloud system 116 to output one or more encoded frames. The one or more encoded frames having the state of the virtual scene 202B are sent from the game cloud system 116 via the computer network 114 to the computing device 112. The computing device 114 decodes the encoded frames having the state of the virtual scene 202B to output one or more frames and sends the one or more frames via the wired or wireless connection to the HMD 104 for display of the virtual scene 202B on the HMD 104. The virtual scene 202B includes the virtual objects described above with reference to FIG. 2A. The virtual crosshair in the virtual scene 202B has a position B, which is determined by the game cloud system 116 based on the position 2 of the HHC 102. It should be noted that the position B has moved to the right of the position A of the virtual crosshair within the scene 202A.

FIG. 2C is a diagram of an embodiment of the system 200 to illustrate yet another position 3 of the HHC 102 with respect to the reference coordinate system on the camera 108. The reference coordinate system on the camera 108 has the same reference coordinate R1. The position 3 of the HHC 102 has coordinates (X3, Y3, Z3) with respect to the reference coordinate R1 of the reference coordinate system on the camera 108. The position 3 of the HHC 102 is achieved when the user 106 moves the HHC 102 to his/her right compared to the position 2 (FIG. 2B) of the HHC 102.

The camera 108 captures one or more images of the HHC 102 at the position 3 and sends the images via the computing device 112 (FIG. 1A) and the computer network 114 (FIG. 1A) to the game cloud system 116 (FIG. 1A). The game cloud system 116 determines a change in the state of the virtual scene based on the position 3 identified from the images to generate one or more frames having a state of a virtual scene 202C to be displayed on the HMD 104. The frames having the state of the virtual scene 202C are encoded by the game cloud system 116 to output one or more encoded frames. The one or more encoded frames having the state of the virtual scene 202C are sent from the game cloud system 116 via the computer network 114 to the computing device 112. The computing device 114 decodes the encoded frames having the state of the virtual scene 202C to output one or more frames and sends the one or more frames via the wired or wireless connection to the HMD 104 for display of the virtual scene 202C on the HMD 104. The virtual scene 202C includes the virtual objects described above with reference to FIG. 2A. The virtual crosshair in the virtual scene 202C has a position C, which is determined by the game cloud system 116 based on the position 3 of the HHC 102. It should be noted that the position C has moved to the right of the position B of the virtual crosshair within the scene 202B.

It should be noted that in FIGS. 2A-2C, there is none or minimal movement in the camera 108 when there is none or minimal movement of the head of the user 106. The head of the user 106 is still or substantially still in FIGS. 2A-2C.

In one embodiment, the virtual scene 202B includes one or more additional virtual objects compared to those in the virtual scene 202A or excludes one or more of the virtual objects shown in the virtual scene 202A. Similarly, the virtual scene 202C includes one or more additional virtual objects compared to those in the virtual scene 202A or excludes one or more of the virtual objects shown in the virtual scene 202A.

In an embodiment, when the HHC 102 is at the position 1, the HHC 102 is at an orientation A with respect to the reference coordinate system on the camera 108. The orientation A forms an angle of (angle X1, angle Y1, angle Z1). The angle X1 is formed with reference to the X axis of the reference coordinate system on the camera 108, the angle Y1 is formed with respect to the Y axis of the reference coordinate system on the camera 108 and the angle Z1 is formed with respect to the Z axis of the reference coordinate system on the camera 108. Similarly, when the HHC 102 is at the position 2, the HHC 102 is at an orientation B with respect to the reference coordinate system on the camera 108. The orientation B forms an angle of (angle X2, angle Y2, angle Z2). The angle X2 is formed with reference to the X axis of the reference coordinate system on the camera 108, the angle Y2 is formed with respect to the Y axis of the reference coordinate system on the camera 108 and the angle Z2 is formed with respect to the Z axis of the reference coordinate system on the camera 108. Also, when the HHC 102 is at the position 3, the HHC 102 is at an orientation C with respect to the reference coordinate system on the camera 108. The orientation C forms an angle of (angle X3, angle Y3, angle Z3). The angle X3 is formed with reference to the X axis of the reference coordinate system on the camera 108, the angle Y3 is formed with respect to the Y axis of the reference coordinate system on the camera 108 and the angle Z3 is formed with respect to the Z axis of the reference coordinate system on the camera 108. In an embodiment, the angle X1 is the same as the angles X2 and X3, the angle Y1 is the same as the angles Y2 and Y3 and the angle Z1 is the same as the angles Z2 and Z3.

FIGS. 3A-3C are diagrams of embodiments of the system 200 to illustrate a change in positions of the HMD 104 when the HHC 102 is held still or substantially still and an effect of the change in the positions on virtual scenes that are displayed on the HMD 104. FIG. 3A is a diagram of an embodiment of the system 200 to illustrate a position a of the HMD 104 with respect to the reference coordinate system of the real-world environment. The reference coordinate system of the real-world environment can be at a location of the camera (not shown) on the HHC 102 or at a location of the camera 118 (FIG. 1A) or at a point on a structure, such as a wall or a floor or an object, within the real-world environment. The reference coordinate system on the camera 108 has the reference coordinate R1, which is at a position a with respect to the reference coordinate system of the real-world environment. The position a of the HMD 104 has coordinates (xa, ya, za) with respect to the reference coordinate system of the real-world environment. Moreover, the HHC 102 is at the position 1 with reference to the HMD 104.

A camera of the real-world environment, such as the camera 118 or the camera (not shown) on the HHC 102, captures one or more images of the HMD 104 at the position a and sends the images via the computing device 112 (FIG. 1A) and the computer network 114 (FIG. 1A) to the game cloud system 116 (FIG. 1A). The game cloud system 116 determines a change in the state of the virtual scene displayed on a display screen of the HMD 104 based on the position a identified from the images to generate one or more frames having the state of the virtual scene 202A to be displayed on the HMD 104. The frames having the state of the virtual scene 202A are encoded and sent from the game cloud system 116 via the computer network 114 and the computing device 112 for display of the virtual scene 202A on the HMD 104. The virtual crosshair in the virtual scene 202A has the position A, which is determined by the game cloud system 116 based on the position 1 of the HHC 102 with respect to the reference coordinate R1 on the camera 108 of the HMD 104.

FIG. 3B is a diagram of an embodiment of the system 200 to illustrate a position b of the HMD 104 with respect to the reference coordinate system of the real-world environment. The reference coordinate system on the camera 108 has a reference coordinate R2, which is at a position b with respect to the reference coordinate system of the real-world environment. The position b of the HMD 104 has coordinates (xb, yb, zb) with respect to the reference coordinate system of the real-world environment. Also, the HHC 102 is at the position 1 with reference to the HMD 104. The HHC 102 is at the same location or substantially at the same location with respect to the camera 108 of the HMD 104 and there is none or minimal movement between the position 1 of the HHC 102 illustrated in FIG. 3A and the position 1 illustrated in FIG. 3B.

The camera of the real-world environment captures one or more images of the HMD 104 at the position b and sends the images via the computing device 112 (FIG. 1A) and the computer network 114 (FIG. 1A) to the game cloud system 116 (FIG. 1A). The game cloud system 116 determines a change in the state of the virtual scene displayed on a display screen of the HMD 104 based on the position b identified from the images to generate one or more frames having a state of a virtual scene 302A to be displayed on the HMD 104. The one or more frames having the state of the virtual scene 302A are encoded by the game cloud system 116 to output one or more encoded frames. The one or more encoded frames having the state of the virtual scene 302A are sent from the game cloud system 116 via the computer network 114 to the computing device 112. The computing device 112 decodes the encoded frames having the state of the virtual scene 302A to output one or more frames and sends the frames to the HMD 104 via the wired or wireless connection. The HMD 104 receives the frames having the state of the virtual scene 302A and displays the virtual scene 302A on the display screen of the HMD 104. The virtual scene 302A has a partial image of the virtual house compared to a complete image of the virtual house in the virtual scene 202A. Moreover, the virtual scene 302A has a complete image of the virtual tree compared to a partial image of the virtual tree in the virtual scene 202A. Also, the virtual scene 302A has the virtual crosshair that is pointing at the virtual house compared to the virtual scene 202A in which the virtual crosshair is not pointing at the virtual house but to a portion of a virtual background of the virtual scene 202A. In the virtual scene 302A, due to a movement of the HMD 104 to the right compared to the position a of the HMD 104 in FIG. 3A, all virtual objects within the virtual scene 302A move to the left compared to the virtual scene 202A.

The virtual crosshair in the virtual scene 302A has the same position A, which is determined by the game cloud system 116 based on the position 1 of the HHC 102 with respect to the reference coordinate R1 of the camera 108 instead of the reference coordinate R2 of the camera 108. The position 1 of the HHC 102 is determined with reference to the position a of the HMD 104 even though the HMD 104 has moved to the position b from the position a. For example, the camera 108 captures one or more images of the HHC 102 at the position 1 and sends the images via the wired or wireless connection to the computing unit 112. Also, the camera of the real-world environment captures one or more images of the HMD 104 at the position b and sends the images via the wired or wireless connection to the computing unit 112. The computing unit 112 sends the images of the HHC 102 at the position 1 and the images of the HMD 104 at the position b via the computer network 114 to the game cloud system 116.

The game cloud system 116 determines from the images the position 1 of the HHC 102 and the position b of the HMD 104. The game cloud system 116 determines that the position 1 of the HHC 102 has not changed and a position of the HMD 104 has changed from the position a to the position b. Upon determining that that the position 1 of the HHC 102 has not changed and a position of the HMD 104 has changed from the position a to the position b, the game cloud system 116 generates the state for the virtual scene 302A in which the position A of the virtual crossbar stays the same as that in the virtual scene 202A. The game cloud system 116 ignores the change in the position of the HMD 104 from the position a to the position b upon determining that the position 1 of the HHC 102 has not changed. Although there is a change from a relative position between the HHC 102 at the position 1 and the HMD 104 at the position a to a relative position between the HHC 102 at the position 1 and the HMD 104 at the position b, the game cloud system 116 does not change the position A of the virtual crossbar. Rather, virtual objects, such as the virtual tree and the virtual house in the virtual scene 202A are moved.

FIG. 3C is a diagram of an embodiment of the system 200 to illustrate a position c of the HMD 104 with respect to the reference coordinate system of the real-world environment. The reference coordinate system on the camera 108 has a reference coordinate R3, which is at a position c with respect to the reference coordinate system of the real-world environment. The position c of the HMD 104 has coordinates (xc, yc, zc) with respect to the reference coordinate system of the real-world environment. Also, the HHC 102 is at the position 1 with reference to the HMD 104. There is no change or minimal change in movement of the HHC 102 from the position 1 illustrated in FIG. 3B.

The camera of the real-world environment captures one or more images of the HMD 104 at the position c and sends the images via the computing device 112 (FIG. 1A) and the computer network 114 (FIG. 1A) to the game cloud system 116 (FIG. 1A). The game cloud system 116 determines a change in the state of the virtual scene displayed on a display screen of the HMD 104 based on the position c identified from the images to generate one or more frames having a state of a virtual scene 302B to be displayed on the HMD 104. The one or more frames having the state of the virtual scene 302B are encoded by the game cloud system 116 to output one or more encoded frames. The one or more encoded frames having the state of the virtual scene 302B are sent from the game cloud system 116 via the computer network 114 to the computing device 112. The computing device 112 decodes the encoded frames having the state of the virtual scene 302B to output one or more frames and sends the frames to the HMD 104 via the wired or wireless connection. The HMD 104 receives the frames having the state of the virtual scene 302B and displays the virtual scene 302B on the display screen of the HMD 104. The virtual scene 302B does not have an image of the virtual house compared the partial image of the virtual house in the virtual scene 302A. Moreover, the virtual scene 302B has a partial image of the virtual tree compared to the complete image of the virtual tree in the virtual scene 302A. Also, the virtual scene 302B has the virtual crosshair that is pointing at the virtual tree compared to the virtual scene 302A in which the virtual crosshair is pointing at the virtual house. In the virtual scene 302B, due to a movement of the HMD 104 to the right compared to the position b of the HMD 104 in FIG. 3B, all virtual objects within the virtual scene 302B move to the left compared to the virtual scene 302A.

The virtual crosshair in the virtual scene 302B has the same position A, which is determined by the game cloud system 116 based on the position 1 of the HHC 102 with respect to the reference coordinate R1 of the camera 108 instead of the reference coordinate R3 of the camera 108. The position 1 of the HHC 102 is determined with reference to the position a of the HMD 104 even though the HMD 104 has moved to the position c from the position b. For example, the camera 108 captures one or more images of the HHC 102 at the position 1 and sends the images via the wired or wireless connection to the computing unit 112. Also, the camera of the real-world environment captures one or more images of the HMD 104 at the position c and sends the images via the wired or wireless connection to the computing unit 112. The computing unit 112 sends the images of the HHC 102 at the position 1 and the images of the HMD 104 at the position c via the computer network 114 to the game cloud system 116.

The game cloud system 116 determines from the images the position 1 of the HHC 102 and the position c of the HMD 104. The game cloud system 116 determines that the position 1 of the HHC 102 has not changed and a position of the HMD 104 has changed from the position b to the position c. Upon determining that that the position 1 of the HHC 102 has not changed and a position of the HMD 104 has changed from the position b to the position c, the game cloud system 116 generates the state for the virtual scene 302B in which the position A of the virtual crossbar stays the same as that in the virtual scene 202A. The game cloud system 116 ignores the change in the position of the HMD 104 from the position b to the position c upon determining that the position 1 of the HHC 102 has not changed. Although there is a change from a relative position between the HHC 102 at the position 1 and the HMD 104 at the position b to a relative position between the HHC 102 at the position 1 and the HMD 104 at the position c, the game cloud system 116 does not change the position A of the virtual crossbar.

It should be noted that in FIGS. 3A-3C, there is none or minimal movement in the HHC 102 when there is none or minimal movement of the hands of the user 106. The hands of the user 106 are still or substantially still in FIGS. 3A-3C.

In one embodiment, the virtual scene 302A includes one or more additional virtual objects compared to those in the virtual scene 202A or excludes one or more of the virtual objects shown in the virtual scene 202A. Similarly, the virtual scene 302B includes one or more additional virtual objects compared to those in the virtual scene 202A or excludes one or more of the virtual objects shown in the virtual scene 202A.

FIGS. 4A-4C are diagrams of embodiments of the system 200 to illustrate a change in positions of the HMD 104 simultaneous with a change in positions of the HHC 102 and an effect of the change in the positions on virtual scenes that are displayed on the HMD 104. FIG. 4A is a diagram of an embodiment of the system 200 to illustrate the position a of the HMD 104 with respect to the reference coordinate system of the real-world environment and the position 1 of the HHC 102 with respect to the reference co-ordinate R1 of the camera 108. Also, the HHC 102 is at the position 1 with reference to the HMD 104.

The camera of the real-world environment captures one or more images of the HMD 104 at the position a and the camera 108 captures one or more images of the HHC 102 at the position 1. The images captured by the camera of the real-world environment and the camera 108 are sent via the computing device 112 (FIG. 1A) and the computer network 114 (FIG. 1A) to the game cloud system 116 (FIG. 1A). The game cloud system 116 determines a change in the state of the virtual scene displayed on a display screen of the HMD 104 based on the position a identified from the images of the HMD 104 and the position 1 identified from the images of the HHC 102 to generate one or more frames having the state of the virtual scene 202A to be displayed on the HMD 104. The frames having the state of the virtual scene 202A are encoded and sent from the game cloud system 116 via the computer network 114 and the computing device 112 for display of the virtual scene 202A on the HMD 104. The virtual crosshair in the virtual scene 202A has the position A, which is determined by the game cloud system 116 based on the position 1 of the HHC 102 with respect to the reference coordinate R1 on the camera 108 of the HMD 104.

FIG. 4B is a diagram of an embodiment of the system 200 to illustrate the position b of the HMD 104 with respect to the reference coordinate system of the real-world environment while the HHC 102 is at the position 2. The camera 108 captures one or more images of the HHC 102 at the position 2 and sends the images via the wired or wireless connection to the computing unit 112. Also, the camera of the real-world environment captures one or more images of the HMD 104 at the position b and sends the images via the wired or wireless connection to the computing unit 112. The computing unit 112 sends the images of the HHC 102 at the position 2 and the images of the HMD 104 at the position b via the computer network 114 to the game cloud system 116. The game cloud system 116 determines a change in the state of the virtual scene displayed on a display screen of the HMD 104 based on the positions 2 and b identified from the images to generate one or more frames having a state of a virtual scene 402A to be displayed on the HMD 104. The one or more frames having the state of the virtual scene 402A are encoded by the game cloud system 116 to output one or more encoded frames. The one or more encoded frames having the state of the virtual scene 402A are sent from the game cloud system 116 via the computer network 114 to the computing device 112. The computing device 112 decodes the encoded frames having the state of the virtual scene 402A to output one or more frames and sends the frames to the HMD 104 via the wired or wireless connection. The HMD 104 receives the frames having the state of the virtual scene 402A and displays the virtual scene 402A on the display screen of the HMD 104. The virtual scene 402A has a partial image of the virtual house compared to a complete image of the virtual house in the virtual scene 202A. Moreover, the virtual scene 402A has a complete image of the virtual tree compared to a partial image of the virtual tree in the virtual scene 202A. Also, the virtual scene 402A has the virtual crosshair that is pointing at a different location compared to the virtual scene 202A in which the virtual crosshair is pointing to another location. In the virtual scene 402A, due to a movement of the HMD 104 to the right compared to the position a of the HMD 104 in FIG. 4A, all virtual objects within the virtual scene 402A move to the left compared to the virtual scene 202A.

Also, the virtual crosshair in the virtual scene 402A has the position B, which is determined by the game cloud system 116 based on the position 2 of the HHC 102 with respect to the reference coordinate R1 of the camera 108 instead of the reference coordinate R2 of the camera 108. The position 2 of the HHC 102 is determined with reference to the position a of the HMD 104 even though the HMD 104 has moved to the position b from the position a. For example, the game cloud system 116 determines from the images received from the camera 108 and the camera of the real-world environment, the position 2 of the HHC 102 and the position b of the HMD 104. The game cloud system 116 determines that the position 1 of the HHC 102 has changed to the position 2 with respect to the previous position a of the HMD 104 and a position of the HMD 104 has changed from the position a to the position b. Upon determining that that the position 1 of the HHC 102 has changed to the position 2 with respect to the previous position a of the HMD 104 and a position of the HMD 104 has changed from the position a to the position b, the game cloud system 116 generates the state for the virtual scene 402A in which the position A of the virtual crossbar changes to the position B in the virtual scene 402A. The game cloud system 116 ignores the change in the position of the HMD 104 from the position a to the position b in determining the position B of the virtual crossbar. Although there is a change from a relative position between the HHC 102 at the position 1 and the HMD 104 at the position a to a relative position between the HHC 102 at the position 2 and the HMD 104 at the position b, the game cloud system 116 does not consider the change in the position of the HMD 104 to determine the position B of the virtual crossbar.

FIG. 4C is a diagram of an embodiment of the system 200 to illustrate the position c of the HMD 104 with respect to the reference coordinate system of the real-world environment while the HHC 102 is at the position 3. The camera 108 captures one or more images of the HHC 102 at the position 3 and sends the images via the wired or wireless connection to the computing unit 112. Also, the camera of the real-world environment captures one or more images of the HMD 104 at the position c and sends the images via the wired or wireless connection to the computing unit 112. The computing unit 112 sends the images of the HHC 102 at the position 3 and the images of the HMD 104 at the position c via the computer network 114 to the game cloud system 116. The game cloud system 116 determines a change in the state of the virtual scene displayed on a display screen of the HMD 104 based on the positions 3 and c identified from the images to generate one or more frames having a state of a virtual scene 402B to be displayed on the HMD 104.

The one or more frames having the state of the virtual scene 402B are encoded by the game cloud system 116 to output one or more encoded frames. The one or more encoded frames having the state of the virtual scene 402B are sent from the game cloud system 116 via the computer network 114 to the computing device 112. The computing device 112 decodes the encoded frames having the state of the virtual scene 402B to output one or more frames and sends the frames to the HMD 104 via the wired or wireless connection. The HMD 104 receives the frames having the state of the virtual scene 402B and displays the virtual scene 402B on the display screen of the HMD 104. The virtual scene 402B does not have an image of the virtual house compared to the partial image of the virtual house in the virtual scene 402A. Moreover, the virtual scene 402C has a partial image of the virtual tree compared to the complete image of the virtual tree in the virtual scene 402A. Also, the virtual scene 402B has the virtual crosshair that is pointing at a different location in the virtual scene 402B compared to the virtual scene 402A in which the virtual crosshair is pointing to another location. The virtual crosshair is at the position C in the virtual scene 402B and is at the position B in the virtual scene 402A. In the virtual scene 402B, due to a movement of the HMD 104 to the right compared to the position b of the HMD 104 in FIG. 4B, all virtual objects within the virtual scene 402B move to the left compared to the virtual scene 402A.

The position C of the virtual crosshair is determined by the game cloud system 116 based on the position 3 of the HHC 102 with respect to the reference coordinate R1 of the camera 108 instead of the reference coordinate R3 of the camera 108. The position 3 of the HHC 102 is determined with reference to the position a of the HMD 104 even though the HMD 104 has moved to the position c from the position b. For example, the game cloud system 116 determines from the images received from the camera 108 and the camera of the real-world environment, the position 3 of the HHC 102 and the position c of the HMD 104. The game cloud system 116 determines that the position 2 of the HHC 102 has changed to the position 3 with respect to the previous position a of the HMD 104 and a position of the HMD 104 has changed from the position b to the position c. Upon determining that that the position 2 of the HHC 102 has changed to the position 3 with respect to the previous position a of the HMD 104 and a position of the HMD 104 has changed from the position b to the position c, the game cloud system 116 generates the state for the virtual scene 402B in which the position B of the virtual crossbar changes to the position C in the virtual scene 402B. The game cloud system 116 ignores the change in the position of the HMD 104 from the position b to the position c in determining the position C of the virtual crossbar. Although there is a change from a relative position between the HHC 102 at the position 2 and the HMD 104 at the position b to a relative position between the HHC 102 at the position 3 and the HMD 104 at the position c, the game cloud system 116 does not consider the change in the position of the HMD 104 to determine the position C of the virtual crossbar.

It should be noted that a position of the virtual crossbar in a virtual scene is determined by the game cloud system 116 with respect to a point on a corner of the virtual scene. For example, a position of the virtual crossbar in the virtual scene 302A (FIG. 3B) is determined with reference to a point at a top right corner of the virtual scene 302A. Each virtual scene, described herein, has a polygonal shape, such as a rectangular shape or a square shape. The rectangular or square shape has four corners.

Figure 5A:
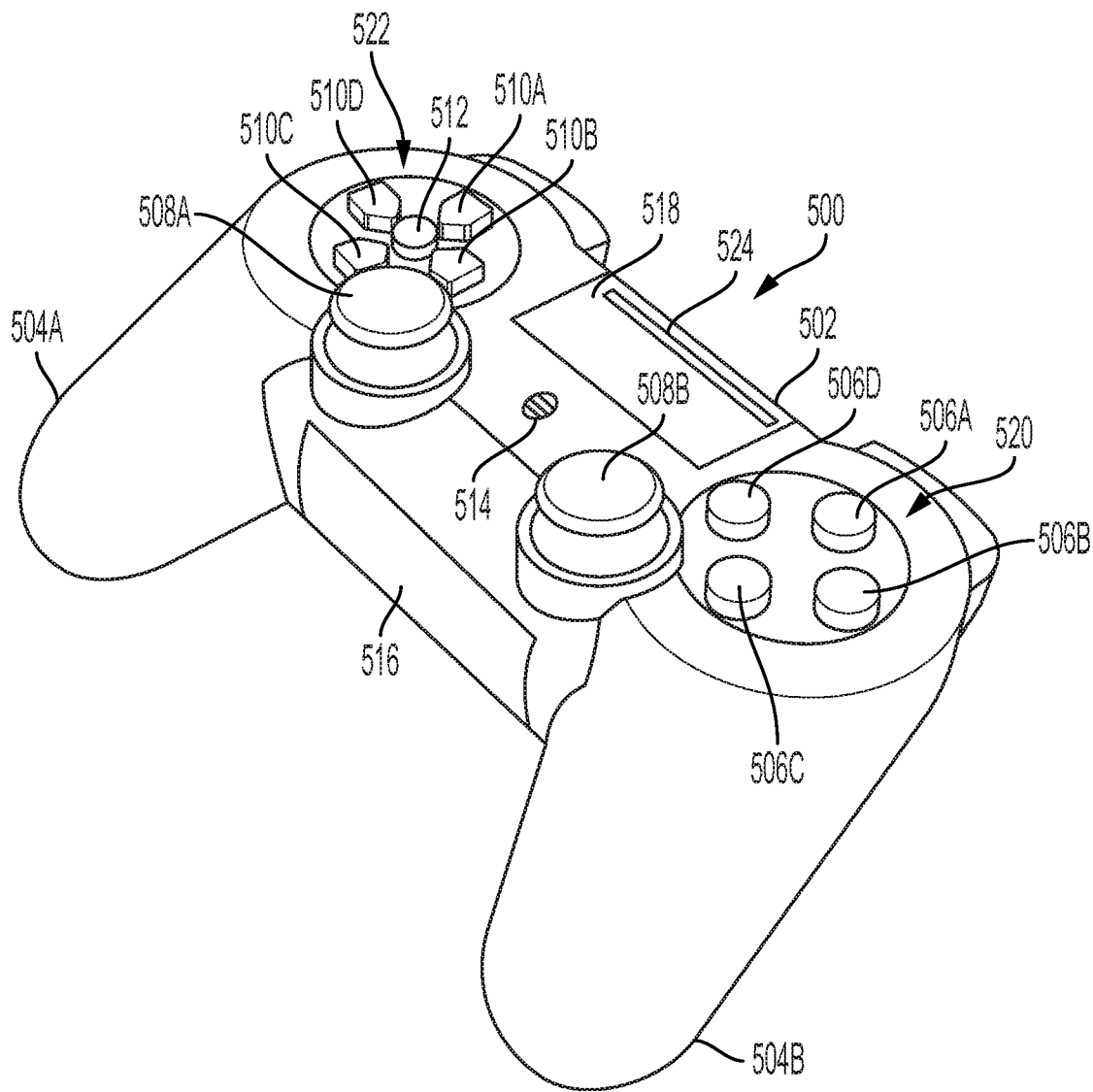
FIG. 5A is a perspective view of an embodiment of a video game controller for interfacing with an interactive program.

FIG. 5A illustrates a perspective view of a video game controller 500 for interfacing with an interactive program, such as the application executed by the game cloud system 116 (FIG. 1A), in accordance with an embodiment of described in the present disclosure. The video game controller 500 is an example of the HHC 102 of FIG. 1A. The video game controller 500 includes a main body 502 and extensions 504A and 504B that extend from the main body 502. The extension 504A and 504B are held by the user 106's (FIG. 1A) left and right hands, respectively, and thus function as handles to enable secure gripping of the video game controller 500 by the user 106. On a top surface of the main body 502, there are included various input devices, such as buttons 506A, 506B, 506C, and 506D, joysticks 508A and 508B, and multiple directional pads 510A, 510B, 510C, and 510D. Also shown is a top portion of a three-dimensional (3D) control bar 512 which extends through the main body 502 of the video game controller 500 from top to bottom. A speaker 514 is provided for playing sounds which provide feedback to the user 106.

Additionally, the video game controller 500 includes a touch panel 516 defined along the back side of the main body 502 which faces the user 106 when the extensions 504A and 504B are held by the user 106 in the left and right hands, respectively. The touch panel 516 is oriented in a substantially vertical fashion and situated between the extensions 504A and 504B so that the user 106 holding the extensions 504A and 504B can readily use the touch panel 516 with the thumb of either hand of the user 106. The touch panel 516 utilizes a touch-sensitive technology (e.g. resistive, capacitive, etc.) to detect touch gestures made by the user 106. In the illustrated embodiment, the touch panel 516 also has a slight outward curvature from top to bottom which provides a tactile sensation by virtue of its shape that enables the user 106 to readily determine an approximate vertical position of his/her thumb on the touch panel 516 based on feeling alone.

The video game controller 500 includes a touch pad 518. The touch pad 518 receives a touch or a selection, such as a click, from the user 106 to generate the input data. The touch pad 518 is located above the joysticks 508A and 508B and between a group 520 of the buttons 506A, 506B, 506C, and 506D and another group 522 of the directional pads 510A, 510B, 510C, and 510D. Underneath the touch pad 518, there is a light bar 524. The light bar 524 includes a light source, such as a string of light emitting diodes (LEDs) or a string of incandescent lights or an infrared light bar. Other examples of the light bar 524 include a reflective tape or a marker. The light bar 524 is visible to the camera 108 (FIG. 1A) via the touch pad 518. The light bar 524 is a part of the touch pad 518 and the part is made from a translucent material or a transparent material. The light bar 524 is powered by a battery within the video game controller 500.

Figure 5B:
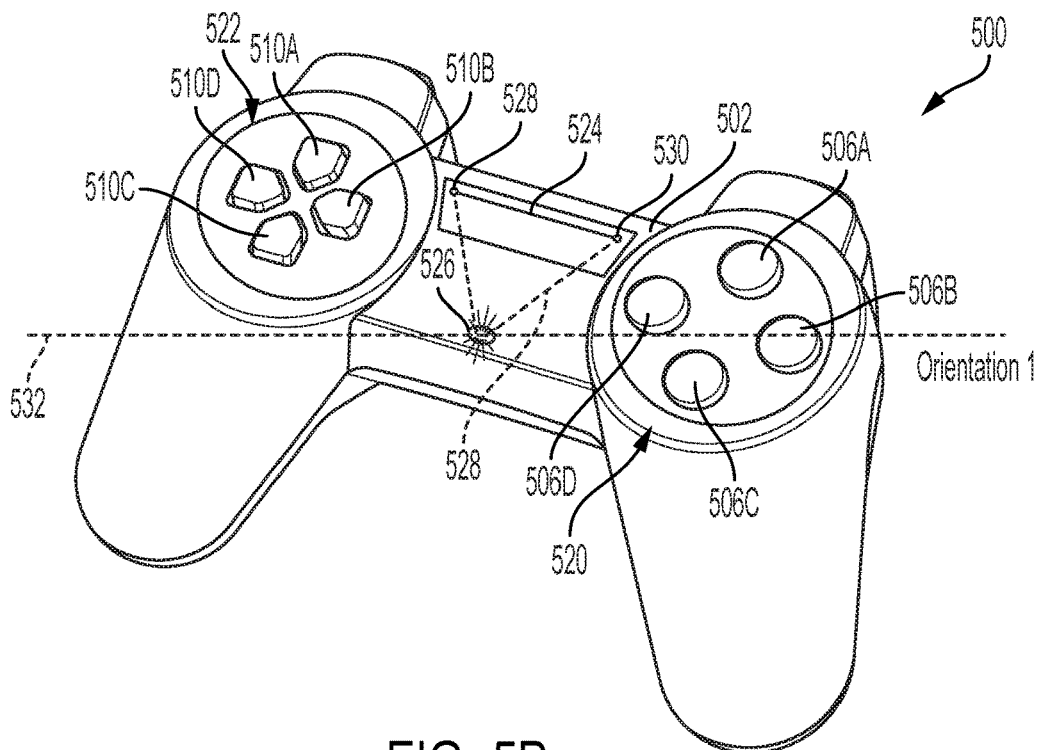
FIG. 5B is a diagram of an embodiment of the video game controller having an orientation 1 as viewed by the camera of the HMD.

FIG. 5B is a diagram of an embodiment of the video game controller 500 having an orientation 1 as viewed by the camera 108 of the HMD 104 (FIG. 1A). On the main body 502, there is a marker 526, which is located between the groups 520 and 522. Examples of the marker 526 include an LED light source or an incandescent light source or a reflective tape. The marker 526 is located at a vertex of a triangle 528. The remaining two vertices of the triangle 528 are formed by edge points 528 and 530 of the light bar 524.

The orientation 1 of the controller 500 includes an angle formed with respect to the X-axis on the camera 108, an angle formed with respect to the Y-axis on the camera 108, and an angle formed with respect to the Z-axis on the camera 108. For example, the orientation 1 is ($\theta 1$, $\phi 1$, $\gamma 1$), where $\theta 1$ is an angle formed with respect to the X-axis on the camera 108, $\phi 1$ is an angle formed with respect to the Y-axis on the camera 108, and $\gamma 1$ is an angle formed with respect to the Z-axis on the camera 108. The camera 108 captures one or more images of the orientation 1 in which the light bar 524, as viewed by the camera 108, is above a horizontal level 532 of the marker 526. When the light bar 524 is above the horizontal level 532, the edge points 528 and 530 of the light bar 524 are above the marker 526.

Figure 5C:
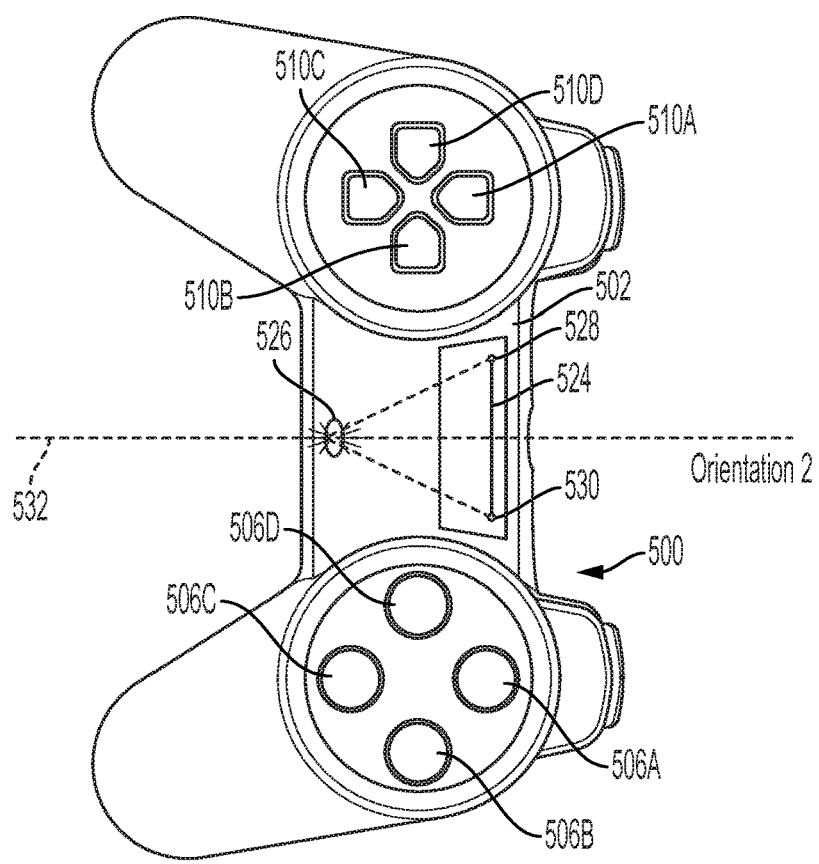
FIG. 5C is a diagram of an embodiment of the video game controller having an orientation 2 as viewed by the camera of the HMD.

FIG. 5C is a diagram of an embodiment of the video game controller 500 having an orientation 2 as viewed by the camera 108 of the HMD 104 (FIG. 1A). The orientation 2 is ($\theta 2$, $\phi 2$, $\gamma 2$), where $\theta 2$ is an angle formed with respect to the X-axis on the camera 108, $\phi 2$ is an angle formed with respect to the Y-axis on the camera 108, and $\gamma 2$ is an angle formed with respect to the Z-axis on the camera 108. The camera 108 captures one or more images of the orientation 2 in which the light bar 524, as viewed by the camera 108, is at the same horizontal level 532 or approximately same horizontal level 532 of the marker 526. When the light bar 524 is at the same horizontal level 532 or approximately the same horizontal level 532, the edge point 528 of the light bar 524 is above the marker 526 and the edge point 530 of the light bar 524 is below the marker 526.

Figure 5D:
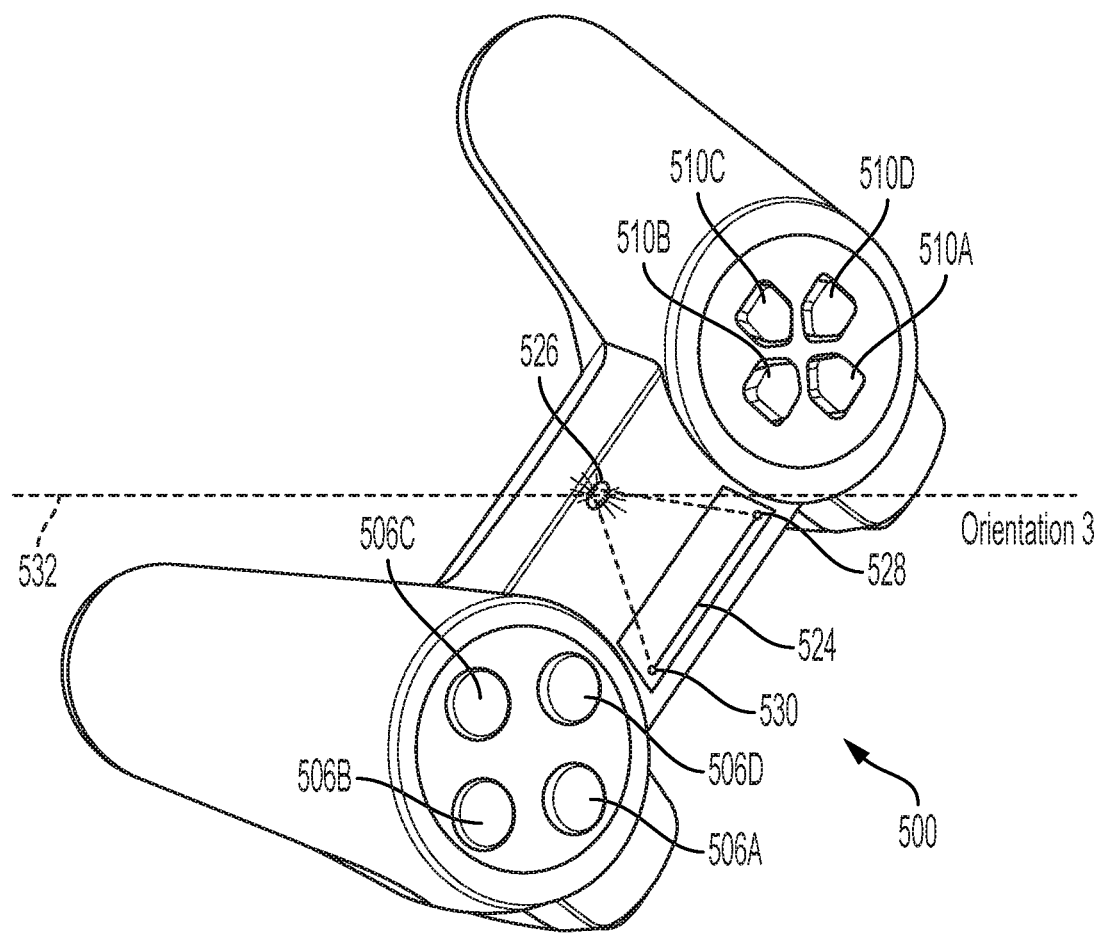
FIG. 5D is a diagram of an embodiment of the video game controller having an orientation 3 as viewed by the camera of the HMD.

FIG. 5D is a diagram of an embodiment of the video game controller 500 having an orientation 3 as viewed by the camera 108 of the HMD 104 (FIG. 1A). The orientation 3 is ($\theta 3$, $\phi 3$, $\gamma 3$), where $\theta 3$ is an angle formed with respect to the X-axis on the camera 108, $\phi 3$ is an angle formed with respect to the Y-axis on the camera 108, and $\gamma 3$ is an angle formed with respect to the Z-axis on the camera 108. The camera 108 captures one or more images of the orientation 3 in which the light bar 524, as viewed by the camera 108, is below the horizontal level 532 of the marker 526. When the light bar 524 is below the horizontal level 532, the edge points 528 and 530 the light bar 524 are located below the marker 526.

In one embodiment, the video game controller 500 includes one or more microphones for capturing sound from the real-world environment. As an example, the microphones are arranged as an array of microphones. The arrangement is a linear array of microphones. When three or more microphones are included in the array of microphones, it is possible to determine a location of a sound source relative to the microphone array based on analysis of audio data captured by the microphone array. More specifically, the sound source can be localized relative to the microphone array based on a relative timing of its sound as captured by each of the microphones of the microphone array. Taken in combination with a location and an orientation of the video game controller 500, and by extension the location and orientation of the microphone array, a location of the sound source within the interactive environment can be determined. Furthermore, the captured sound can be processed to exclude sounds which do not emanate from a certain region of the real-world environment.

Figure 6:
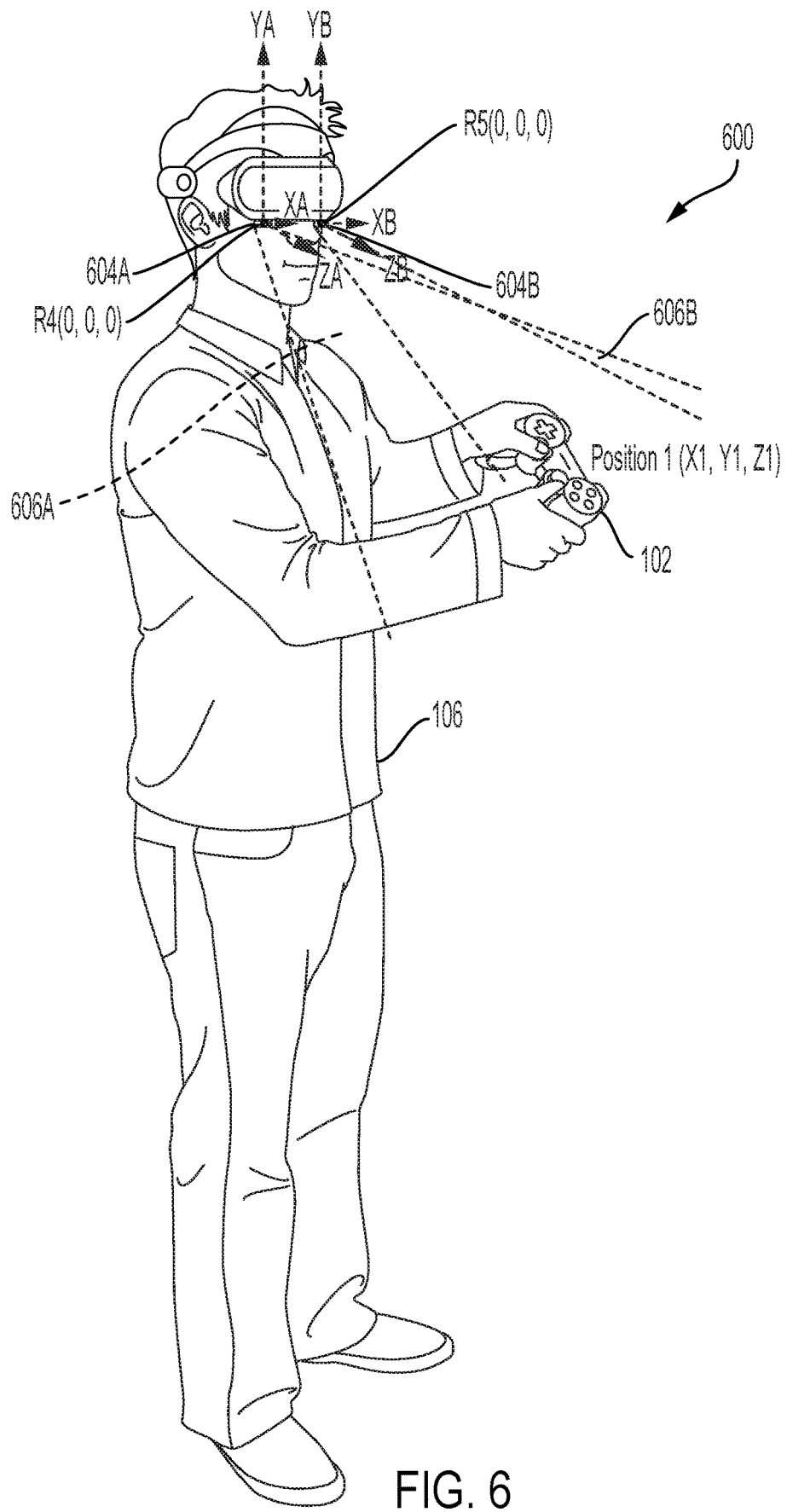
FIG. 6 is a diagram of an embodiment of a system to illustrate an HMD with multiple cameras.

FIG. 6 is a diagram of an embodiment of the system 600 to illustrate an HMD 602 with multiple cameras 604A and 604B. The cameras 604A and 604B are located at a lower region of the HMD 602. The lower region of the HMD 602 is below one or more display screens of the HMD 602. The HMD 602 is an example of the HMD 104 of FIG. 1A. For example, the camera 604B is an example of the camera 108 when the camera 108 is located closer to a left lower region of the HMD 104 instead of being located closer to a central lower region of the HMD 104.

The camera 604A is located on one end of the lower region of the HMD 602 and the camera 604B is located at an opposite end of the lower region. The camera 604A provides a reference coordinate system, such as an XAYAZA reference coordinate system, having a reference coordinate R4, such as an origin (0, 0, 0). Similarly, the camera 604B provides another reference coordinate system, such as an XBYBZB reference coordinate system, having a reference coordinate R5, such as an origin (0, 0, 0). The camera 604A has a field-of-view 606A that faces downward towards the controller 102 and the camera 604B has another field-of-view 606B that also faces downward towards the controller 102 when the controller 102 is held by the user 106 at a level that is below a horizontal level of the HMD 602. The camera 604A is coupled to the computing device 112 of FIG. 1A via a wired or wireless connection and the camera 604B is coupled to the computing device 112 via the wired or wireless connection.

The camera 604A captures one or more images of the HHC 102 within the field-of-view 606A and the camera 604B captures one or more images of the HHC 102 within the field-of-view 606B. The images captured by the cameras 604A and 604B are sent from the HMD 602 via the wired or wireless connection to the computing device 112 of FIG. 1A. The computing device 112 of FIG. 1A sends the images captured by the cameras 604A and 604B via the computer network 114 to the game cloud system 116 of FIG. 1A. The game cloud system 116 determines from the images captured by the cameras 604A and 604B the position 1 and an orientation of the HHC 102. As an example, the position 1 has a distance of XA1 from the reference coordinate R4, a distance of YA1 from the reference coordinate R4, and a distance of ZA1 from the reference coordinate R4. Similarly, the orientation of the HHC 102 as determined from the images captured by the camera 604A has an angle of θA1 from an XA axis of the XAYAZA reference coordinate system, an angle of ϕA1 from a YA axis of the XAYAZA reference coordinate system, and an angle of γA1 from a ZA axis of the XAYAZA reference coordinate system. As another example, the position 1 has a distance of XB1 from the reference coordinate R5, a distance of YB1 from the reference coordinate R5, and a distance of ZB1 from the reference coordinate R5. Similarly, the orientation of the HHC 102 as determined from the images captured by the camera 604B has an angle of OB1 from an XB axis of the XBYBZB reference coordinate system, an angle of OB1 from a YB axis of the XBYBZB reference coordinate system, and an angle of yB1 from a ZB axis of the XBYBZB reference coordinate system The game cloud system 116 modifies the state of the virtual scene based on the position 1 and the orientation of the HHC 102 as determined from the images captured by the cameras 604A and 604B. It should be noted that when the HHC 102 is outside the field-of-view 606A of the camera 604A, the camera 604B captures the images of the HHC 102. Similarly, when the HHC 102 is outside the field-of-view 606B of the camera 604B, the camera 604A captures the images of the HHC 102. There is more coverage of movement of the HHC 102 with both the cameras 604A and 604B than with the camera 108.

Figure 7A:
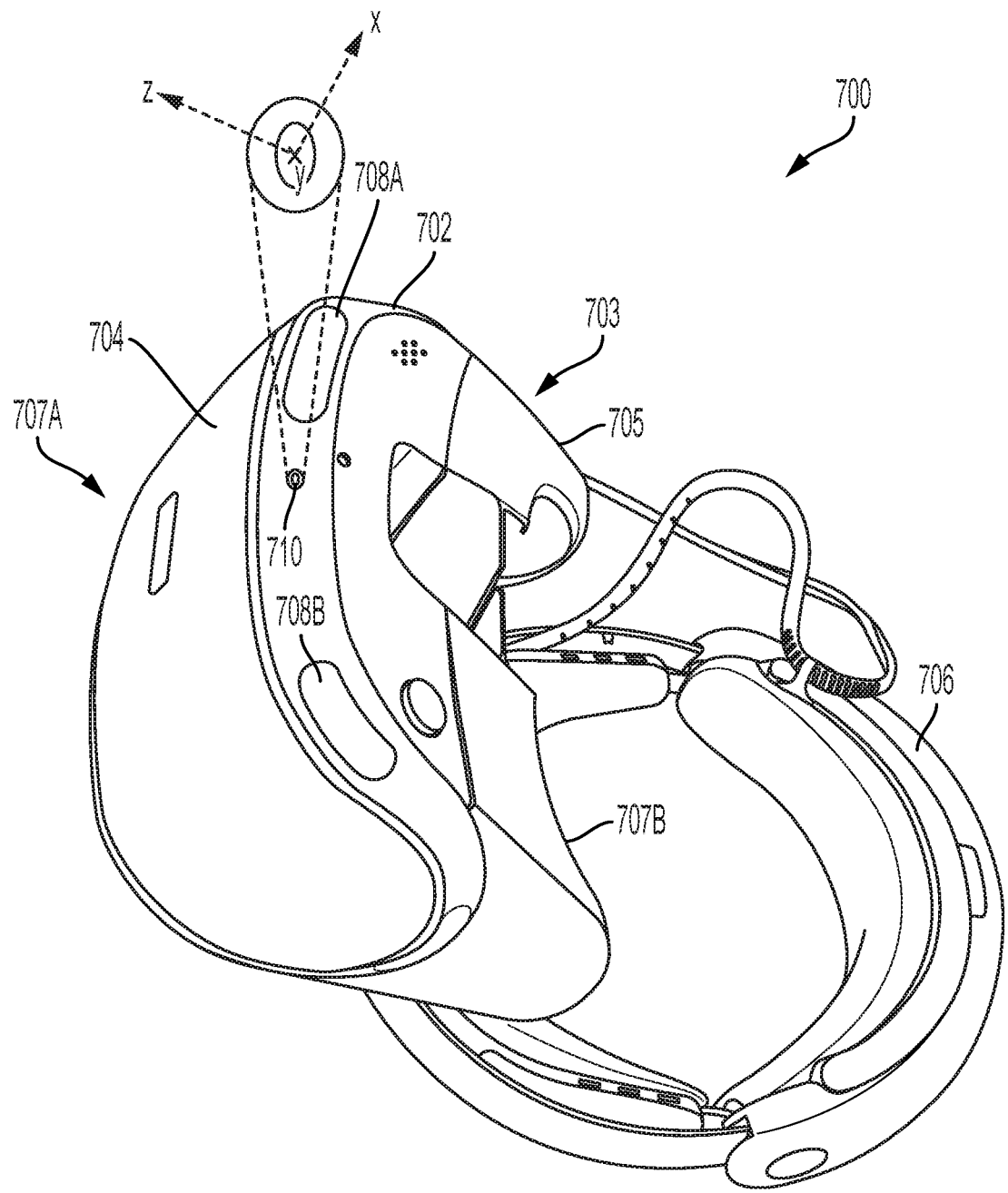
FIG. 7A is a diagram of an embodiment of a bottom isometric view of an HMD.

FIG. 7A is a diagram of an embodiment of a bottom isometric view of an HMD 700, which is an example of the HMD 104 of FIG. 1A or any other HMDs described herein. The HMD 700 has an eye mask 703 that includes a front region 704 and a lower region 702, which is a bottom surface of the eye mask 703 of the HMD 700. The front region 704 is a front surface of the eye mask 703 and the front surface is placed in front of eyes of the user 106 to covers the eyes of the user 106. The HMD 700 has a headband 706, which is sometimes referred to herein as a top headband strap. The headband 706 is coupled to the eye mask 703 and wraps or extends around a head of the user 106 (FIG. 1A). The eye mask 703 includes a frame 705, made from rubber or plastic, and the frame 705 fits around eyes of the user 106. The lower region 702 is not connected to the headband 706 and is separated from the headband 706 by the frame 705. Also, the lower region 702 cannot cover eyes of the user 106 and is below the eyes of the user 106. The frame 705 is coupled, such as fitted or connected, to the lower region 702, and the front region 704 is coupled to the lower region 702. For example, the frame 705 is glued to or screwed to the lower region 702 and the front region 704 is screwed to the lower region 702. The lower region 702 is adjacent to the front region 704 and the frame 705 is adjacent to the lower region 702. The head passes through a space formed between the frame 705 and the headband 706.

One or more display screens of the HMD 700 are located within the front region 704. Also, a camera 710 is fitted to the lower region 702 so that a lens of the camera 710 extends through an outer surface of the lower region 702. The camera 710 is located between the front region 704 and the frame 705. The camera 710 is an example of the camera 108 of FIG. 1A. The lens is embedded within the outer surface of the lower region 702 or extends from the outer surface. The camera 710 is located between multiple light sources 708A and 708B that are embedded within the outer surface of the lower region 702. The light sources 708A and 708B are examples of markers used for determining a position and orientation of the HMD 700. For example, the camera 118 of FIG. 1A captures one or more images of the lights 708A and 708B and any other light sources on a surface of the HMD 700 to determine a position and an orientation of the HMD 700 in the real-world environment. Other examples of markers, described herein, include retro-reflective tapes or a reflective tape or fluorescent colors. Examples of a light source include an infrared light source or an LED light source. The camera 710 is located at a front portion of the lower region 702 and the front portion is closer to the front region 704 than to the frame 705.

There is a light source 707B between the front region 704 and the frame 705. Similarly, there is another light source 707A between the front region 704 and the frame 705. The light source 707A is on an opposite side of the front region 704 compared to another side of the front region 704. The other side of the front region 704 is adjacent to the light source 707B.

In an embodiment, the front region 704 is expanded to include the light sources 707A and 707B. The light source 707A is located on a side of the front region 704 than a side, of the front region 704, on which the light source 707B is located.

In one embodiment, the camera 710 is located on the front region 704 or any other region of the HMD 700.

In an embodiment, the camera 710 is located on a back portion of the lower region 702 and the back portion is closer to the frame 705 than to the front region 704.

Figure 7B:
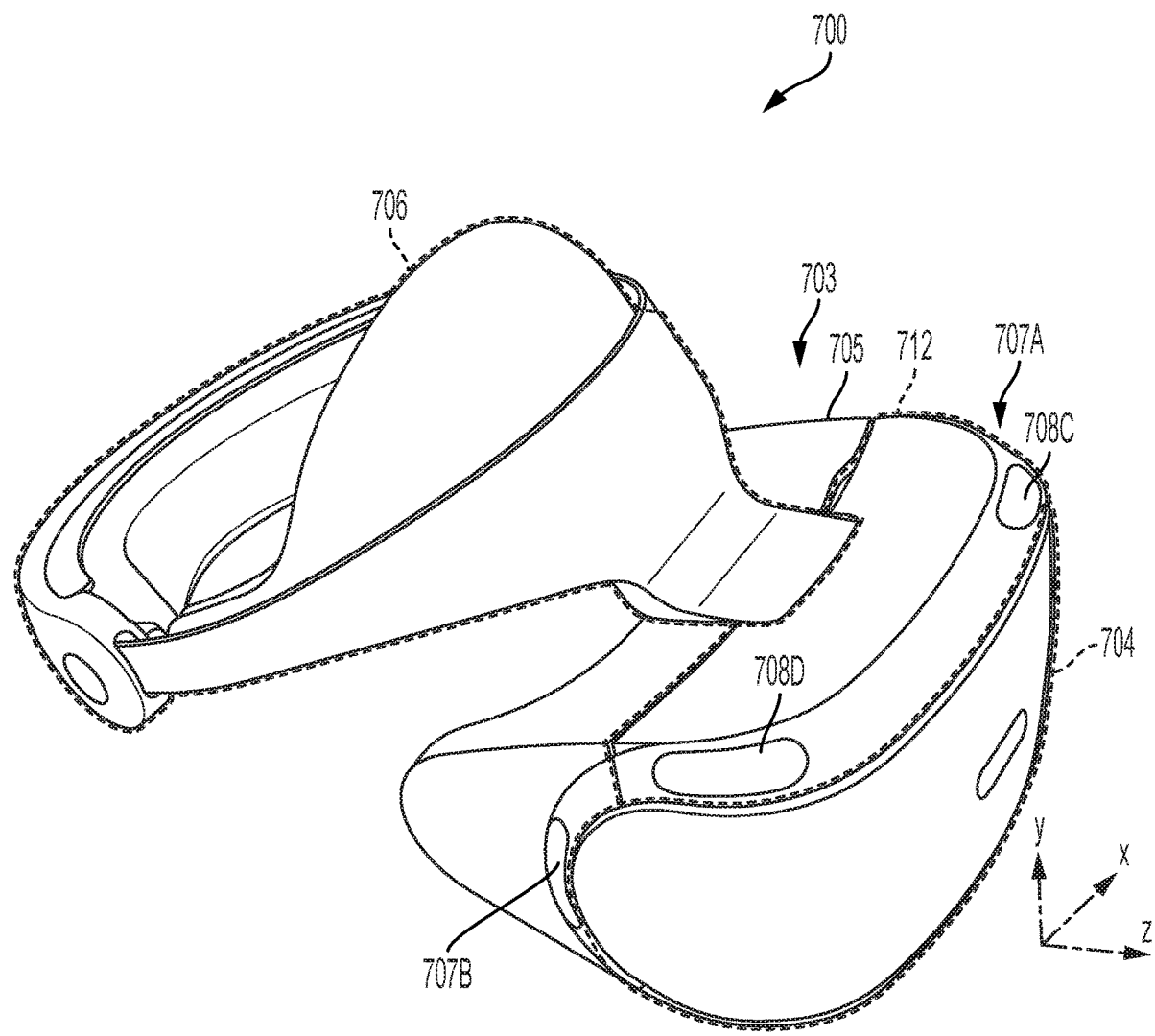
FIG. 7B is a diagram of an embodiment of a top isometric view of the HMD of FIG. 7A.

FIG. 7B is a diagram of an embodiment of a top isometric view of the HMD 700. The eye mask 703 of the HMD 700 includes an upper region 712, such as a top region, that is adjacent to the front region 704. The upper region 712 is a top surface of the eye mask 703. The upper region 712 is coupled to the front region 704. For example, the upper region 712 is screwed or fitted to the front region 704. The front region 712 is located between the upper region 712 and the lower region 702. The upper region 712 is adjacent to, such as next to, the front region 704 and faces the lower region 702 of FIG. 7A. The upper region 712, the front region 704, and the lower region 702 form parts of the eye mask 703 of the HMD 700. The upper region 712 is adjacent to the frame 705 and is coupled to the frame 705. For example, the upper region 712 is screwed to or glued to the frame 705. The eye mask 703 is adjacent to the frame 705. The headband 706 is coupled to, such as screwed to or fitted to or glued to, the upper region 712. Within the upper region 712, there are light sources 708C and 708D that are embedded within an outer surface of the upper region 712.

Figure 7C:
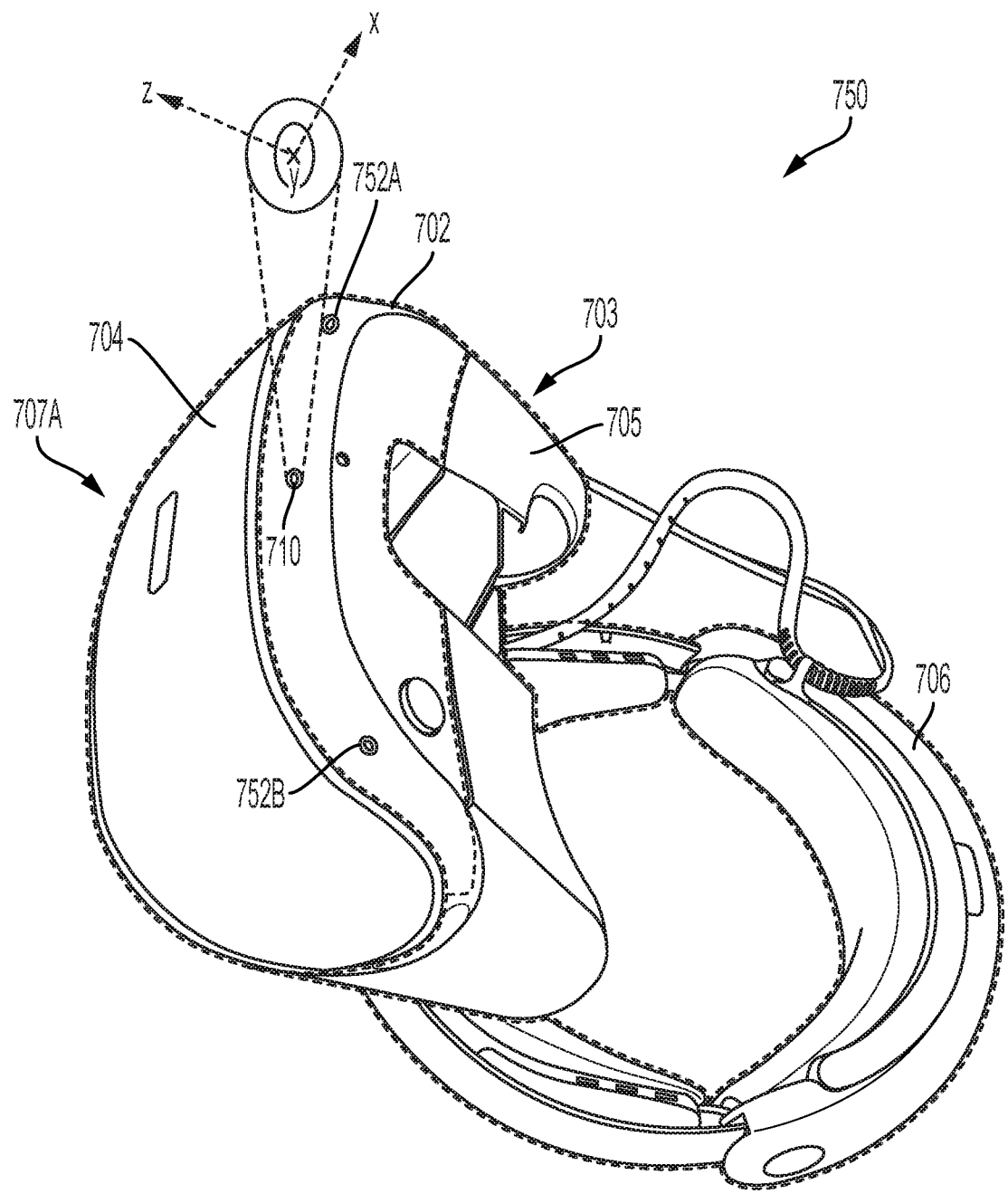
FIG. 7C is a diagram of a bottom view of an embodiment of an HMD to illustrate multiple cameras at a lower region of the HMD.

FIG. 7C is a diagram of a bottom view of an embodiment of an HMD 750 to illustrate multiple cameras 710, 752A, and 752B. The HMD 750 is the same in structure and function as the HMD 700 of FIG. 7A except that the HMD 750 does not have the light sources, 707A, 707B, 708A, 708B, 708C, and 708D (FIGS. 7A and 7B). Instead, the HMD 750 includes the cameras 752A and 752B. The HMD 750 is an example of the HMD 104 (FIG. 1A). The cameras 752A and 752B have lenses that face towards the floor F to receive light reflected from the floor F and the HHC 102 to capture one or more images of movement of the HHC 102 with respect to the floor F.

The camera 752A is situated within the lower region 702 and at one side of the camera 710. Also, the camera 752B is situated within the lower region 702 and at a side of the camera 710 that is opposite to the side on which the camera 752A is located. The camera 752B has a different field-of-view than the FOV 110 of the camera 710 and a field-of-view of the camera 752A. The FOV 110 is different from the field-of-view of the camera 752A. Any movement of the HHC 102 that is not within the FOV 110 of the camera 710 is captured by the FOV of the camera 752A or within the FOV of the camera 752B.

Each camera 752A and 752B is coupled via a wired or wireless connection to the computing device 112 (FIG. 1A). Images captured by the cameras 752A and 752B are sent to a processor of the HMD 750. The processor of the HMD 750 sends the images via a short-range communication module, such as a Bluetooth™ module or a Wi-FI™ module, of the HMD 750 to the computing device 112. The computing device 112 sends the images captured by the cameras 752A and 752B via the computer network 114 to the game cloud system 116 (FIG. 1A). The game cloud system 116 determines a position and orientation of the HHC 102 from the images captured by the camera 710 and/or the images captured by the camera 752A and/or the images captured by the camera 752B to change the state of the virtual scene.

Figure 7D:
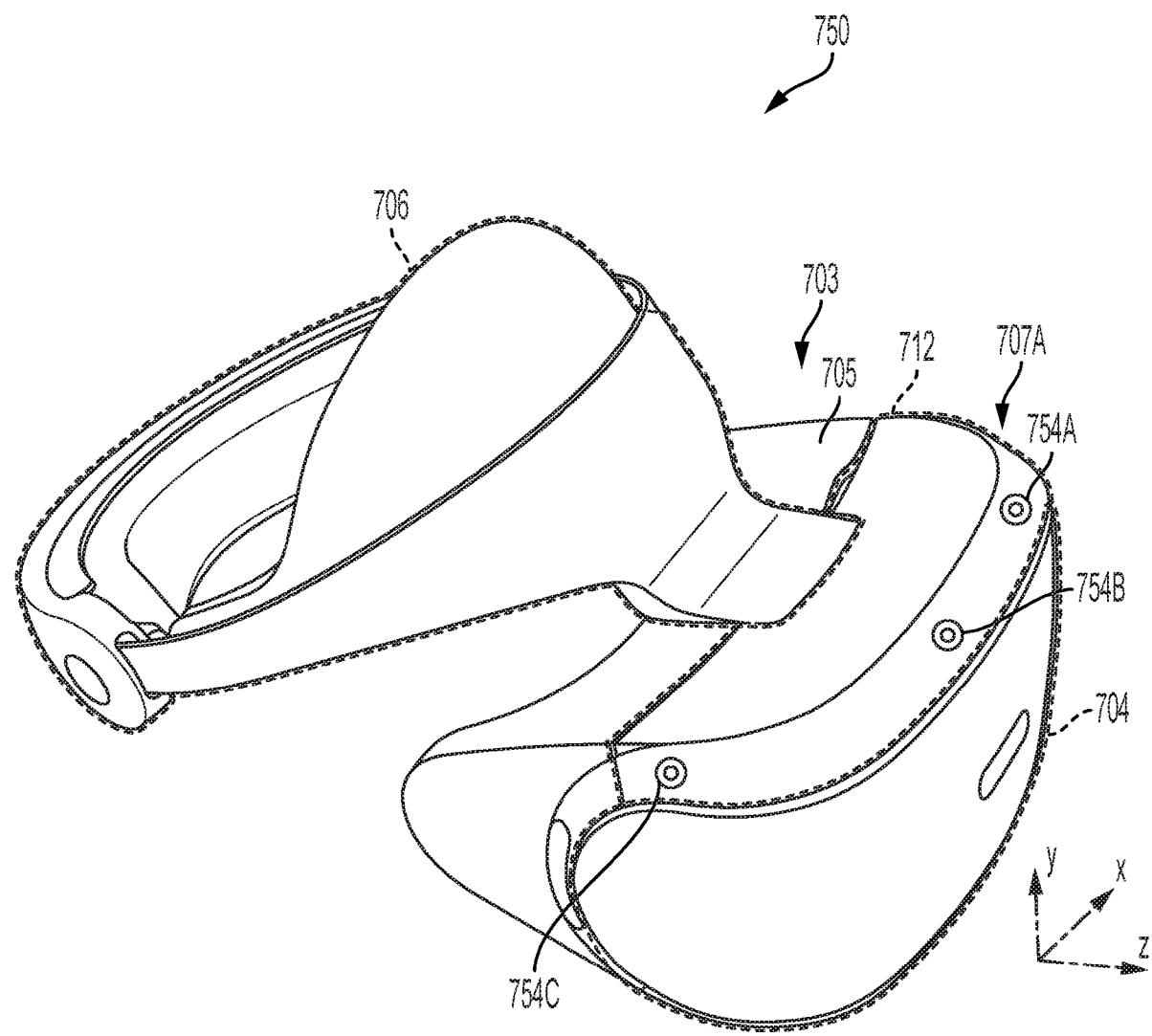
FIG. 7D is a diagram of a top view of an embodiment of the HMD of FIG. 7C to illustrate multiple cameras at an upper region of the HMD.

FIG. 7D is a diagram of a top view of an embodiment of the HMD 750 to illustrate multiple cameras 754A, 754B, and 754C. The HMD 750 includes the cameras 754A, 754B, and 754C at the upper region 712 of the HMD 750. The camera 754B is located between the cameras 754A and 754C. The cameras 754A, 754B, and 754C have lenses that face towards a ceiling of the real-world environment to receive light reflected from the ceiling and the HHC 102 to capture one or more images of movement of the HHC 102 with respect to the ceiling. The ceiling is located opposite to the floor F and is substantially perpendicular or perpendicular to the walls W1 and W2 (FIG. 1D). The ceiling is parallel or substantially parallel to the floor F.

The camera 754B has a different field-of-view than the camera 754B and the camera 752C. Also, the camera 752B has a different field-of-view than the camera 752C. Any movement of the HHC 102 that is not within the FOV of the camera 754A is captured by the FOV of the camera 754B or the FOV of the camera 752C.

Each camera 754A, 754B, and 754C is coupled via a wired or wireless connection to the computing device 112 (FIG. 1A). Images captured by the cameras 754A, 754B, and 754C are sent to the processor of the HMD 750. The processor of the HMD 750 sends the images via the short-range communication module of the HMD 750 to the computing device 112. The computing device 112 sends the images captured by the cameras 754A, 754B, and 754C via the computer network 114 to the game cloud system 116 (FIG. 1A). The game cloud system 116 determines a position and orientation of the HHC 102 from the images captured by the camera 754A and/or the images captured by the camera 754B and/or the images captured by the camera 754C to change the state of the virtual scene.

It should be noted that the cameras 754A, 754B, and 754C capture images of movement of the HHC 102 when the HHC 102 is at a level above the eye mask 703. When the HHC 102 is at the level above the eye mask 703, movement of the HHC 102 is not captured by the camera 710, the camera 752A, and the camera 752C (FIG. 7C). Similarly, the cameras 710, 752A, and 752B capture images of movement of the HHC 102 when the HHC 102 is at a level below the eye mask 703. When the HHC 102 is at the level below the eye mask 703, movement of the HHC 102 is not captured by the cameras 754A, 754B, and 754C.

In an embodiment, one or more cameras are located on the headband 706 to capture images of movement of the HMD 750 with respect to the real-world environment. The one or more cameras of the headband 706 provide the images to the processor of the HMD 750 and the processor sends the images to the short-range communication module of the HMD 750. The short-range communication module of the HMD 750 sends the images to the computing device 112, which sends the images via the computer network 114 to the game cloud system 116. The game cloud system 116 determines a movement of the HMD 750 from the images and the movement is determined with reference a reference co-ordinate system of the real-world environment captured in the images. The movement is then used by the game cloud system 116 to change the state of the virtual scene.

In one embodiment, the HMD 750 includes a lower or greater number of cameras than that illustrated in FIGS. 7C and 7D. For example, the HMD 750 does not have the cameras 752A, 752B, 754A and 754C. As another example, the HMD 750 does not have the cameras 710 and 754B.

Figure 8A:
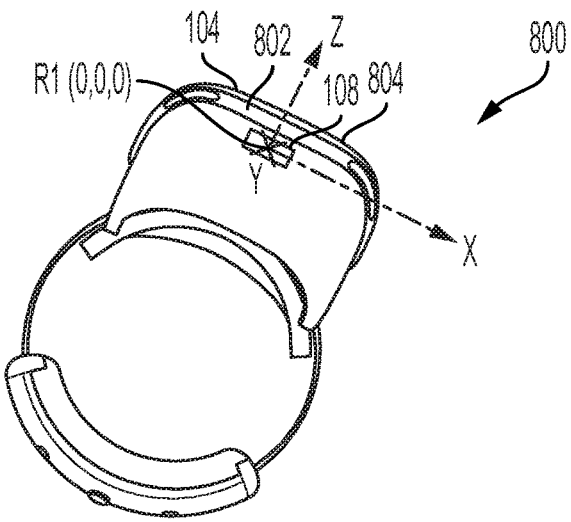
FIG. 8A is a bottom view of an embodiment of an HMD.

FIG. 8A is a bottom view of an embodiment of an HMD 800, which is an example of the HMD 700 of FIGS. 7A and 7B. The HMD 800 has a front region 804, which is an example of the front region 704 of FIGS. 7A and 7B. The HMD 800 also has a lower region 802, which is an example of the lower region 702 of FIG. 7A. The camera 108 is fitted to the lower region 802. For example, the camera 108 is fitted between the light sources 708A and 708B of FIG. 7A and is closer to the front region 804 than to the frame 705. The camera 108 has the reference coordinate R1.

Figure 8B:
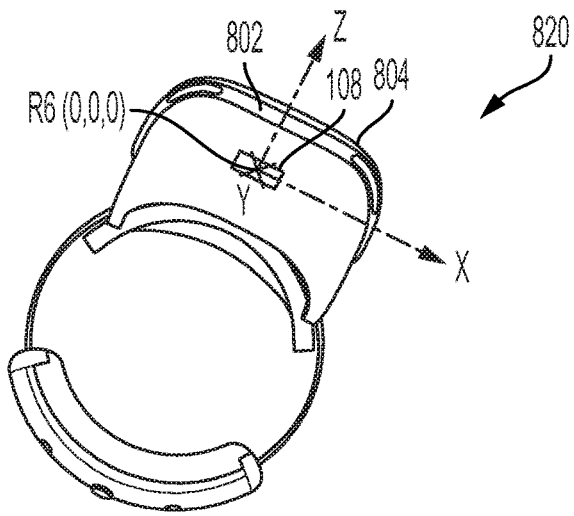
FIG. 8B is another bottom view of an embodiment of an HMD.

FIG. 8B is a bottom view of an embodiment of an HMD 820. The HMD 820 is an example of the HMD 700 of FIGS. 7A and 7B, except that the HMD 820 has the camera 108 that is fitted to a different location than the camera 108 on the HMD 700. The HMD 820 has the front region 804 and the lower region 802. The camera 108 of the HMD 820 is fitted to the lower region 802 of the HMD 820. For example, the camera 108 is fitted between the light sources 708A and 708B of FIG. 7A and is at approximately the same distance from the front region 804 as that from the frame 705. To illustrate, the camera 108 is at the same distance from the front region 804 as that from the frame 705. The camera 108 has a reference coordinate R6, which is an origin (0, 0, 0) of the XYZ reference coordinate system of the camera 108.

Figure 8C:
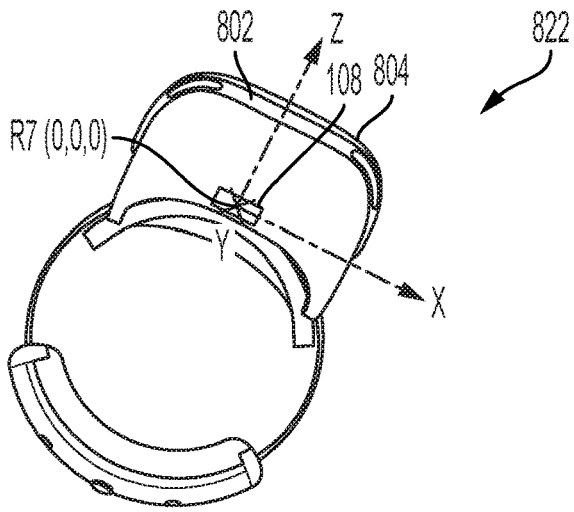
FIG. 8C is yet another bottom view of an embodiment of an HMD.

FIG. 8C is a bottom view of an embodiment of an HMD 822. The HMD 822 is an example of the HMD 700 of FIGS. 7A and 7B, except that the HMD 822 has the camera 108 that is fitted to a different location than the camera 108 on the HMD 700. The HMD 822 has the front region 804 and the lower region 802. The camera 108 of the HMD 822 is fitted to the lower region 802 of the HMD 822. For example, the camera 108 is fitted between the light sources 708A and 708B of FIG. 7A and is at closer to the frame 705 of FIG. 7A than to the front region 804. The camera 108 has a reference coordinate R7, which is an origin (0, 0, 0) of the XYZ reference coordinate system of the camera 108.

Figure 8D:
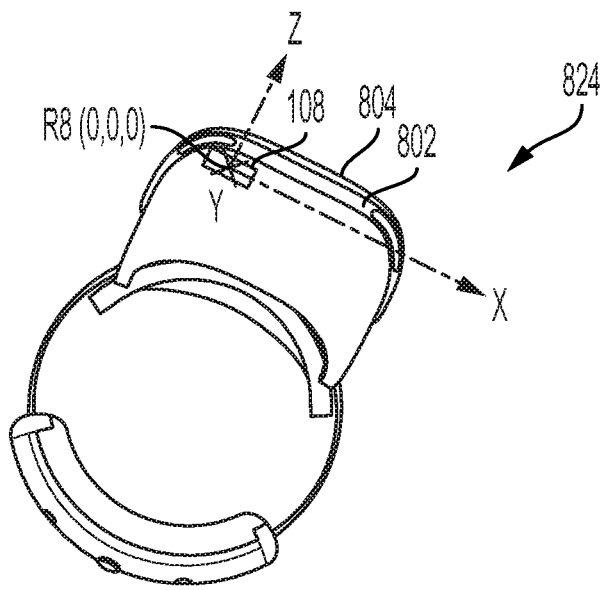
FIG. 8D is a bottom view of an embodiment of an HMD.

FIG. 8D is a bottom view of an embodiment of an HMD 824. The HMD 824 is an example of the HMD 700 of FIGS. 7A and 7B, except that the HMD 824 has the camera 108 that is fitted to a different location than the camera 108 on the HMD 700. The HMD 824 has the front region 804 and the lower region 802. The camera 108 of the HMD 824 is fitted to the lower region 802 of the HMD 824. For example, the camera 108 is fitted closer to the light source 708B than to the light source 708A of FIG. 7A and is at approximately the same distance from the front region 804 as that from the frame 705. The camera 108 has a reference coordinate R8, which is an origin (0, 0, 0) of the XYZ reference coordinate system of the camera 108.

In one embodiment, the camera 108 of the HMD 824 is located closer to the frame 705 than to the front region 804. In an embodiment, the camera 108 of the HMD 824 is located closer to the front region 804 than to the frame 705.

Figure 8E:
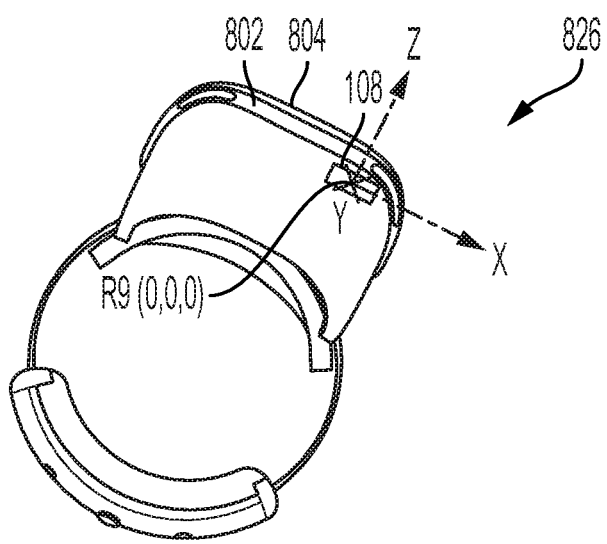
FIG. 8E is a bottom view of an embodiment of an HMD.

FIG. 8E is a bottom view of an embodiment of an HMD 826. The HMD 8206 is an example of the HMD 700 of FIGS. 7A and 7B, except that the HMD 826 has the camera 108 that is fitted to a different location than the camera 108 on the HMD 700. The HMD 826 has the front region 804 and the lower region 802. The camera 108 of the HMD 826 is fitted to the lower region 802 of the HMD 826. For example, the camera 108 is fitted closer to the light source 708A than to the light source 708B of FIG. 7A and is at approximately the same distance from the front region 804 as that from the frame 705. The camera 108 has a reference coordinate R9, which is an origin (0, 0, 0) of the XYZ reference coordinate system of the camera 108.

In one embodiment, the camera 108 of the HMD 826 is located closer to the frame 705 than to the front region 804. In an embodiment, the camera 108 of the HMD 826 is located closer to the front region 804 than to the frame 705.

Figure 9A:
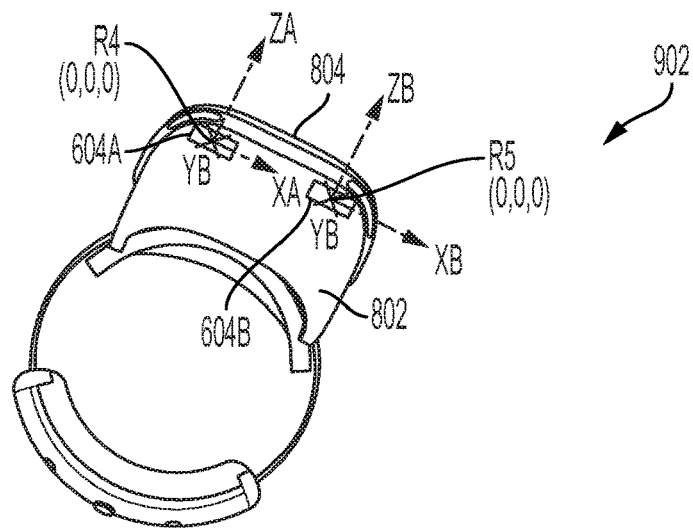
FIG. 9A is a diagram of a bottom view of an embodiment of an HMD to illustrate locations of multiple cameras at a lower region of an HMD.

FIG. 9A is a diagram of a bottom view of an embodiment of an HMD 902 to illustrate locations of the cameras 604A and 604B at the lower region 802 of the HMD 902. The HMD 902 is an example of the HMD 700 of FIGS. 7A and 7B, and has the lower region 802 and the front region 804, except that the HMD 902 has the two cameras 604A and 604B instead of one.

The camera 604A is located between the light source 708B of FIG. 7A and the camera 604B. Also, the camera 604A is located closer to the light source 708B than to the light source 708A. Similarly, the camera 604B is located between the light source 708A of FIG. 7A and the camera 604A. Also, the camera 604B is located closer to the light source 708A than to the light source 708B. Both the cameras 604A and 604B are located closer to the front region 804 than to the frame 705 of FIG. 7A. The reference coordinate R4 is at the camera 604A of the HMD 902 and the reference coordinate R5 is at the camera 604B of the HMD 902.

Figure 9B:
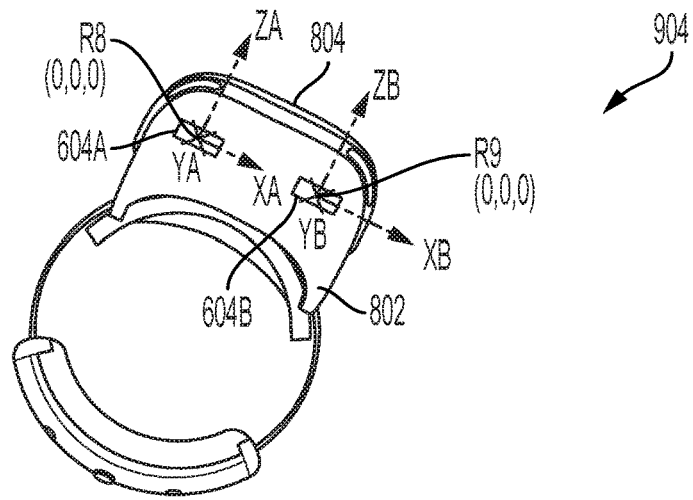
FIG. 9B is a diagram of a bottom view of an embodiment of an HMD to illustrate locations of multiple cameras at a lower region of an HMD.

FIG. 9B is a diagram of a bottom view of an embodiment of an HMD 904 to illustrate locations of the cameras 604A and 604B at the lower region 802 of the HMD 902. The HMD 904 is an example of the HMD 700 of FIGS. 7A and 7B, and has the lower region 802 and the front region 804, except that the HMD 904 has the two cameras 604A and 604B instead of one.

The locations of the cameras 604A and 604B are the same as described above with reference to FIG. 9A except that both the cameras 604A and 604B are located at approximately the same distance or approximately the same distance from the front region 804 as that from the frame 705 of FIG. 7A. For example, the cameras 604A and 604B are located at the same distance from the front region 804 as that from the frame 705 of FIG. 7A. The reference coordinate R8 is at the camera 604A of the HMD 904 and the reference coordinate R9 is at the camera 604B of the HMD 904.

Figure 9C:
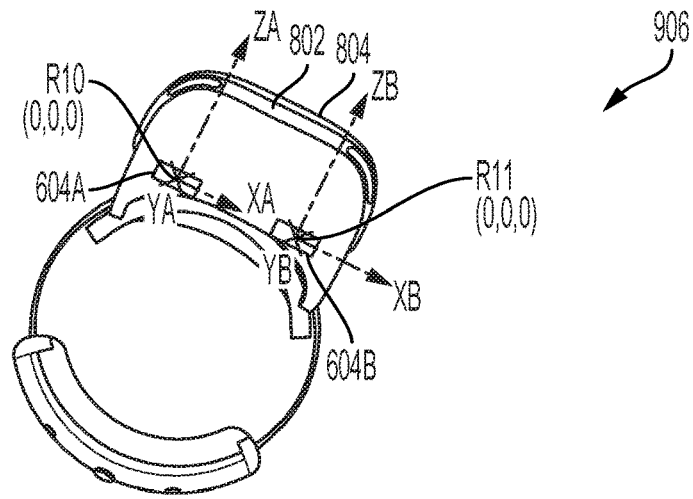
FIG. 9C is a diagram of a bottom view of an embodiment of an HMD to illustrate locations of multiple cameras at a lower region of an HMD.

FIG. 9C is a diagram of a bottom view of an embodiment of an HMD 906 to illustrate locations of the cameras 604A and 604B at the lower region 802 of the HMD 902. The HMD 906 is an example of the HMD 700 of FIGS. 7A and 7B, and has the lower region 802 and the front region 804, except that the HMD 906 has the two cameras 604A and 604B instead of one.

The locations of the cameras 604A and 604B are the same as described above with reference to FIG. 9A except that both the cameras 604A and 604B are located closer to the frame 705 of FIG. 7A than to the front region 804. A reference coordinate R10, such as an origin (0, 0, 0), is at the camera 604A of the HMD 906 and a reference coordinate R11 is at the camera 604B of the HMD 906. The reference coordinate R11 is an origin (0, 0, 0) at the camera 604B of the HMD 906.

Figure 10A:
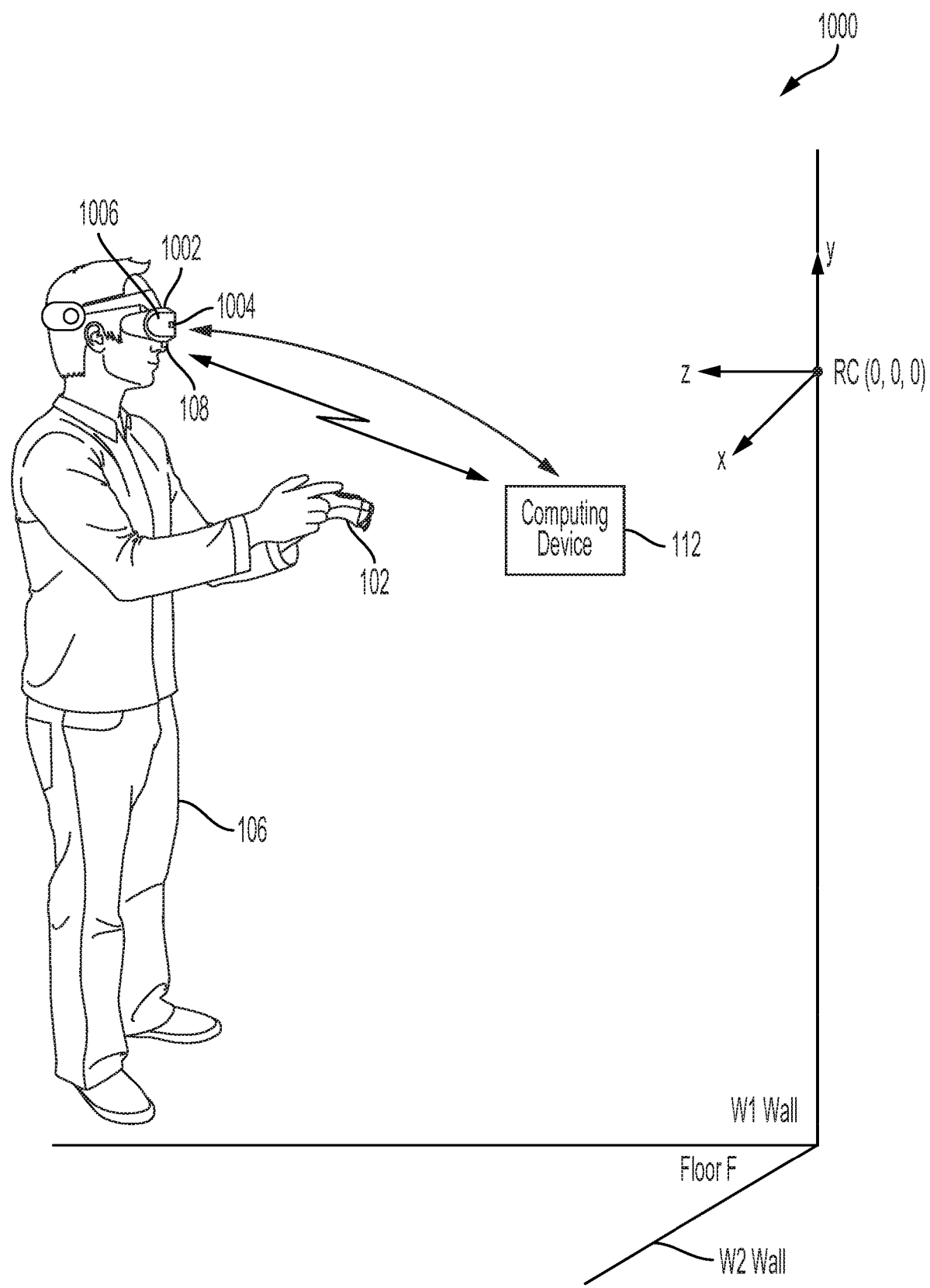
FIG. 10A is a diagram of an embodiment of a system to illustrate a determination of a position of an HMD with reference to a reference coordinate system.

FIG. 10A is a diagram of an embodiment of a system 1000 to illustrate a determination of a position of an HMD 1002 with reference to a reference coordinate system, such as an xyz co-ordinate system having a reference coordinate RC. The reference coordinate RC is an origin (0, 0, 0). The reference coordinate RC is located at a point on the wall W2. The reference coordinate system having the reference coordinate RC has the x-axis, the y-axis, and the z-axis.

The HMD 1002 is an example of the HMD 700 of FIG. 7. The HMD 1002 has the camera 108 and another camera 1004. The camera 1004 is located on a front region 1006 of the HMD 1002. For example, a lens of the camera 1004 extends through the front region 1006 to face the real-world environment in front of the HMD 1002. The camera 1004 is an outward facing camera. The front region 1006 is an example of the front region 704 of FIG. 7A. Both the cameras 1004 and 108 are coupled to the computing device 112 via the same wired or wireless connection.

The camera 1004 captures one or more images of the real-world environment that is in front of the HMD 1002. For example, the camera 1004 captures images of the walls W2 or the wall W1. The camera 1004 sends the images via the wired connection to the computing device 112. The computing device 112 transfers the images via the computer network 114 (FIG. 1A) to the game cloud system 116 (FIG. 1A). The game cloud system 116 receives the images from the camera 1004 and determines a position and orientation of the HMD 1002 with reference to the reference co-ordinate system having the reference coordinate RC. For example, the game cloud system 116 determines a distance of the camera 1004 in the x-direction from the reference coordinate RC, a distance of the camera 1004 in the y-direction from the reference coordinate RC, and a distance of the camera 1004 in the z-direction from the reference coordinate RC. The game cloud system 116 determines an angle of the camera 1004 with reference to the x-axis of the reference coordinate RC, an angle of the camera 1004 with respect to the y-axis of the reference coordinate RC, and an angle of the camera 1004 with respect to the z-axis of the reference coordinate RC. The game cloud system 116 changes the state of the virtual scene according to the position and orientation of the HMD 1002 with reference to the reference coordinate system having the reference coordinate RC.

Figure 10B:
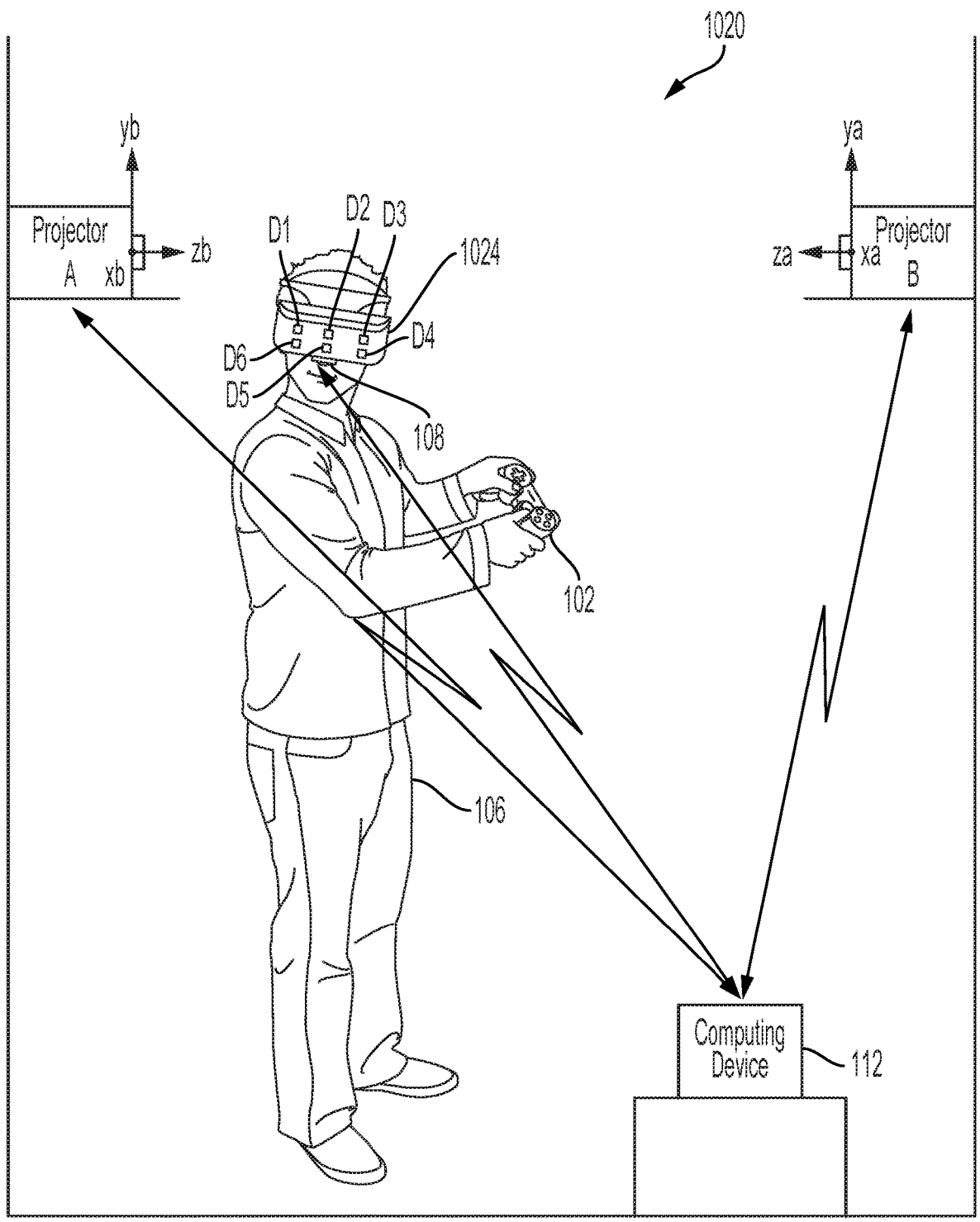
FIG. 10B is a diagram of an embodiment of a system to illustrate use of projectors and detectors on an HMD to determine a position and an orientation of the HMD.

FIG. 10B is a diagram of an embodiment of a system 1020 to illustrate use of projectors A and B and detectors on an HMD 1024 to determine a position and an orientation of the HMD 1024. The system 1020 has the HMD 1024 and the camera 108 is fitted to a lower region of the HMD 1024. The HMD 1024 is an example of the HMD 700 of FIGS. 7A and 7B. The system 1020 further includes the computing device 112, the HHC 102 and the projectors A and B. An example of a projector, as used herein, is a projector that includes a laser light source and a mirror. The laser light source generates light that is projected on the mirror, which moves with respect to multiple axes, to reflect the light in a pre-determined pattern, such as a Lissajous pattern. The light that is reflected creates the pre-determined pattern within a volume in the real-world environment.

The HMD 1024 has multiple detectors D1, D2, D3, D4, D5, and D6. The detectors are located on a front region of the HMD 1024. An example of a detector, as used herein, is a photosensor or a sensor having a p-n junction that converts light into electrical current, which is an example of an electrical signal. The HMD 1024 is coupled to the computing device 112 via a wired or wireless connection. Similarly, the HMD 1024 is coupled to the projector A via a wired or wireless connection and the HMD 1024 is coupled to the projector B via a wired or wireless connection.

The projectors A and B emit light to create the volume for the pre-determined pattern within the real-world environment. The detectors D1 through D6 detect the light within the volume to output multiple electrical signals. For example, each detector D1 through D6 outputs a corresponding electrical signal. The HMD 1024 sends information, such as light intensities, within the electrical signals to the computing device 112. The computing device 112 sends the information received from the HMD 1024 via the computer network 114 (FIG. 1A) to the game cloud system 116 (FIG. 1A). The game cloud system 116 processes the information to determine an orientation of the HMD 1024 with respect to a reference coordinate system, such as an xayaza coordinate system, of the projector A. Similarly, the game cloud system 116 processes the information to determine an orientation of the HMD 1024 with respect to a reference coordinate system, such as an xbybzb coordinate system, of the projector B. The xayaza reference coordinate system has an xa axis, a ya axis, and a za axis. The ya axis is perpendicular to the xa axis and the za axis is perpendicular to the ya axis and to the xa axis. Similarly, the xbybzb reference coordinate system has an xb axis, a yb axis, and a zb axis. The yb axis is perpendicular to the xb axis and the zb axis is perpendicular to the yb axis and to the xb axis. The game cloud system 116 determines from intensities of the electrical signals that are output by the detectors D1 through D6 an orientation of the HMD 1024 with respect to the xayaza reference coordinate system, which includes an angle of the HMD 1024 with respect to the xa axis, an angle of the HMD 1024 with respect to the ya axis, and an angle of the HMD 1024 with respect to the za axis. Also, the game cloud system 116 determines from intensities of the electrical signals that are output by the detectors D1 through D6 an orientation of the HMD 1024 with respect to the xbybzb coordinate system, which includes an angle of the HMD 1024 with respect to the xb axis, an angle of the HMD 1024 with respect to the yb axis, and an angle of the HMD 1024 with respect to the zb axis.

Moreover, the game cloud system 114 determines from the orientations of the HMD 1024 with respect to the reference coordinate systems xayaza and xbybzb, a position of the HMD 1024 from a reference coordinate, such as an origin, of the reference coordinate system xayaza and a position of the HMD 1024 from a reference coordinate, such as an origin, of the reference coordinate system xbybzb. For example, the game cloud system 114 applies triangulation to determine the position of the HMD 1024 based on the orientation of the HMD 1024 with respect to the reference coordinate system xayaza and the orientation of the HMD 1024 with respect to the reference coordinate system xbybzb. An example of determining the position of the HMD 1024 with respect to the projector A and the position of the HMD 1024 with respect to the projector B is provided in U.S. patent application Ser. No. 15/472,193, now issued as U.S. Pat. No. 9,983,692, which is incorporated by reference herein in its entirety.

The game cloud system 114 determines from the orientation of the HMD 1024 with respect to the reference coordinate system xayaza or the reference coordinate system xbybzb, and the position of the HMD 1024 with respect to the reference coordinate systems xayaza and xbybzb to change the state of the virtual scene. Also, the game cloud system 114 determines from the images received from the camera 108 via the computing device 112 and the computer network 114 a position and an orientation of the HHC 102 with respect to the HMD 1024. The position and the orientation of the HHC 102 with respect to a reference coordinate system, such as an XYZ coordinate system, of the HMD 1024 are processed by the game cloud system 116 to change the state of the virtual scene.

The game cloud system 116 generates one or more frames having the change in the state of the virtual scene and encodes the frames to output encoded frames. The encoded frames are sent from the game cloud system 116 via the computer network 114 to the computing device 112. The computing device 112 decodes the encoded frames to output image frames and sends the image frames via the wired or wireless connection to the HMD 1024. The HMD 1024 applies a rendering program to the image frames received from the computing device 112 to display one or more images of a virtual scene on a display screen of the HMD 1024.

In an embodiment, the HMD 1024 has another number, such as five or four or ten, of detectors.

In one embodiment, multiple detectors are located on a headband of the HMD 1024 in addition to being located on the front region of the HMD 1024.

Figure 11:
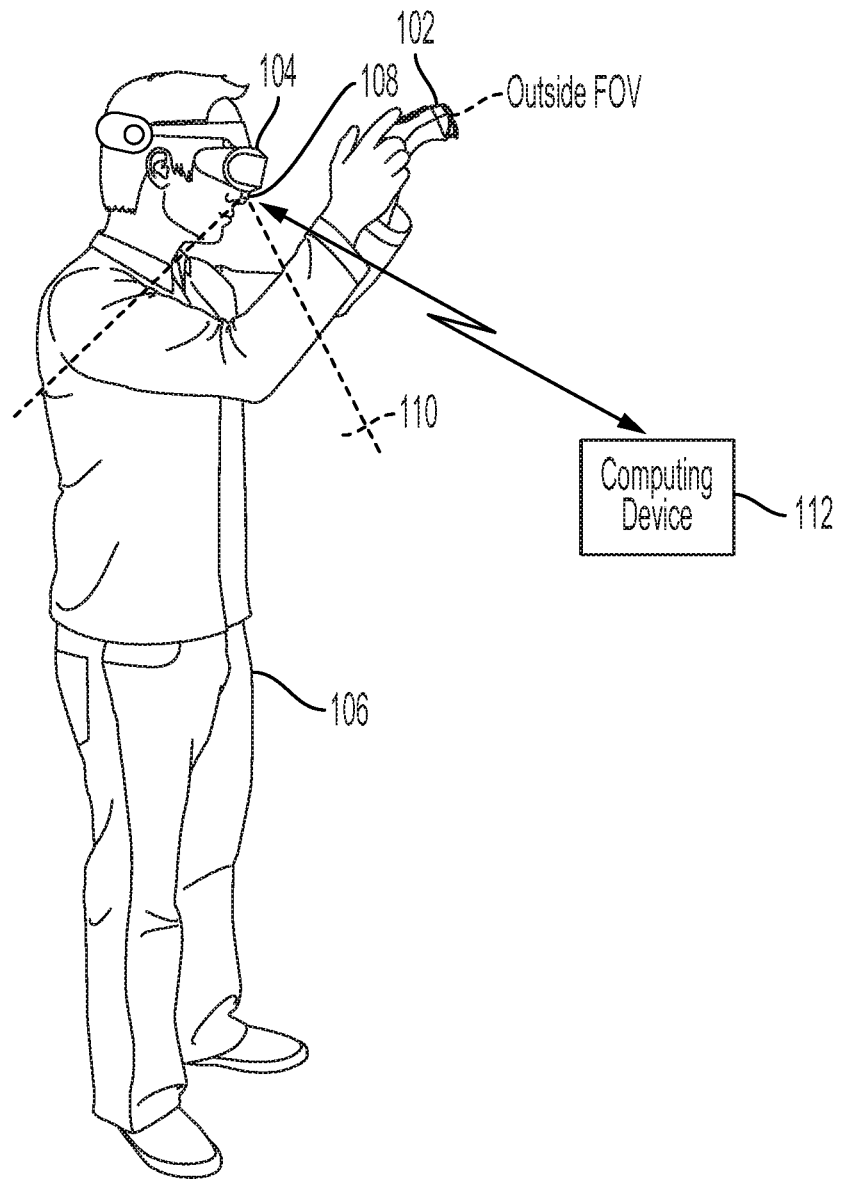
FIG. 11 is a diagram of an embodiment of a system to illustrate dead reckoning.

FIG. 11 is a diagram of an embodiment of a system 1100 to illustrate dead reckoning. The system 110 includes the HMD 104, the HHC 102 and the computing device 112. When the HHC 102 is outside the FOV 110 of the camera 108 of the HMD 104, one or more inertial sensors, such as a magnetometer, an accelerator, and a gyroscope, of the HHC 102 generate inertial data, such as measurements of an acceleration of the HHC 102, measurements of a position of the HHC 102, measurements of an angular velocity of the HHC 102, and measurements of an orientation of the HHC 102 with respect to a coordinate system of the inertial sensors. For example, the gyroscope of the HHC 102 measures an angular velocity of the orientation of the HHC 102 with respect to a coordinate system of the gyroscope. The coordinate system of the gyroscope of the HHC 102 has a spin axis. The coordinate system of the inertial sensors of the HHC 102 is an example of a coordinate system of the real-world environment. The inertial data that is generated by the sensors of the HHC 102 is an example of the input data that is generated by the HHC 102.

The HHC 102 includes a communication device that communicates the input data from the HHC 102 via a wired or wireless connection to the computing device 112. For example, a Wi-Fi™ communication device or a Bluetooth™ communication device of the HHC 102 is coupled to the inertial sensors of the HHC 102 and communicates the input data received from the inertial sensors. The input data is communicated from the Wi-Fi™ communication device or the Bluetooth™ communication device of the HHC 102 via the wireless connection to the computing device 112.

Also, the camera 108 sends one or more images captured by the camera 108 within the FOV 110 to the computing device 112 via the wired or wireless connection. For example, the communication device of the HHC 102 receives the images from the camera 108 and sends the images via the wireless connection to the computing device 112. The computing device 112 sends or directs the images received from the camera 108 and sends or directs the input data received from the HHC 102 via the computer network 114 to the game cloud system 116.

The game cloud system 116 determines from the images received from the camera 108 of the HMD 104 whether a position and orientation of the controller 102 can be determined. For example, the game cloud system 116 compares a shape of the HHC 102 with a pre-determined shape of a hand-held controller to determine whether there is a match between the shape of the HHC 102 and the pre-determined shape. Upon determining that the match does not occur, the game cloud system 116 determines that a current position and a current orientation of the HHC 102 with respect to the camera 108 cannot be determined from the images. Upon determining that the current position and current orientation of the HHC 102 cannot be determined from the images, the game cloud system 116 determines the current position and current orientation of the HHC 102 in the real-world environment from the input data received from the HHC 102 and from a previously determined position and a previously determined orientation of the HHC 102. As an example, the game cloud system 116 determines the previously determined position from one or more images captured by the camera 108 and received before the HHC 102 is outside the FOV 110. The game cloud system 116 further determines the current position of the HHC 102 from the acceleration of the HHC 102, the previously determined position, a previous time at which the images for determining the previously determined position are captured by the camera 108, and a current time at which the input data for the current position of the HHC 102 is generated by the HHC 102. The HHC 102 provides the current time at which the input data is generated via the computing device 112 and the computer network 114 to the game cloud system 116. The previous time at which the images for determining the previously determined position are captured by the camera 108 is received by the game cloud system 116 from the camera 108 via the computing device 112 and the computer network 114. As another example, the game cloud system 116 determines the previously determined orientation from one or more images captured by the camera 108 and received before the HHC 102 is outside the FOV 110. The game cloud system further determines the current orientation of the HHC 102 from the angular velocity of the HHC 102, the previously determined orientation, a previous time at which the images for determining the previously determined orientation are captured by the camera 108, and a current time at which the input data for determining the current orientation of the HHC 102 is output by the HHC 102. The HHC 102 sends the current time at which the input data for determining the current orientation of the HHC 102 is output. The current time is sent from the HHC 102 via the computing device 112 and the computer network 114 to the game cloud system 116. The previous time at which the images for determining the previously determined orientation are captured by the camera 108 is received from the camera 108 via the computing device 112 and the computer network 114. Once the HHC 102 comes back in the FOV 110 after being out of the FOV 110, the game cloud system 116 determines a position and orientation of the HHC 102 with respect to the reference coordinate system of the camera 108 from the images received from the camera 108.

It should be noted that in one embodiment, a clock source within the HMD 104 is synchronized with a clock source within the HHC 102. For example, the state of the virtual scene is generated by the game cloud system 116 based on a position and orientation of the HHC 102 with respect to the camera 108 at a time t1 and a position and orientation of the HMD 104 with respect to the real-world environment at the same time t1. Examples of a clock source include a digital clock source, such as a clock generator, a clock oscillator, and a processor. If there is a difference in timing between the clock sources of the HMD 104 and the HHC 102, there is an inaccuracy in determining the state based on the position and orientation of the HMD 104 in the real-world environment and the position and orientation of the HHC 102 with reference to the camera 108. If the state is inaccurate, the virtual scene that is displayed on the HMD 104 is inaccurate. As such, the clock source of the HMD 104 is synchronized with the clock source of the HHC 102.

In an embodiment, the clock source of the HMD 104 is synchronized with the clock source of the HHC 102. For example, the clock source of the HMD 104 receives a clock signal via the computing device 112 from the computer network 114 and synchronizes the clock signal generated by the clock source of the HMD 104 with the clock signal received from the computer network 114. Similarly, the clock source of the HHC 102 receives a clock signal via the computing device 112 from the computer network 114 and synchronizes the clock signal generated by the clock source of the HHC 102 with the clock signal received from the computer network 114. As another example, the game cloud system 114 sends a synchronization signal indicating a high logic state or a low logic state of a clock signal via the computer network 114 and the computing device 112 to both the HMD 104 and the HHC 102 to synchronize the clock signal of the HMD 104 with the clock signal of the HHC 102.

In an embodiment, clock signals of the HMD 104, the HHC 102, and the game cloud system 116 are synchronized. For example, the clock source of the HMD 104 receives a clock signal via the computing device 112 from the computer network 114 and synchronizes the clock signal generated by the clock source of the HMD 104 with the clock signal received from the computer network 114. Similarly, the clock source of the HHC 102 receives a clock signal via the computing device 112 from the computer network 114 and synchronizes the clock signal generated by the clock source of the HHC 102 with the clock signal received from the computer network 114. Also, a clock source of the game cloud system 116 receives a clock signal from the computer network 114 and synchronizes the clock signal generated by the clock source of the game cloud system 116 with the clock signal received from the computer network 114.

In an embodiment, the inertial data is measured by the inertial sensors of the HHC 102 independent of whether the HHC 102 is within the FOV 110 of the camera 108 of the HMD 104. For example, the inertial data is measured by the inertial sensors of the HHC 102 when the HHC 102 is within the FOV 110.

In one embodiment, the inertial data measured by the inertial sensors of the HMD 104 is sent to the computing device 112 via the wired or wireless connection. Also, the inertial data measured by the inertial sensors of the HHC 102 is sent to the computing device 112 via the wired or wireless connection. The computing device 112 sends the inertial data received from the HMD 104 and the inertial data received from the HHC 102 via the network 114 to the game cloud system 116. The game cloud system 116 determines from the inertial data measured by the HHC 102 and the inertial data measured by the HMD 104 a position and an orientation of the HHC 102 with respect to the HMD 104. For example, the game cloud system 116 determines that an orientation of the HMD 104 with reference to the y-axis of the real-world environment is an angle M1 and an orientation of the HHC 102 with respect to the y-axis of the real-world environment is an angle N1. The game cloud system 116 determines that an orientation of the HHC 102 with respect to the Y-axis of the HMD 104 is a sum of the angles M1 and N1. As another example, the game cloud system 116 determines that a position of the HMD 104 along the x-axis of the real-world environment with reference to a reference co-ordinate of the real-world environment is a position A1. The game cloud system 116 further determines that a position of the HHC 104 along the x-axis of the real-world environment with reference to the reference co-ordinate of the real-world environment is a position B1. The game cloud system 116 determines that a position of the HHC 102 with respect to the position of the HMD 104 is a sum of the positions A1 and B1.

Figure 12:
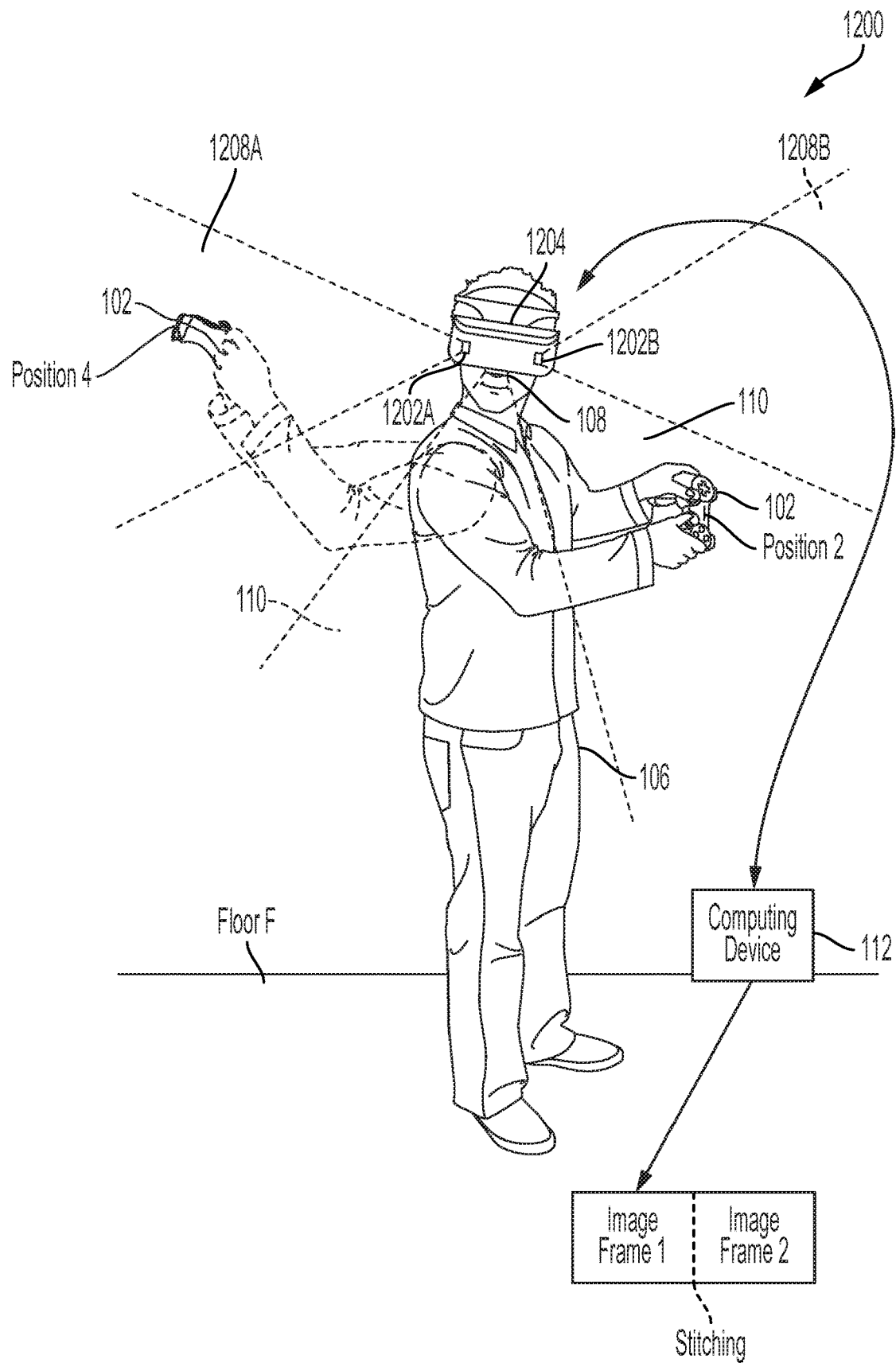
FIG. 12 is a diagram of an embodiment of a system to illustrate stitching of image frames based on times at which images of the HHC are captured by different cameras of an HMD.

FIG. 12 is a diagram of an embodiment of a system 1200 to illustrate stitching of image frames based on times at which images of the HHC 102 are captured by different cameras 108, 1202A, and 1202B of an HMD 1204. The HMD 1204 is an example of the HMD 700 of FIG. 7A. The camera 1202A is located on a portion of the front region 704 (FIG. 7A) and the camera 1202B is located on another portion of the front region 704. For example, the camera 1202A is fitted to a right half portion of the front region 704 and the camera 1202B is fitted to a left half portion of the front region 74. To further illustrate, the camera 1202A is closer to the light source 707B (FIG. 7A) compared to the light source 707A and the camera 1202B is closer to the light source 707A compared to the light source 707B.

The camera 1202A has a FOV 1208A that faces to the right of the user 106 and the camera 1202B has an FOV 1208B that faces to the left of the user 106. Comparatively, the FOV 110 faces down towards the floor F. The user 106 moves the HHC 102 from the position 2 that is within the FOV 110 to a position 4 that is outside the FOV 110 and within the FOV 1208A.

The camera 108 captures one or more images of the HHC 102 within the FOV 110 and sends the images via the wired or wireless connection to the computing device 112. In addition, a clock source of the HMD 1204 is coupled to the camera 108 to determine a time tx at which the camera 1208A captures the images and sends the time tx via the wired or wireless connection to the computing device 112. The computing device 112 sends the images of the HHC 102 within the FOV 110 and the time tx via the computer network 114 to the game cloud system 116.

Similarly, the camera 1202A captures one or more images of the HHC 102 within the FOV 1208A and sends the images via a wired or wireless connection to the computing device 112. In addition, the clock source of the HMD 1204 is coupled to the camera 1202A to determine a time ty at which the camera 1202A captures the images and sends the time ty via the wired or wireless connection to the computing device 112. The computing device 112 sends the images of the HHC 102 within the FOV 1208A and the time ty via the computer network 114 to the game cloud system 116.

The game cloud system 116 determines that the time ty is consecutive to the time tx. For example, the game cloud system 116 determines that the time tx precedes the time ty and that there are no other images captured by the camera 108 and 1202A between the times tx and ty. The game cloud system 116 determines a position and orientation of the HHC 102 for the time tx from the images received from the camera 108 and determines a position and orientation of the HHC 102 for the time ty from the images received from the camera 1202A. The game cloud system 116 also determines that the position and orientation of the HHC 102 cannot be determined from images output by the camera 108 at the time ty. The game cloud system 116 generates an image frame X according to a change in the state of the virtual scene that is determined from the position and orientation of the HHC 102 and the position and orientation are determined from the images captured by the camera 108. Also, the game cloud system 116 generates an image frame Y according to a further change in a state of the virtual scene that is determined from the position and orientation of the HHC 102 and the position and orientation are determined from the images captured by the camera 1202A.

The game cloud system 116 stitches the image frame Y with the image frame X based on the times tx and ty. For example, the game cloud system 116 determines that the virtual scene is to change according to the image frame X first and then according to the image frame Y. The game cloud system 116 sends the image frames X and Y with a sequence in which the image frames are to be displayed on the HMD 1204 via the computer network 114 to the computing device 112. The image frame X is to be displayed at before the image frame Y is to be displayed. The computing device 112 sends the image frames X and Y via the wired or wireless connection to the HMD 1204. The HMD 1204 displays the image frame X before displaying the image frame Y. In a similar manner, when the HHC 102 is within the FOV 1208B and outside the FOVs 110 and 1208A, images captured by the camera 1202B are used by the game cloud system 116 to determine a position and orientation of the HHC 102 to further change a state of the virtual scene.

It should be noted that the functions described herein as being performed by the game cloud system 114 are performed by the one or more servers or one or more processors of the one or more servers of the game cloud system 114. Similarly, it should be noted that the functions described herein as being performed by the computing device 112 are performed by the one or more processors of the computing device 112.

In one embodiment, one or more functions described herein as performed by the game cloud system 116 are instead performed by the computing device 112.

In an embodiment, images captured by two or more of the cameras 752A, 108, 752B (FIG. 7C), 754A, 754B, and 754C (FIG. 7D) are stitched together by the game cloud system 116 in a manner similar to that described above with reference to the cameras 1202A and 108 to change the state of the virtual scene.

Figure 13:
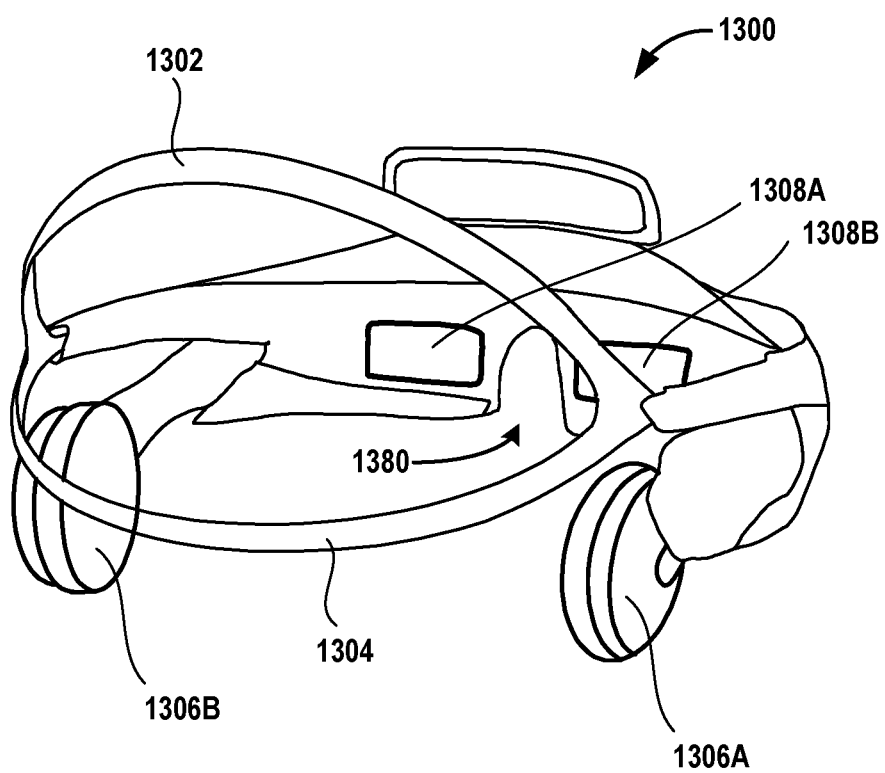
FIG. 13 is an isometric view of an HMD.

FIG. 13 is an isometric view of an HMD 1300, which is an example of the HMD 104 (FIG. 1A). The HMD 1300 includes bands 1302 and 1304 that go to the back of the head of the user 106 when worn by the user 106 (FIG. 1A). Moreover, the HMD 1300 includes earphones 1306A and 1306B, e.g., speakers, etc., that emanate sound associated with an interactive environment, e.g., a game environment, the virtual scene, an object in the virtual scene, an interactive tour environment, etc., that is presented by execution of the application, e.g., a game program, an interactive environment generation program, etc. The HMD 1300 includes lenses 1308A and 1308B that allow the user 106 to view the interactive environment that is displayed on a display screen of the HMD 1300. A groove 1380 rests on a nose of the user 106 to support the HMD 1300 on the nose.

In some embodiments, the HMD 1300 is worn by the user 106 in a manner similar to which sunglasses, glasses, or reading glasses are worn by the user 106.

Figure 14:
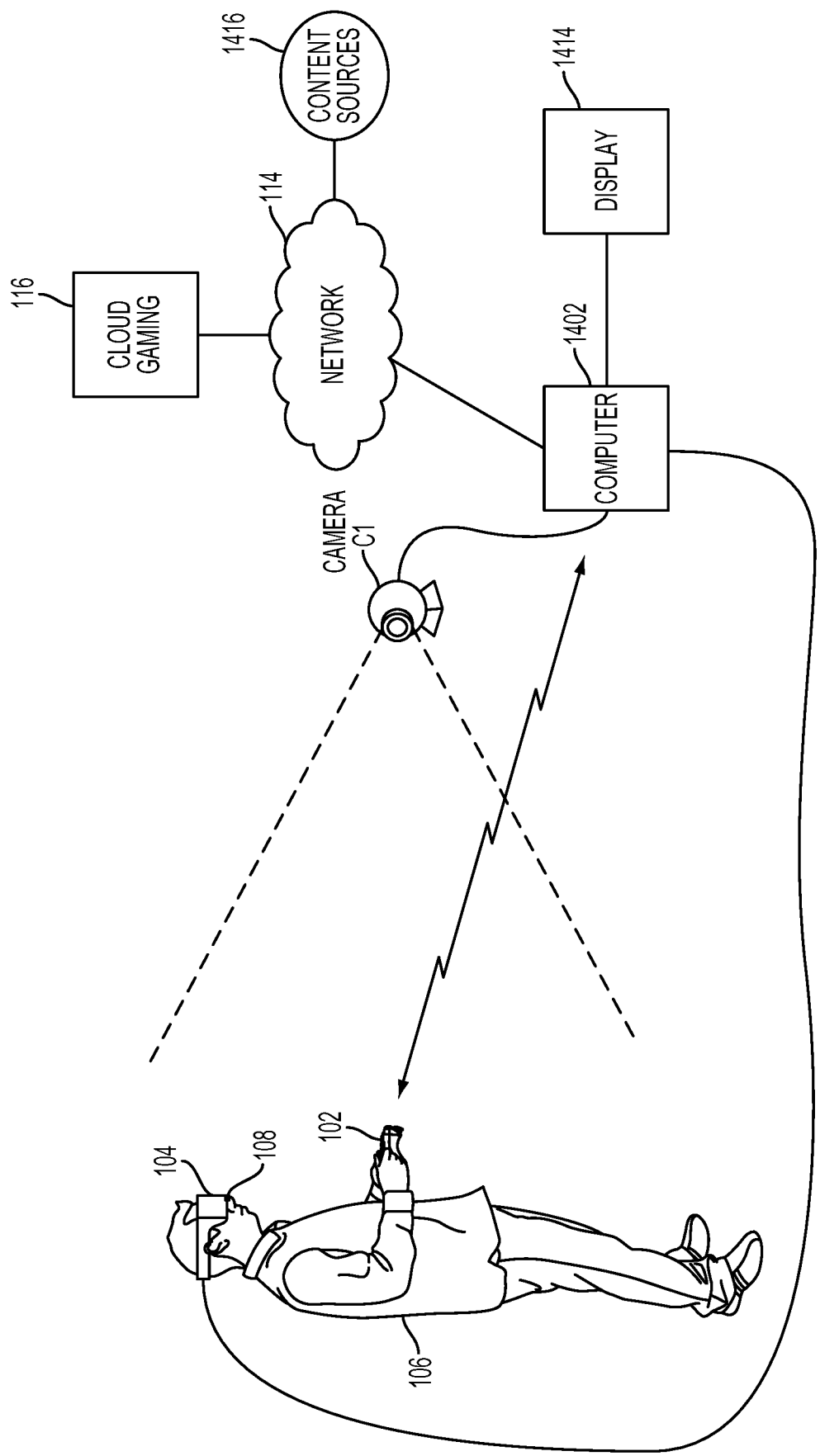
FIG. 14 illustrates a system for interactive game play of a video game.

FIG. 14 illustrates a system for interactive game play of a video game, in accordance with an embodiment described in the present disclosure. The user 106 is shown wearing the HMD 104. The HMD 104 is worn in a manner similar to glasses, goggles, or a helmet, and is configured to display a video game or other content to the user 106. The HMD 104 provides an immersive experience to the user 106 by virtue of its provision of display mechanisms (e.g., optics and display screens) in close proximity to the user's eyes and the format of content that is delivered to the HMD 104. In one example, the HMD 104 provides display regions to each of the eyes of the user 106 and the display regions occupy large portions or even the entirety of a field-of-view of the eyes of the user 106. As another example, the user 106 feels as if he/she is in, e.g., is a part of, etc., an interactive environment that is displayed on the HMD 104.

In one embodiment, the HMD 104 is connected to a computer 1402, which is an example of the computing device 112 (FIG. 1A). The connection to the computer 1402 is wired or wireless. The computer 1402, in one embodiment, is any general or special purpose computer, including but not limited to, a game console, a personal computer, a laptop, a tablet, a mobile device, a smart phone, a tablet, a thin client, a set-top box, a media streaming device, a smart television, etc. In some embodiments, the HMD 104 connects directly to the Internet, which may allow for cloud gaming without the need for a separate local computer. For example, functionality of the computer 1402 are integrated into one or more processors of the HMD 104. In one embodiment, the computer 1402 executes a video game (and other digital content), and outputs video and audio data from the video game for rendering by the HMD 104.

The computer 1402, in one embodiment, is a local or remote computer, and the computer 1402 runs emulation software. In a cloud gaming embodiment, the computer 1402 is remote, such as within the game cloud system 116, and is represented by a plurality of computing services that are implemented in data centers, where game systems/logic is employed and distributed to the user 106 over the computer network 114.

The user 106 operates the HHC 102 to provide the input data for an interactive environment. In one example, a camera C1 captures images of the real-world environment in which the user 106 is located. The camera C1 is an example of the camera 118 (FIG. 1A). These captured images are analyzed to determine a location and movements of the user 106, the HMD 104, and the HHC 102. In one embodiment, the HHC 102 includes a light, or lights, which are tracked to determine its location and orientation. Additionally, in one embodiment, the HMD 104 includes one or more lights, which are tracked as markers to determine the location and orientation of the HMD 104 in substantial real-time during a display of an interactive environment.

The camera C1, in one embodiment, includes one or more microphones of a microphone array to capture sound from the real-world space. Sound captured by the microphone array of the camera C1 is processed to identify the location of a sound source. Sound from an identified location is selectively utilized or processed to exclusion of other sounds not from the identified location. Furthermore, in one embodiment, the camera C1 includes multiple image capture devices, e.g., stereoscopic pair of cameras, an infrared (IR) camera, a depth camera, and combinations thereof.

In some embodiments, the computer 1402 executes games locally on a processing hardware, such as one or more processors, of the computer 1402. The games or content is obtained in any form, such as physical media form (e.g., digital discs, tapes, cards, thumb drives, solid state chips or cards, etc.) or by way of download from the computer network 114. In an embodiment, the computer 1402 functions as a client in communication over the computer network 114 with the game cloud system 116. The game cloud system 116 maintains and executes the video game being played by the user 106. The computer 1402 transmits the input data received from the HMD 104 and the HHC 102, and/or images received from the camera C1, to the game cloud system 116, which processes the input data and the images to affect a game state of the virtual scene. An output from executing the video game, such as video data, audio data, and haptic feedback data, is transmitted to the computer 1402. The computer 1402 further processes the data before transmission or directly transmits the data to the relevant devices. For example, video and audio streams are provided to the HMD 104, whereas a vibration feedback command is provided to the HHC 102.

In one embodiment, the HMD 104, the HHC 102, and the camera C1, are networked devices that connect to the computer network 114 to communicate with the game cloud system 116. For example, the computer 1402 is a local network device, such as a router, that does not otherwise perform video game processing, but facilitates passage, such as sending and receiving, of network traffic. The connections to the computer network 114 by the HMD 104, the HHC 102, and camera C1 are wired or wireless. In some embodiments, content that is displayed on the HMD 104 or displayed on a display device 1414, e.g., a television, a liquid crystal display (LCD) display device, a light emitting diode (LED) display device, a plasma display device, a computer monitor, etc., is obtained from any of content sources 1416. Example content sources include, for instance, internet websites that provide downloadable content and/or streaming content. In some examples, the content includes any type of multimedia content, such as movies, games, static/dynamic content, pictures, social media content, social media websites, interactive tour content, cartoon content, etc.

In one embodiment, the user 106 is playing a game on the HMD 104, where such content is immersive three-dimensional interactive content. The content on the HMD 104, while the user 106 is playing, is shared to the display device 1414. In one embodiment, the content shared to the display device 1414 allows other users proximate to the user 106 or remote to watch along with game play of the user 106. In still further embodiments, another player viewing the game play of the user 106 on the display device 1414 participates interactively with the user 106. For example, a user viewing the game play on the display device 1414 controls characters in the game scene, provides feedback, provides social interaction, and/or provides comments (via text, via voice, via actions, via gestures, etc.) which enables the user who is not wearing the HMD 104 to socially interact with the user 106.

In one embodiment, the computer 1402, as referred to herein, includes a personal computer, or a game console, or a tablet computer, or a smart phone, or a set-top box, or a kiosk, or a wireless device, or a digital pad, or a stand-alone device, or a handheld game playing device, etc. In an embodiment, the computer 1402 receives encoded video streams, decodes the video streams, and presents the resulting video to the user 106, e.g., a player of a game. The process of receiving encoded video streams and/or decoding the video streams typically includes storing individual video frames in a receive buffer of the computer 1402. The video streams are presented to the user 106 on a display integral to the computer 1402 or on a separate device such as a monitor or television or an HMD.

The computer 1402, in one embodiment, supports more than one game player. For example, a game console supports two, three, four or more simultaneous players (e.g., P1, P2, . . . Pn). Each of these players receives or shares a video stream, or a single video stream includes regions of a frame generated specifically for each player, e.g., generated based on each player's point of view. Any number of computers are local (e.g., co-located) or are geographically dispersed. The number of computers included in a game system varies widely from one or two to thousands, tens of thousands, or more. As used herein, the term "game player" is used to refer to a person that plays a game and the term "game playing device" is used to refer to a device used to play a game.

In some embodiments, the game playing device refers to a plurality of computing devices that cooperate to deliver a game experience to a user. For example, a game console and an HMD cooperate with a video server system to deliver a game viewed through the HMD. As another example, the game console receives a video stream from the video server system and the game console forwards the video stream, or updates to the video stream, to an HMD and/or television for rendering.

Still further, an HMD is used for viewing and/or interacting with any type of content produced or used, such as, for example, video game content, movie content, video clip content, web content, advertisement content, contest content, gambling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content is rendered so long as it is viewed in the HMD or rendered to a screen or screen of the HMD.

In an embodiment, computers further include systems that modify received video. For example, a computer performs further rendering, to overlay one video image on another video image, to crop a video image, and/or the like. As another example, computers receive various types of video frames, such as I-frames, P-frames and B-frames, and to process these frames into images for display to a user. In some embodiments, a part of a computer performs further rendering, shading, conversion to 3-D, conversion to two-dimensional (2D) image, distortion removal, sizing, or like operations on a video stream. In an embodiment, a part of a computer is receives more than one audio or video stream.

Input devices of computers includes, for example, a one-hand game controller, or a two-hand game controller, or a gesture recognition system, or a gaze recognition system, or a voice recognition system, or a keyboard, or a joystick, or a pointing device, or a force feedback device, or a motion and/or location sensing device, or a mouse, or a touch screen, or a neural interface, or a camera, or a combination of two or more thereof, etc.

A video source includes rendering logic, e.g., hardware, firmware, and/or software stored on a computer-readable medium such as storage. This rendering logic creates video frames of the video stream based on the game state. All or part of the rendering logic is optionally disposed within one or more graphics processing unit (GPU). Rendering logic includes processing stages for determining three-dimensional spatial relationships between objects and/or for applying appropriate textures, etc., based on the game state and viewpoint. The rendering logic produces raw video that is encoded. For example, the raw video is encoded according to an Adobe Flash® standard, HTML-5, .wav, H.264, H.263, On2, VP6, VC-1, WMA, Huffyuv, Lagarith, MPG-x, Xvid, FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600 pixels, 1280×720 pixels, 1024×768 pixels, 1080 pixels, although any other frame sizes may be used. The frame rate is the number of video frames per second. In one embodiment, a video stream includes different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, a computer is a general purpose computer, a special purpose computer, a game console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a computer as defined herein. In one embodiment, a cloud gaming server is configured to detect a type of a computer, which is being utilized by the user 106, and provide a cloud-gaming experience appropriate to the user's computer. For example, image settings, audio settings and other types of settings are optimized for the user's computer.

Figure 15:
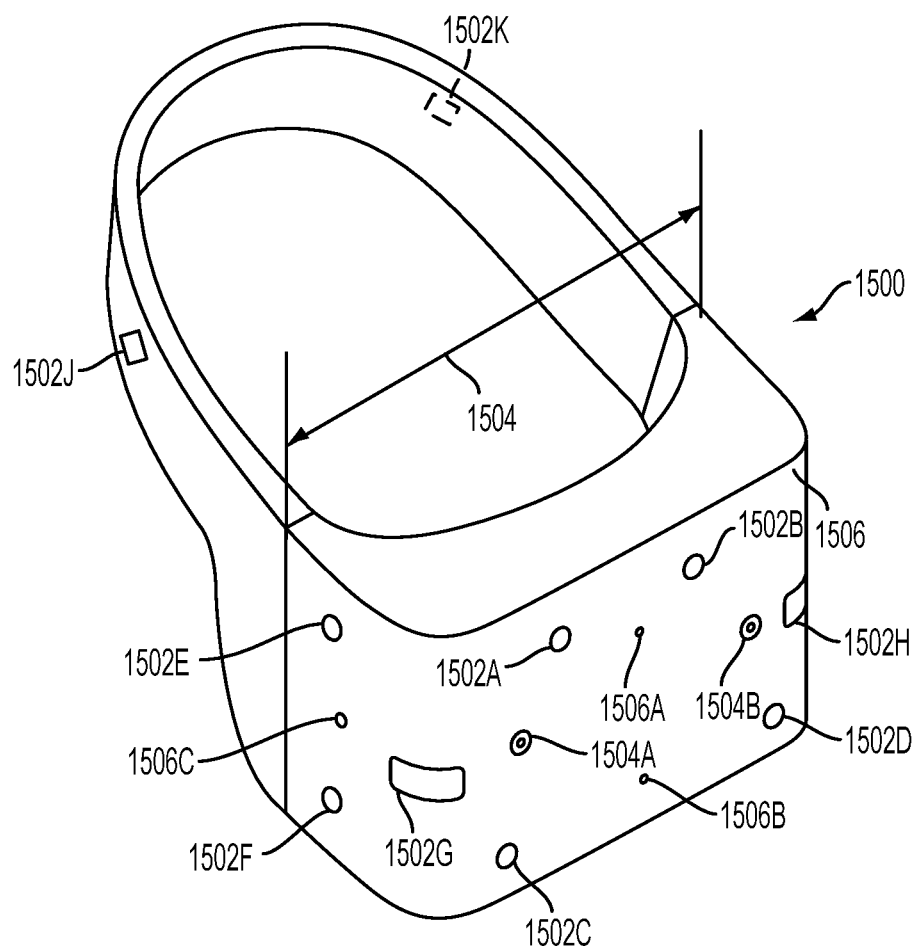
FIG. 15 illustrates an HMD.

FIG. 15 illustrates a head-mounted display (HMD) 1500, in accordance with an embodiment described in the present disclosure. The HMD 1500 is an example of the HMD 104 (FIG. 1A) and has a length 1504 that extends from one end of a front face 1506 of the HMD 1500 to an opposite end of the front face 1506 of the HMD 1500. The front face 1506 is an example of the front region 704 (FIG. 7A). As shown, the HMD 1500 includes a plurality of light sources 1502A-H, J and K (e.g., where 1502K and 1502J are located toward the rear or backside of the HMD headband). Each of these lights has specific shapes and/or positions, and is has the same or different colors. The lights 1502A, 1502B, 1502C, and 1502D are arranged on a front surface of the HMD 1500. The lights 1502E and 1502F are arranged on a side surface of the HMD 1500. And the lights 1502G and 1502H are arranged at corners of the HMD 1500, so as to span the front surface and a side surface of the HMD 1500. It will be appreciated that the lights are identified in captured images of an interactive environment in which the user 106 uses the HMD 1500.

Based on identification and tracking of the lights of the HMD 1500, the location and orientation of the HMD 1500 in the interactive environment is determined. It will further be appreciated that some of the lights are or are not visible depending upon the particular orientation of the HMD 1500 relative to an image capture device, e.g., a camera, a digital camera, a depth camera, an infrared camera, etc. Also, different portions of lights (e.g. lights 1502G and 1502H) are exposed for image capture depending upon the orientation of the HMD 1500 relative to the image capture device. In some embodiments, inertial sensors are disposed in the HMD 1500, which provide feedback regarding positioning, without the need for lights. In some embodiments, the lights and inertial sensors of the HMD 1500 work together, to enable mixing and selection of position/motion data.

In one embodiment, the lights of the HMD 1500 are configured to indicate a current status of the HMD 1500 to others users in the real space. For example, some or all of the lights have a color arrangement, an intensity arrangement, blink, have an on/off configuration, or other arrangement indicating a current status of the HMD 1500. By way of example, the lights of the HMD 1500 display different configurations during active game play of a video game (generally game play occurring during an active timeline or within a scene of the game) versus other non-active game play aspects of a video game, such as navigating menu interfaces or configuring game settings (during which the game timeline or scene is inactive or paused).

In an embodiment, the lights indicate relative intensity levels of game play. For example, the intensity of lights, or a rate of blinking, increases when the intensity of game play increases.

The HMD 1500, in one embodiment, additionally includes one or more microphones. In the illustrated embodiment, the HMD 1500 includes microphones 1504A and 1504B located on the front surface of the HMD 1500, and a microphone located on a side surface of the HMD 1500. By utilizing an array of microphones, sound from each of the microphones is processed to determine a location of the sound's source. This information is utilized in various ways, including exclusion of unwanted sound sources, association of a sound source with a visual identification, etc.

The HMD 1500 includes one or more image capture devices, such as cameras. In the illustrated embodiment, the HMD 1500 is shown to include image capture devices 1506A and 1506B. In an embodiment, by utilizing a stereoscopic pair of image capture devices, 3D images and video of a real-world environment in front of the HMD 1500 is captured from the perspective of the HMD 1500. Such video is presented to the user 106 to provide the user with a "video see-through" ability while wearing the HMD 1500. That is, though the user 106 cannot see through the HMD 1500 in a strict sense, the video captured by the image capture devices 1506A and 1506B nonetheless provides a functional equivalent of being able to see the real-world environment external to the HMD 1500 as if looking through the HMD 1500.

Such video, in one embodiment, is augmented with interactive elements to provide an augmented reality experience, or is combined or blended with interactive elements in other ways. Though in the illustrated embodiment, two cameras are shown on the front surface of the HMD 1500, it will be appreciated that there may be any number of externally facing cameras or a single camera is installed on the HMD 1500, and oriented in any direction. For example, in another embodiment, there may be cameras mounted on the sides of the HMD 1500 to provide additional panoramic image capture of the environment.

Figure 16:
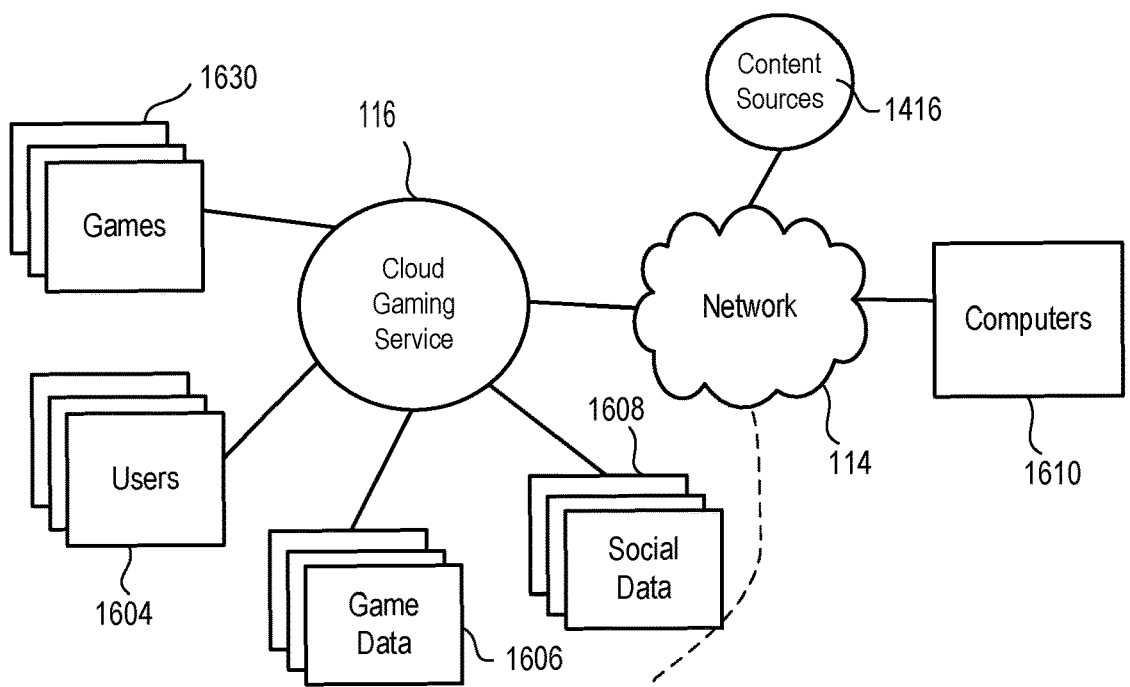
FIG. 16 illustrates one example of game play using a computer that is capable of generating and providing video game content to an HMD worn by a user.
Figure 16:
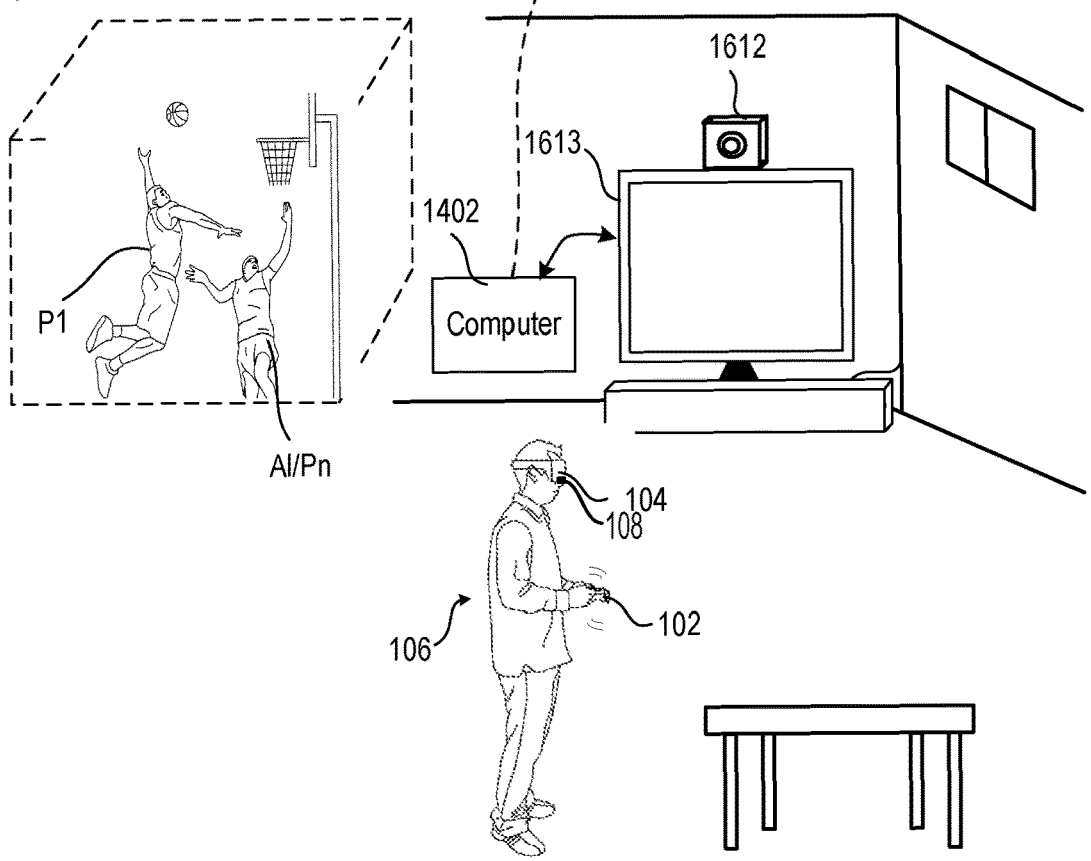

FIG. 16 illustrates one example of game play using the computer 1402 that is capable of generating and providing video game content to the HMD 104 worn by the user 106 for rendering on the HMD 104. In this illustration, a state of a virtual object, e.g., game content, etc., provided to the HMD 104 is in a rich interactive 3-D space. As discussed above, a state of an interactive object is downloaded to the computer 1402 or is executed in one embodiment by the game cloud system 116. The game cloud system 116 includes a database of user identifiers 1604 of users, who are allowed to access particular games 1630, share experiences with other friends, post comments, and manage their account information.

The game cloud system 116 stores game data 1606 for specific user identifiers, and the game data 1606 is usable during game play, for future game play, for sharing to a social media network, or used for storing trophies, awards, status, ranking, etc. Social data 1608 is managed by the game cloud system 116. In one embodiment, the social data 1608 is managed by a separate social media network, which is interfaced with the game cloud system 116 over the computer network 114. Over the computer network 114, any number of computers 1610, including the computer 1402, is connected for access to the content and interaction with other users.

Continuing with the example of FIG. 16, the three-dimensional interactive scene viewed in the HMD 104 includes game play, such as the characters illustrated in a 3-D view, or another interactive environment. One character, e.g. P1, etc., is controlled by the user 106 that is wearing the HMD 104. This example shows a basketball scene between two players, where a character, such as an avatar, controlled by the HMD user 106 is dunking a ball on another character in the 3-D view. The other character is an AI (artificial intelligence) character of the game, or is controlled by another player or players (Pn). A camera 1612 is shown positioned over a display screen in the room, however, for HMD use. In one embodiment, the camera 1612 is placed in any location that captures images of the HMD 104. The camera 1612 is an example of the camera C1 (FIG. 14). As such, the user 106 is shown turned at about 90 degrees from the camera 1612. A display device 1613 displays content rendered in the HMD 104 and a scene within the display device 1613 is dependent on a direction that the HMD 104 is positioned, from the perspective of the camera 1612. Of course, during HMD use, the user 106 is moving about, turning his head, looking in various directions, as is needed to take advantage of the dynamic interactive scenes rendered by the HMD 104.

Figure 17:
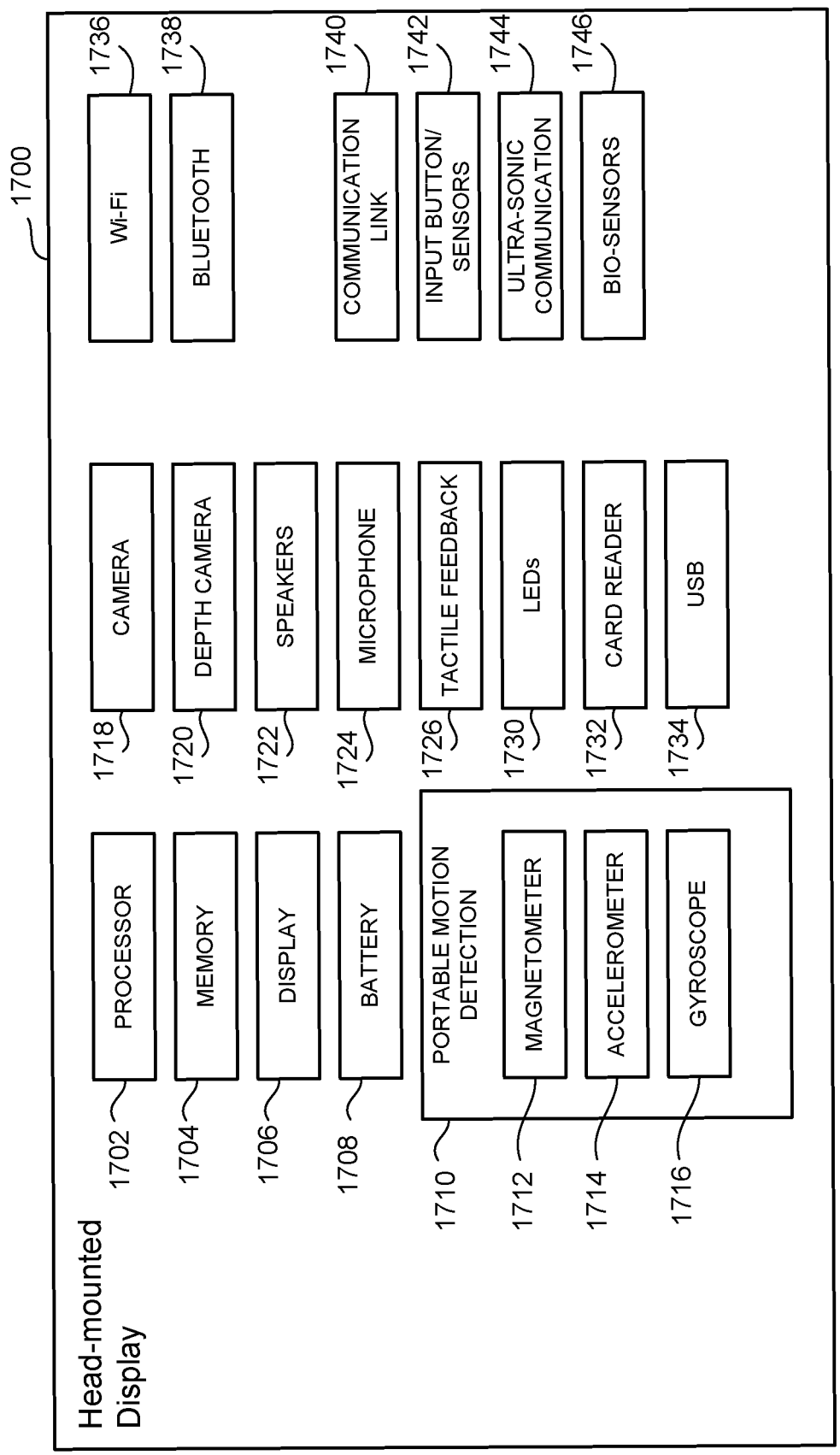
FIG. 17 is a block diagram to illustrate example components of an HMD.

With reference to FIG. 17, a diagram is shown illustrating example components of an HMD 1700, in accordance with an embodiment described in the present disclosure. The HMD 1700 is an example of the HMD 104 (FIG. 1) or the HMD 602 (FIG. 6) or the HMD 700 (FIGS. 7A and 7B), or the HMD 800 (FIG. 8A), or the HMD 820 (FIG. 8B), or the HMD 822 (FIG. 8C), or the HMD 824 (FIG. 8D), or the HMD 826 (FIG. 8E), or the HMD 902 (FIG. 9A), or the HMD 904 (FIG. 9B), or the HMD 906 (FIG. 9C), or the HMD 1002 (FIG. 10A), or the HMD 1024 (FIG. 10B), or the HMD 1204 (FIG. 12), or the HMD 1300 (FIG. 13), or the HMD 1500 (FIG. 15). It should be understood that in one embodiment, more or less components are included or excluded from the HMD 1700, depending on the configuration and functions enabled. The HMD 1700 includes a processor 1702 for executing program instructions. A memory 1704 is provided for storage purposes, and in one embodiment, includes both volatile and non-volatile memory. A display 1706 is included which provides a visual interface that the user 106 views. Examples of the display 1706 include one or more display devices having one or more display screens.

The display 1706 is defined by one single display, or in the form of a separate display screen for each eye. When two display screens are provided, it is possible to provide left-eye and right-eye video content separately. Separate presentation of video content to each eye, for example, provides for better immersive control of 3D content. As described herein, in one embodiment, the second screen is provided with second screen content of the HMD 1700 by using the output for one eye, and then formatting the content for display in a 2D format. The one eye, in one embodiment, is the left-eye video feed, but in other embodiments, is the right-eye video feed.

A battery 1708 is provided as a power source for the components of the HMD 1700. In other embodiments, the power source includes an outlet connection to power. In other embodiments, an outlet connection to power and the battery 1708 are provided. A motion detection module 1710 includes any of various kinds of motion sensitive hardware, such as a magnetometer 1712, an accelerometer 1714, and a gyroscope 1716.

An accelerometer, as described herein, is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers are used to provide the direction of gravity, which gives an absolute reference for two angles (world-space pitch and world-space roll).

A magnetometer, as described herein, measures the strength and direction of a magnetic field in the vicinity of an HMD. In one embodiment, three magnetometers are used within an HMD, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field is warped due to metal in the environment, which causes a warp in the yaw measurement. If necessary, this warp is calibrated using information from other sensors such as the gyroscope or the camera. In one embodiment, the accelerometer 1714 is used together with magnetometer 1712 to obtain an inclination and azimuth of the HMD 1700.

A gyroscope, as used herein, is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes drift overtime without the existence of an absolute reference. To reduce the drift, the gyroscopes are reset periodically, which is done using other available information, such as positional/orientation determination based on visual tracking of an object, accelerometer, magnetometer, etc.

A camera 1718 is provided for capturing images and image streams of the real-world environment. The camera 1718 is an example of the camera 108 of the HMD 104, or of the camera 604A of the HMD 602 (FIG. 6), or of the camera 604B of the HMD 602, or of the camera 710 of the HMD 700 (FIG. 7A), or of the camera 752A (FIG. 7C), or of the camera 752B (FIG. 7C), or of the camera 754A (FIG. 7D), or of the camera 754B (FIG. 7D), or of the camera 754C (FIG. 7D). In one embodiment, more than one camera (optionally) is included in the HMD 1700, including a camera that is rear-facing, e.g., externally facing (directed away from the user 106 when the user 106 is viewing the display of the HMD 1700), etc., and a camera that is front-facing (directed towards the user 106 when the user is viewing the display of the HMD 1700). Additionally, in an embodiment, a depth camera 1720 is included in the HMD 1700 for sensing depth information of objects in the real-world environment. The depth camera 1720 is an externally facing camera. The depth camera 1720 is another example of the camera 108 of the HMD 104, or of the camera 604A of the HMD 602 (FIG. 6), or of the camera 604B of the HMD 602, or of the camera 710 of the HMD 700 (FIG. 7), or of the camera 752A (FIG. 7C), or of the camera 752B (FIG. 7C), or of the camera 754A (FIG. 7D), or of the camera 754B (FIG. 7D), or of the camera 754C (FIG. 7D).

The HMD 1700 includes speakers 1722 for providing audio output. Also, in one embodiment, a microphone 1724 is included for capturing audio from the real-world space, including sounds from an ambient environment, speech made by the user 106, etc. In an embodiment, the HMD 1700 includes a tactile feedback module 1726, e.g., haptic feedback device, etc., for providing tactile feedback to the user 106. In one embodiment, the tactile feedback module 1726 is capable of causing movement and/or vibration of the HMD 1700 so as to provide tactile feedback to the user 106.

LEDs 1730 are provided as visual indicators of status of the HMD 1700. For example, an LED indicates battery level, power on, etc. A card reader 1732 is provided to enable the HMD 1700 to read and write information to and from a memory card. A USB interface 1734 is included as one example of an interface for enabling connection of peripheral devices, or connection to other devices, such as other portable devices, computers, etc. In various embodiments of the HMD 1700, any of various kinds of interfaces may be included to enable greater connectivity of the HMD 1700.

In an embodiment, a Wi-Fi™ module 1736 is included for enabling connection to the computer network 114 or to the computing device 112 via wireless networking technologies. Also, in one embodiment, the HMD 1700 includes a Bluetooth™ module 1738 for enabling wireless connection to other devices, e.g., a game console, the computing device 112, etc. A communications link 1740 is included for connection to other devices. In one embodiment, the communications link 1740 utilizes infrared transmission for wireless communication. In other embodiments, the communications link 1740 utilizes any of various wireless or wired transmission protocols for communication with other devices.

Input buttons/sensors 1742 are included to provide an input interface for the user 106. Any of various kinds of input interfaces may be included, such as buttons, etc. In one embodiment, an ultra-sonic communication module 1744 is included in HMD 1700 for facilitating communication with other devices via ultra-sonic technologies.

In an embodiment, bio-sensors 1746 are included to enable detection of physiological data, e.g., the biometric information, etc., from the user 106. In one embodiment, the bio-sensors 1746 include one or more dry electrodes for detecting bio-electric signals of the user 106 through the user's skin, voice detection, eye retina detection to identify users/profiles, etc.

One or more processors, such as the processor 1702, of the HMD 1700 are coupled to the memory 1704, the display 1706, the battery 1708, the motion detection module 1710, the camera 1718, the depth camera 1720, the speakers 1722, the microphone 1724, the tactile feedback module 1726, the LEDs 1730, the card reader 1732, the USB interface 1734, the Wi-Fi™ module 1736, the Bluetooth™ module 1738, the communication link 1740, the input buttons/sensors 1742, the ultra-sonic communication module 1744, and the bio-sensors 1746.

The foregoing components of HMD 1700 have been described as merely exemplary components that may be included in HMD 1700. In various embodiments described in the present disclosure, the HMD 1700 may or may not include some of the various aforementioned components. Embodiments of the HMD 1700 may additionally include other components not presently described, but known in the art, for purposes of facilitating aspects of the present invention as herein described.

In an embodiment, the HMD 1700 includes a wireless access card (WAC), such as a network interface controller (NIC) or a network interface card, to communicate with the computer network 114.

Figure 18:
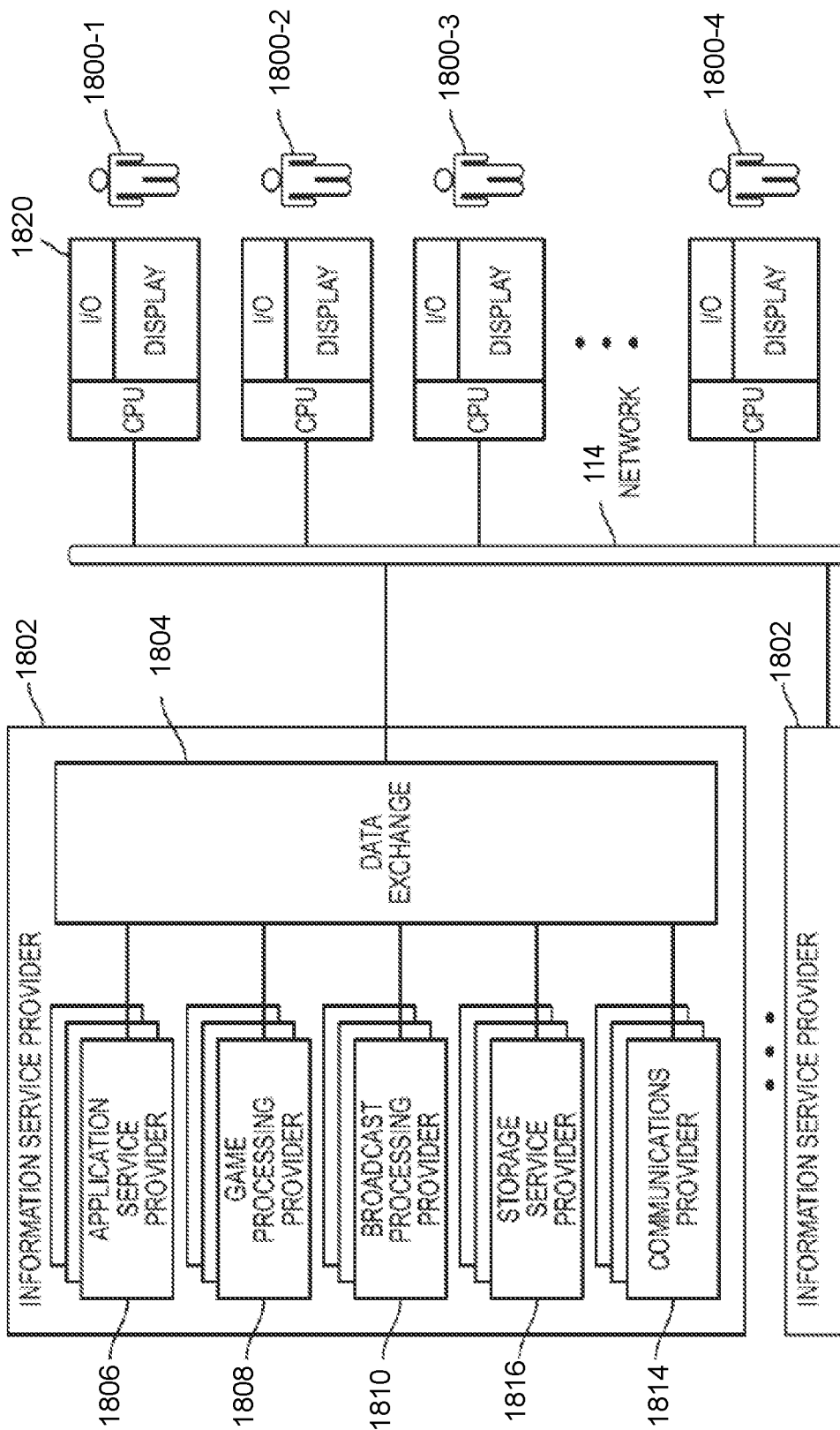
FIG. 18 illustrates an embodiment of an Information Service Provider architecture.

FIG. 18 illustrates an embodiment of an Information Service Provider architecture. Information Service Providers (ISP) 1802 delivers a multitude of information services to users 1800-1, 1800-2, 1800-3, 1800-4, etc., geographically dispersed and connected via the network 114. In one embodiment, an ISP delivers one type of service, such as stock price updates, or a variety of services such as broadcast media, news, sports, gaming, etc. Additionally, the services offered by each ISP are dynamic, that is, services are added or taken away at any point in time. Thus, the ISP providing a particular type of service to a particular individual changes over time. For example, the user 106 is served by an ISP in near proximity to the user 106 while the user 106 is in her home town, and the user 106 is served by a different ISP when the user 106 travels to a different city. The home-town ISP will transfer information and data to the new ISP, such that information regarding the user 106 "follows" the user 106 to the new city making the data closer to the user 106 and easier to access. In another embodiment, a master-server relationship is established between a master ISP, which manages the information for the user 106, and a server ISP that interfaces directly with the user 106 under control from the master ISP. In another embodiment, the data is transferred from one ISP to another ISP as a computer moves around the world to make the ISP in better position to service the user 106 be the one that delivers these services.

ISP 1802 includes an application service provider (ASP) 1806, which provides computer-based services to customers over the network 114. Software offered using an ASP model is also sometimes called on-demand software or software as a service (SaaS). A simple form of providing access to a particular application program (such as customer relationship management) is by using a standard protocol such as hypertext transfer protocol (HTTP). The application software resides on the vendor's system and is accessed by users through a web browser using hypertext markup language (HTML), by special purpose client software provided by the vendor, or other remote interface such as a thin client.

Services delivered over a wide geographical area often use cloud computing. Cloud computing is a style of computing in which dynamically scalable resources are provided as a service over the network 114. Users do not need to be an expert in the technology infrastructure in the "cloud" that supports them. In one embodiment, cloud computing are divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1802 includes a game processing server (GPS) 1808, which is used by game computers to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS 1808 establishes communication between the players and their respective game-playing devices exchange information without relying on the centralized GPS 1808.

Dedicated GPSs are servers which run independently of a computer. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

A broadcast processing server (BPS) 1810 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content reaches almost any country in the world.

A storage service provider (SSP) 1812 provides computer storage space and related management services. SSPs also offer periodic backup and archiving. By offering storage as a service, users orders more storage as needed. Another major advantage is that SSPs include backup services and users will not lose all their data if their computers' hard drives fail. Further, in an embodiment, a plurality of SSPs have total or partial copies of the user data, allowing users to access data in an efficient way independently of where the user is located or the device being used to access the data. For example, the user 106 accesses personal files in a home computer, as well as in a mobile phone while the user 106 is on the move.

A communications provider 1814 provides connectivity to users. One kind of communications provider is an Internet Service Provider (ISP) which offers access to the Internet. The ISP connects its customers using a data transmission technology appropriate for delivering Internet Protocol datagrams, such as dial-up, digital subscriber line (DSL), cable modem, fiber, wireless or dedicated high-speed interconnects. The Communications Provider also provides messaging services, such as e-mail, instant messaging, and short message service (SMS) texting. Another type of communications provider is a Network Service provider (NSP), which sells bandwidth or network access by providing direct backbone access to the Internet. Network service providers, in one embodiment, include telecommunications companies, data carriers, wireless communications providers, Internet service providers, cable television operators offering high-speed Internet access, etc.

A data exchange 1804 interconnects the several modules inside ISP 1802 and connects these modules to users 1600 via the network 114. The data exchange 1804 covers a small area where all the modules of ISP 1802 are in close proximity, or covers a large geographic area when the different modules are geographically dispersed. For example, the data exchange 1688 includes a fast Gigabit Ethernet (or faster) within a cabinet of a data center, or an intercontinental interactive area network (VLAN).

Each user 1800-1, 1800-2, 1800-3, and 1800-4 accesses the remote services with a client device 1820, which includes at least a CPU, a display and input/output interface (I/O). In one embodiment, a client device is a personal computer (PC), a mobile phone, a netbook, tablet, gaming system, a personal digital assistant (PDA), an HMD, a computing device, a combination of the HMD and the computing device, etc. In one embodiment, the ISP 1802 recognizes a type of client device and adjusts the communication method employed. In other cases, client devices use a standard communications method, such as HTML, to access the ISP 1802.

Figure 19:
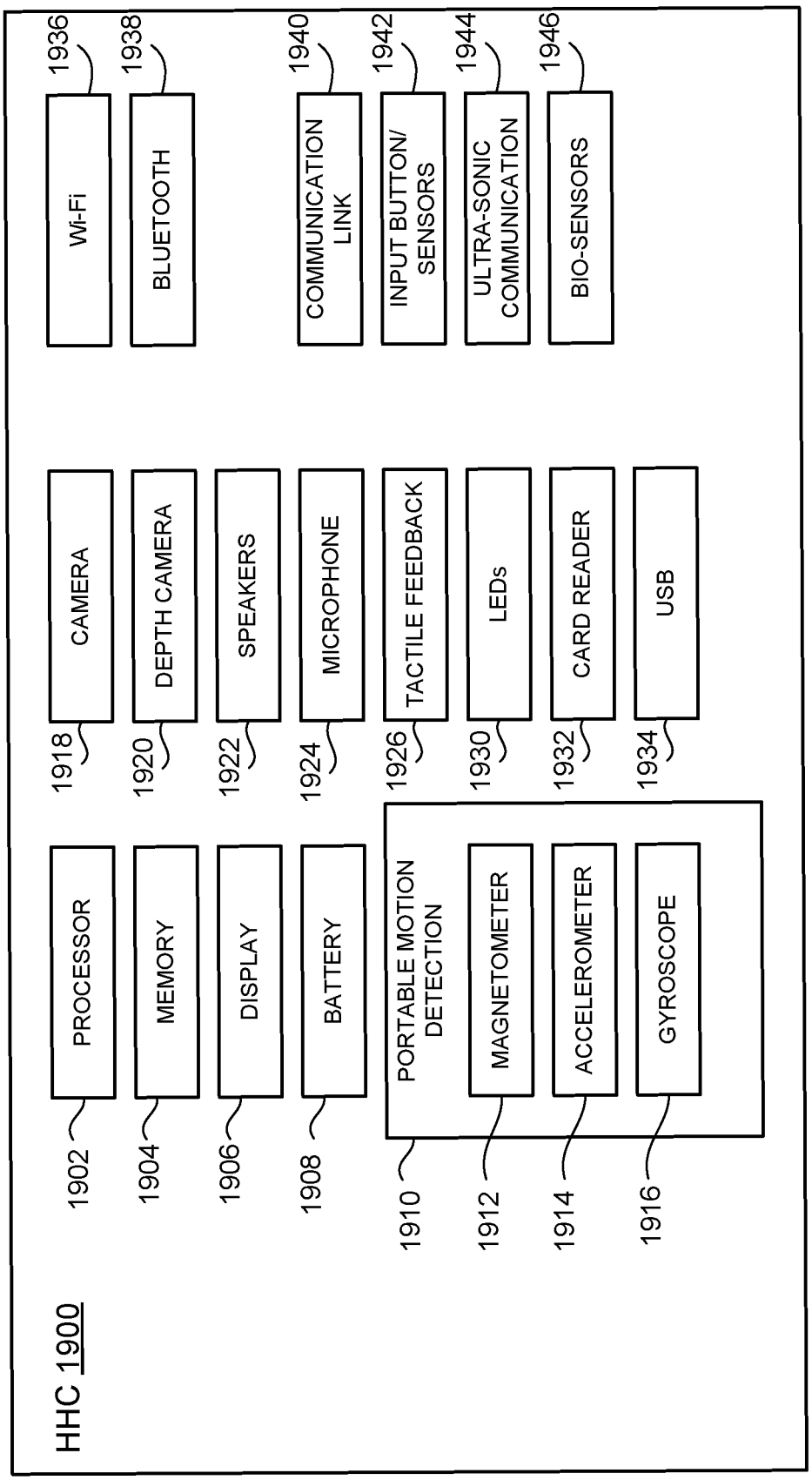
FIG. 19 is a block diagram to illustrate example components of an HHC.

With reference to FIG. 19, a diagram is shown illustrating example components of an HHC 1900, in accordance with an embodiment described in the present disclosure. The HHC 1900 is an example of the HHC 102 (FIG. 1A) or the HHC 500 (FIG. 5A). It should be understood that in one embodiment, more or less components are included or excluded from the HHC 1900, depending on the configuration and functions enabled. The HHC 1900 includes a processor 1902 for executing program instructions. A memory 1904 is provided for storage purposes, and in one embodiment, includes both volatile and non-volatile memory. A display 1906 is included which provides a visual interface that the user 106 views.

A battery 1908 is provided as a power source for the HHC 1900. In other embodiments, the power source includes an outlet connection to power. In other embodiments, an outlet connection to power and the battery 1908 are provided. A motion detection module 1910 includes any of various kinds of motion sensitive hardware, such as a magnetometer 1912, an accelerometer 1914, and a gyroscope 1916.

A magnetometer measures the strength and direction of the magnetic field in the vicinity of an HHC. In one embodiment, three magnetometers are used within an HHC, ensuring an absolute reference for the world-space yaw angle. In one embodiment, accelerometer 1914 is used together with magnetometer 1912 to obtain an inclination and azimuth of the HHC 1900.

A camera 1918 is provided for capturing images and image streams of the real-world environment surrounding the HHC 1900. For example, the camera 1918 captures images of the HMD 104 (FIG. 1A) or of any other HMDs, such as the HMD 700 (FIG. 7A), described herein. In one embodiment, more than one camera (optionally) is included in the HHC 1900, including a camera that is externally facing (directed away from the HHC 1900). Additionally, in an embodiment, a depth camera 1920 is included in the HHC 1900 for sensing depth information of objects in the real-world environment. The depth camera 1920 is an externally facing camera. For example, the depth camera 1920 captures images of the HMD 104 (FIG. 1A) or of any other HMDs, such as the HMD 700 (FIG. 7A), described herein.

The HHC 1900 includes speakers 1922 for providing audio output. Also, in one embodiment, a microphone 1924 is included for capturing audio from the real-world space, including sounds from an ambient environment, speech made by the user 106, etc. In an embodiment, the HHC 1900 includes tactile feedback module 1926, e.g., haptic feedback device, etc., for providing tactile feedback to the user 106. In one embodiment, the tactile feedback module 1926 is capable of causing movement and/or vibration of the HHC 1900 so as to provide tactile feedback to the user 106.

LEDs 1930 are provided as visual indicators of status of the HHC 1900. For example, an LED indicates battery level, power on, etc. A USB interface 1934 is included as one example of an interface for enabling connection of peripheral devices, or connection to other devices, such as other portable devices, computers, etc. In various embodiments of the HHC 1900, any of various kinds of interfaces may be included to enable greater connectivity of the HHC 1900.

In an embodiment, a Wi-Fi™ module 1936 is included for enabling connection to the computing device 112 via wireless networking technologies to connect to the computer network 114 via the computing device 112. Also, in one embodiment, the HHC 1900 includes a Bluetooth™ module 1938 for enabling wireless connection to other devices, e.g., the computing device 112, etc. A communications link 1940 is included for connection to other devices, such as the HMD 104 or any other HMDs described herein. In one embodiment, the communications link 1940 utilizes infrared transmission for wireless communication. In other embodiments, the communications link 1940 utilizes any of various wireless or wired transmission protocols for communication with other devices.

Input buttons/sensors 1942 are included to provide an input interface for the user 106. Any of various kinds of input interfaces may be included, such as buttons, capacitive devices, touchpad, joystick, trackball, etc. In one embodiment, an ultra-sonic communication module 1944 is included in HHC 1900 for facilitating communication with other devices via ultra-sonic technologies.

In an embodiment, bio-sensors 1946 are included to enable detection of physiological data, e.g., the biometric information, etc., from the user 106. In one embodiment, the bio-sensors 1946 include one or more dry electrodes for detecting bio-electric signals of the user 106 through the user's skin, voice detection, eye retina detection to identify users/profiles, etc.

One or more processors, such as the processor 1902, of the HHC 1900 are coupled to the memory 1904, the display 1906, the battery 1908, the motion detection module 1910, the camera 1918, the depth camera 1920, the speakers 1922, the microphone 1924, the tactile feedback module 1926, the LEDs 1930, the USB interface 1934, the Wi-Fi™ module 1936, the Bluetooth™ module 1938, the communication link 1940, the input buttons/sensors 1942, the ultra-sonic communication module 1944, and the bio-sensors 1946.

In an embodiment, the HHC 1900 includes a WAC, such as a NIC or a network interface card, to communicate with the computer network 114.

The foregoing components of HHC 1900 have been described as merely exemplary components that may be included in HHC 1900. In various embodiments described in the present disclosure, the HHC 1900 may or may not include some of the various aforementioned components. Embodiments of the HHC 1900 may additionally include other components not presently described, but known in the art, for purposes of facilitating aspects of the present invention as herein described.

In one embodiment, the computing device 112 and/or the one or more servers of the game cloud system 116 is sometimes referred to herein as a processing device. For example one or more processors of the computing device 112 and/or one or more processors of the game cloud system 116 are sometimes referred to herein as a processing device.

Embodiments described in the present disclosure may be practiced with various computer system configurations including hand-held devices, microprocessor systems, microprocessor-based or programmable consumer electronics, minicomputers, mainframe computers and the like. The embodiments described in the present disclosure can also be practiced in distributed computing environments where tasks are performed by remote processing devices that are linked through a wire-based or wireless network.

With the above embodiments in mind, it should be understood that the embodiments described in the present disclosure can employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Some embodiments described in the present disclosure can also be embodied as computer-readable code on a computer-readable medium. The computer-readable medium is any data storage device that can store data, which can be thereafter be read by a computer system. Examples of the computer-readable medium include a hard drive, a NAS, a ROM, a RAM, a CD-ROM, a CD-R, a CD-RW, a magnetic tape, an optical data storage device, a non-optical data storage device, etc. The computer-readable medium can include computer-readable tangible medium distributed over a network-coupled computer system so that the computer-readable code is stored and executed in a distributed fashion.

It should be noted that in an embodiment, one or more features that are described in an embodiment of the present disclosure can be combined with one or more features described in another embodiment described in the present disclosure.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A system for tracking a hand-held controller relative to a head mounted display (HMD), comprising:
the hand-held controller, wherein the hand-held controller includes a touchpad and a light indicator, wherein the light indicator is configured to emit light;
the HMD configured to be worn on a head of a user, wherein the HMD is configured to display a plurality of image scenes having content generated by execution of an application, wherein the HMD has a lower region having a first camera, wherein the first camera has a capture view directed downward from the HMD, wherein the light indicator of the hand-held controller is located along an edge of the touchpad to be visible to the first camera of the lower region of the HMD with the touchpad, wherein the first camera is configured to detect the light emitted from the light indicator to capture a first plurality of images of the hand-held controller, wherein the HMD has a front region having a second camera, wherein the second camera has a capture view different from the capture view of the first camera, wherein the second camera is configured to detect the light emitted from the light indicator to capture a second plurality of images of the hand-held controller when the hand-held controller is outside the capture view of the first camera; and
a processing device associated with the HMD, wherein the processing device is configured to receive a plurality of images of a real-world environment surrounding the HMD, receive the first plurality of images of the hand-held controller from the first camera, and receive the second plurality of images of the hand-held controller from the second camera, wherein the processing device is configured to determine a position and movement of the HMD within the real-world environment from the plurality of images of the real-world environment, wherein the processing device is configured to determine a position and movement of the hand-held controller relative to the HMD from the first plurality of images of the hand-held controller and the second plurality of images of the hand-held controller, wherein the processing device is configured to modify a state output by execution of the application according to the position and movement of the HMD and the position and movement of the hand-held controller,
wherein the HMD is configured to update the plurality of image scenes displayed in the HMD according to the modification of the state.

2. The system of claim 1, wherein the first camera has the capture view that is directed downward to capture a movement of the hand-held controller in an interaction zone, wherein the interaction zone is located below the first camera.

3. The system of claim 2, wherein the interaction zone is a polygonal volume that extends from the first camera towards a floor of the real-world environment.

4. The system of claim 1, wherein the HMD includes an eye mask, wherein the lower region is a bottom surface of the eye mask of the HMD, wherein the bottom surface is not connected to a top headband strap and is not configured to cover eyes of a user, wherein the eye mask has the front region, wherein the front region is configured to cover the eyes of the user, wherein the front region is located adjacent to an upper region of the HMD, wherein the upper region is connected to the top headband strap.

5. The system of claim 1, wherein the capture view of the first camera is a field-of-view of a lens of the first camera, wherein the field-of-view includes a portion of the real-world environment that is seen by the first camera, wherein the portion has a horizontal range, a vertical range, and a diagonal range.

6. The system of claim 1, wherein the capture view of the first camera is a field-of-view that includes a reference point within the real-world environment, wherein the reference point falls at an intersection of a first wall within the real-world environment, a second wall within the real-world environment, and a floor within the real-world environment.

7. The system of claim 1, wherein the capture view of the first camera is a field-of-view that includes a reference point within the real-world environment, wherein the reference point falls at an intersection of a vertical surface of an object within the real-world environment and a horizontal surface of the object.

8. The system of claim 1, wherein the processing device is a game console that is coupled to the HMD via a wired or a wireless connection.

9. The system of claim 1, wherein the processing device is a server that is coupled to the HMD via a computer network.

10. The system of claim 1, wherein the capture view of the first camera is a field-of-view that includes a reference point within the real-world environment, wherein the position and movement of the HMD with respect to the reference point is determined from the plurality of images of the real-world environment.

11. The system of claim 10, wherein the first camera provides another reference point within the real-world environment, wherein the position of the hand-held controller is determined with reference to the other reference point of the HMD.

12. The system of claim 1, wherein the HMD has an eye mask, wherein the front region is a front surface of the eye mask.

13. The system of claim 12, wherein the second camera is located on a first portion of the front region, wherein the HMD has a third camera, wherein the third camera is located on a second portion of the front region, wherein the third camera has a capture view different from the capture view of the second camera.

14. The system of claim 12, wherein the processing device is configured to determine the movement of the hand-held controller based on a first time at which the first plurality of images are captured by the first camera and a second time at which the second plurality of images are captured by the second camera, wherein the HMD is configured to update the plurality of image scenes to output a plurality of updated scenes that are stitched together according to the first and second times.

15. The system of claim 1, wherein the light indicator is a light bar that extends along the touchpad.

16. A method for tracking a hand-held controller relative to a head mounted display (HMD), comprising:
displaying a plurality of image scenes having content generated by execution of an application, wherein the HMD has a lower region having a first camera and has a front region having a second camera, wherein the first camera has a capture view directed downward from the HMD, wherein the second camera has a different capture view than the capture view of the first camera;
capturing, by the first camera, a first plurality of images of the hand-held controller with respect to the HMD, wherein the first plurality of images are captured by detecting a light emitted by a light indicator of the hand-held controller, wherein the light indicator is located along an edge of a touchpad of the hand-held controller to be visible to the first camera of the lower region of the HMD with the touchpad;
capturing, by the second camera, a second plurality of images of the hand-held controller when the hand-held controller is outside the capture view of the first camera, wherein the second plurality of images are captured by detecting the light emitted by the light indicator;
receiving a plurality of images of a real-world environment surrounding the HMD;
receiving the first plurality of images of the hand-held controller from the first camera;
receiving the second plurality of images of the hand-held controller from the second camera;
determining a position and movement of the HMD within the real-world environment from the plurality of images of the real-world environment;
determining a position and movement of the hand-held controller relative to the HMD from the first and second pluralities of images of the hand-held controller;
modifying a state output by execution of the application according to the position and movement of the HMD and changes in the position and movement of the hand-held controller; and
updating the plurality of image scenes displayed in the HMD according to said modifying the state.

17. The method of claim 16, wherein the HMD has an eye mask, wherein the front region is a front surface of the eye mask.

18. The method of claim 16, wherein the second camera is located on a first portion of the front region, wherein the HMD has a third camera, wherein the third camera is located on a second portion of the front region, wherein the third camera has a capture view different from the capture view of the second camera.

19. The method of claim 16, wherein the movement of the hand-held controller is determined based on a first time at which the first plurality of images are captured by the first camera and a second time at which the second plurality of images are captured by the second camera, wherein the plurality of image scenes are updated to output a plurality of updated scenes stitched together according to the first and second times.

20. A non-transitory computer-readable medium containing program instructions for tracking a hand-held controller relative to a head mounted display (HMD), wherein execution of the program instructions by one or more processors of a computer system causes the one or more processors to carry out a plurality of operations of:
displaying a plurality of image scenes having content generated by execution of an application, wherein the HMD has a lower region having a first camera and has a front region having a second camera, wherein the first camera has a capture view directed downward from the HMD, wherein the second camera has a different capture view than the capture view of the first camera;
capturing, by the first camera, a first plurality of images of the hand-held controller with respect to the HMD, wherein the first plurality of images are captured by detecting a light emitted by a light indicator of the hand-held controller, wherein the light indicator is located along an edge of a touchpad of the hand-held controller to be visible to the first camera of the lower region of the HMD with the touchpad;

capturing, by the second camera, a second plurality of images of the hand-held controller when the hand-held controller is outside the capture view of the first camera, wherein the second plurality of images are captured by detecting the light emitted by the light indicator;

receiving a plurality of images of a real-world environment surrounding the HMD;

receiving the first plurality of images of the hand-held controller from the first camera;

receiving the second plurality of images of the hand-held controller from the second camera;

determining a position and movement of the HMD within the real-world environment from the plurality of images of the real-world environment;

determining a position and movement of the hand-held controller relative to the HMD from the first and second pluralities of images of the hand-held controller;

modifying a state output by execution of the application according to the position and movement of the HMD and changes in the position and movement of the hand-held controller; and updating the plurality of image scenes displayed in the HMD according to the modification of the state.

21. The non-transitory computer-readable medium of claim 20, wherein the HMD has an eye mask, wherein the front region is a front surface of the eye mask, wherein the second camera is located on a first portion of the front surface, wherein the HMD has a third camera located on a second portion of the front surface, wherein the third camera has a capture view different from the capture view of the second camera.

22. The non-transitory computer-readable medium of claim 20, wherein the movement of the hand-held controller is determined based on a first time at which the first plurality of images are captured by the first camera and a second time at which the second plurality of images are captured by the second camera, wherein the plurality of image scenes are updated to output a plurality of updated scenes stitched together according to the first and second times.

* * * * *